(12) United States Patent
Abeysekera et al.

(10) Patent No.: US 9,998,262 B2
(45) Date of Patent: Jun. 12, 2018

(54) WIRELESS COMMUNICATION SYSTEM AND WIRELESS COMMUNICATION METHOD

(71) Applicant: NIPPON TELEGRAPH AND TELEPHONE CORPORATION, Tokyo (JP)

(72) Inventors: Hirantha Sithira Abeysekera, Yokosuka (JP); Yasuhiko Inoue, Yokosuka (JP); Yusuke Asai, Yokosuka (JP); Shoko Shinohara, Yokosuka (JP); Takeo Ichikawa, Yokosuka (JP); Masato Mizoguchi, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days. days.

(21) Appl. No.: 14/414,995

(22) PCT Filed: Jul. 19, 2013

(86) PCT No.: PCT/JP2013/069674
§ 371 (c)(1),
(2) Date: Jan. 15, 2015

(87) PCT Pub. No.: WO2014/014094
PCT Pub. Date: Jan. 23, 2014

(65) Prior Publication Data
US 2015/0172012 A1    Jun. 18, 2015

(30) Foreign Application Priority Data

Jul. 19, 2012  (JP) .................................. 2012-160843
Jul. 19, 2012  (JP) .................................. 2012-160844

(51) Int. Cl.
*H04W 4/00*     (2018.01)
*H04L 5/00*     (2006.01)
(Continued)

(52) U.S. Cl.
CPC .............. *H04L 5/0007* (2013.01); *H04J 1/00* (2013.01); *H04J 11/00* (2013.01); *H04J 11/005* (2013.01);
(Continued)

(58) Field of Classification Search
CPC ...... H04W 72/04; H04W 88/08; H04W 76/00
See application file for complete search history.

(56) References Cited

U.S. PATENT DOCUMENTS

2006/0217067 A1*  9/2006  Helbig ................. H04W 16/14
                                                          455/63.1
2007/0021140 A1*  1/2007  Keyes, IV ............. H02J 17/00
                                                          455/522

(Continued)

FOREIGN PATENT DOCUMENTS

CN      101098326 A      1/2008
JP      2012-502546 A    1/2012
(Continued)

OTHER PUBLICATIONS

U.S. Appl. No. 61/669,505 Provisional Specification.*
(Continued)

*Primary Examiner* — Siren Wei
(74) *Attorney, Agent, or Firm* — Harness, Dickey & Pierce, P.L.C.

(57) ABSTRACT

In order to provide a wireless communication system capable of improving the throughput of wireless communication by effectively using frequency resources, in a wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations (Continued)

within a second cell by the orthogonal frequency-division multiple access operate in cooperation with each other, the first wireless access point includes a transmission opportunity acquiring unit which acquires a transmission opportunity when data to be transmitted is generated; and a transmitting unit of permission for use which transmits permission for use of channels which are not scheduled to use within the first cell, to the second wireless access point in a period in which the transmission opportunity is acquired, and the second wireless access point includes a communication unit which communicates with the wireless station within the second cell via the channel in which the permission for use is acquired from the first wireless access point.

19 Claims, 75 Drawing Sheets

(51) Int. Cl.
    *H04J 1/00* (2006.01)
    *H04J 11/00* (2006.01)
    *H04W 16/14* (2009.01)
    *H04W 72/04* (2009.01)
    *H04L 27/00* (2006.01)
    *H04L 1/18* (2006.01)
    *H04W 28/16* (2009.01)
    *H04W 74/08* (2009.01)

(52) U.S. Cl.
    CPC ........ *H04J 11/0063* (2013.01); *H04L 1/1854* (2013.01); *H04L 5/0032* (2013.01); *H04L 5/0035* (2013.01); *H04L 5/0087* (2013.01); *H04L 5/0098* (2013.01); *H04L 27/0006* (2013.01); *H04W 16/14* (2013.01); *H04W 72/0426* (2013.01); *H04L 1/18* (2013.01); *H04L 5/0023* (2013.01); *H04W 28/16* (2013.01); *H04W 74/0808* (2013.01)

(56) References Cited

U.S. PATENT DOCUMENTS

| | | | | |
|---|---|---|---|---|
| 2007/0115901 | A1* | 5/2007 | Lin | H04W 88/08 370/338 |
| 2008/0159208 | A1* | 7/2008 | Kloker | H04W 16/14 370/329 |
| 2010/0111047 | A1* | 5/2010 | Yang | H04W 52/0216 370/336 |
| 2010/0177756 | A1* | 7/2010 | Choi | H04W 72/042 370/338 |
| 2010/0260138 | A1* | 10/2010 | Liu | H04L 5/0023 370/330 |
| 2011/0116401 | A1 | 5/2011 | Banerjea et al. | |
| 2011/0194644 | A1 | 8/2011 | Liu et al. | |
| 2011/0205998 | A1* | 8/2011 | Hart | H04W 72/1226 370/330 |
| 2012/0052900 | A1* | 3/2012 | Liu | H04W 28/0205 455/515 |
| 2012/0099664 | A1 | 4/2012 | Cheong et al. | |
| 2012/0176974 | A1* | 7/2012 | Abraham | H04W 16/02 370/329 |
| 2013/0229996 | A1* | 9/2013 | Wang | H04W 72/0413 370/329 |

FOREIGN PATENT DOCUMENTS

JP        2012-129793 A      7/2012
WO    WO-2010/027308 A1    3/2010

OTHER PUBLICATIONS

Extended Search Report, European Patent Application No. 13819690.2, dated Jan. 20, 2016.
"802.11 high-speed wireless LAN textbook" supervised by Masahiro Morikura and Shuji Kubota, Revised Third Edition, Impress R&D, Apr. 11, 2008, with partial translation thereof.
IEEE P802.11ac Draft Standard, D3.0, Jun. 2012.
IEEE, "IEEE Std 802.11-2012".
Eldad Perahia and Robert Stacey, "Next Generation Wireless LANs", Cambridge University Press, 2010.
K. Kim, et al., "Joint Subcarrier and Power Allocation in Uplink OFDMA Systems", IEEE Communications Letters, vol. 9, No. 6, Jun. 2005.
Takayuki Nishio, Ryoichi Shinkuma, Tatsuro Takahashi, and Narayan Mandayam, "TXOP Exchange: A Cooperation Mechanism for Wireless Access Networks", Communications Quality and Reliability (CQR), 2011 IEEE International Workshop Technical Committee on, May 2011, pp. 1-6.
International Search Report for PCT/JP2013/069674, ISA/JP, dated Aug. 27, 2013.
Chinese Office Action in corresponding application CN 201380037401.8, ISA/CN, dated Jun. 2, 2017, with partial translation of search report.

* cited by examiner

| | | | CTS response STAs=1 | RTS CTS response STAs>1 | | | | | | | |
|---|---|---|---|---|---|---|---|---|---|---|---|
| | | | | Polled CTS | | | | Scheduled CTS | Multiplexed CTS | | |
| | | | | FIXED BANDWIDTH | | VARIABLE BANDWIDTH | | | OFDMA+MU-MIMO | | |
| | | | w/o legacy | w/o legacy | w/ legacy | w/o legacy | w/ legacy | w/ legacy | w/o legacy | w/ legacy | |
| | | | A1-1 | A1-2 | A1-3 A1-3(1) A1-3(2) | A1-4 | A1-5 | A1-8 | A1-6 A1-6(1) A1-6(2) | A1-7 A1-7(1) | |
| CTS response STAs=1 | | w/o legacy | A1-1 | – | ○ | ○ | ○ | ○ | ○ | ○ | ○ | ○ |
| | FIXED BANDWIDTH | w/o legacy | A1-2 | – | – | – | × | × | ○ | ○ | ○ | ○ |
| | | w/ legacy | A1-3 A1-3(1) | – | – | – | × | × | ○ | ◎ | × | × |
| | | | A1-3(2) | – | – | – | × | × | ○ | ◎ | × | × |
| | VARIABLE BANDWIDTH | w/o legacy | A1-4 | – | – | – | – | – | ○ | ○ | ○ | ○ |
| | | w/ legacy | A1-5 | – | – | – | – | – | ○ | ◎ | × | × |
| | Scheduled CTS | w/ legacy | A1-8 | – | – | – | – | – | – | ○ | ○ | × | × |
| | Multiplexed CTS | OFDMA+MU-MIMO | w/o legacy | A1-6 A1-6(1) | | | | | | | – | – | – | – |
| | | | A1-6(2) | | | | | | | – | – | – | – |
| | | w/ legacy | A1-7 A1-7(1) | | | | | | | – | – | – | – |
| | | | A1-7(2) | | | | | | | – | – | – | – |

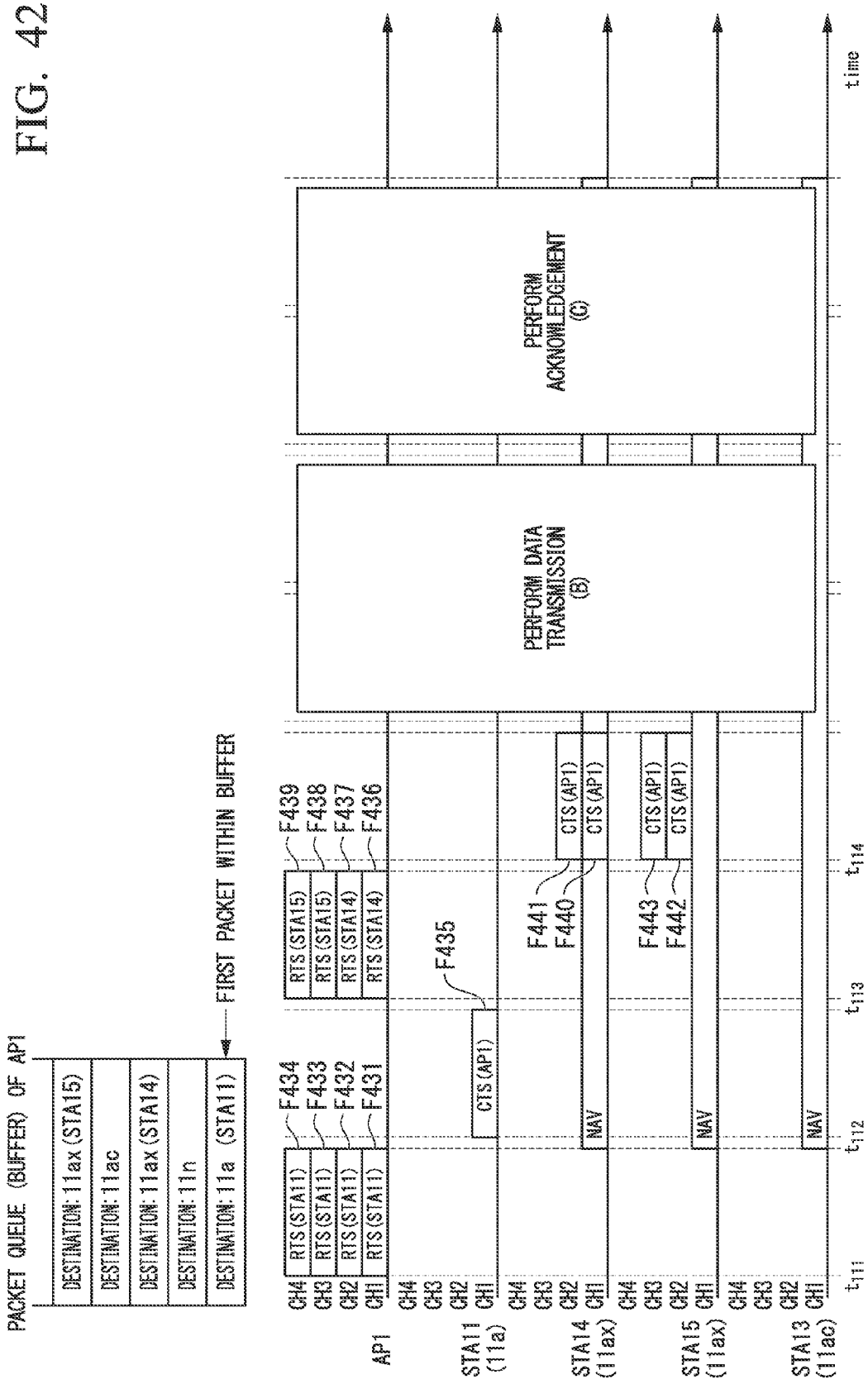

FIG. 45

| | | | CTS response STAs=1 | | CTS response STAs>1 | | | | | | |
|---|---|---|---|---|---|---|---|---|---|---|---|
| | | | Scheduled CTS | | Scheduled CTS | Polled CTS | | Multiplexed CTS | | | |
| | | | | | | FIXED BANDWIDTH | VARIABLE BANDWIDTH | OFDMA+MU-MIMO | | | |
| | | | w/o legacy | | w/o legacy | w/o legacy | w/o legacy | w/o legacy | | | |
| | | | A2-1 | | A2-2 | A2-3 | A2-4 | A2-5 | | | |
| | | | A2-1(1) | A2-1(2) | | | | A2-5(1) | A2-5(2) | A2-5(3) | A2-5(4) |
| ERTS | CTS response STAs=1 | Scheduled CTS w/o legacy A2-1 A2-1(1) | – | – | | | | | | | |
| | | A2-1(2) | – | – | | | | | | | |
| | CTS response STAs>1 | Scheduled CTS w/o legacy A2-2 | O | O | – | | | | | | |
| | | Polled CTS FIXED BANDWIDTH w/o legacy A2-3 | O | O | × | – | | | | | |
| | | Polled CTS VARIABLE BANDWIDTH w/o legacy A2-4 | O | O | × | × | – | | | | |
| | | Multiplexed CTS OFDMA+MU-MIMO w/o legacy A2-5 A2-5(1) | O | O | O | O | O | – | – | – | – |
| | | A2-5(2) | O | O | O | O | O | – | – | – | – |
| | | A2-5(3) | O | O | O | O | O | – | – | – | – |
| | | A2-5(4) | O | O | O | O | O | – | – | – | – |

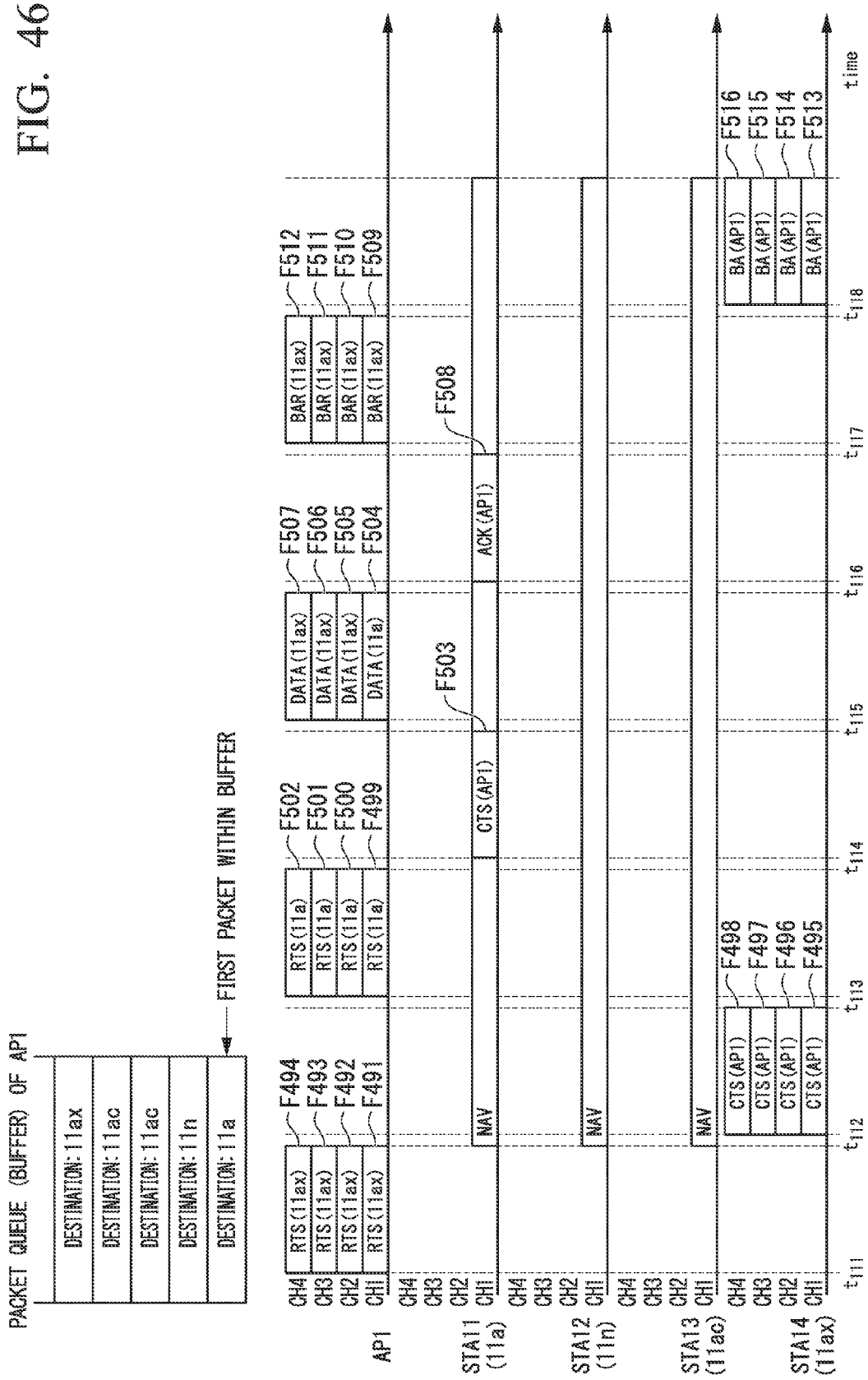

WIRELESS COMMUNICATION SYSTEM AND WIRELESS COMMUNICATION METHOD

CROSS-REFERENCE TO RELATED APPLICATIONS

This application is a 371 U.S. National Stage of International Application No. PCT/JP2013/069674, filed Jul. 19, 2013, which claims priority to Japanese Patent Applications Nos. 2012-160843, filed Jul. 19, 2012, and 2012-160844, filed Jul. 19, 2012. The entire disclosures of the above applications are incorporated herein by reference.

TECHNICAL FIELD

The present invention relates to a wireless communication system and a wireless communication method for performing wireless communication while effectively using frequency resources.

BACKGROUND ART

In recently years, the spread of the IEEE 802.11g standard, the IEEE 802.11a standard, or the like for high-speed wireless access systems using a 2.4 GHz band or a 5 GHz band has been remarkable. In these systems, a physical layer transmission speed of a maximum of 54 Mbps is realized using an orthogonal frequency division multiplexing (OFDM) modulation scheme, which is technology for stabilizing performance in a multipath fading environment (e.g., see Non-Patent Documents 1 and 4).

However, because the transmission speed referred to here is a transmission speed on the physical layer and the transmission efficiency in a medium access control (MAC) layer is actually about 50 to 70%, an upper-limit value of the actual throughput is about 30 Mbps and thus this performance is further degraded if the number of wireless communication stations intended to transmit information increases. On the other hand, in the field of wired local area networks (LANs), the provision of a high-speed link of 100 Mbps is widespread as a result of the spread of fiber to the home (FTTH) using optical fibers even in individual homes including a 100 Base-T interface of the Ethernet (registered trademark), and thus a further increase in a transmission speed is required even in the wireless LANs.

As technology for increasing the transmission speed, the extension of a channel bandwidth and a spatial multiplexing technology (multiple-input multiple-output (MIMO)) is introduced into the IEEE 802.11n standard. In addition, in the draft of the IEEE 802.11ac standard, the further extension of the channel bandwidth and a multiuser MIMO (MU-MIMO) transmission method to which a space division multiple access (SDMA) technology obtained by extending the spatial multiplexing technology is applied is being investigated (e.g., see Non-Patent Document 2). In addition, in the draft of the IEEE 802.11ac standard, a new concept called a group ID (GID) is prescribed. It is possible to simultaneously transmit data to all or part of wireless stations belonging to a group designated by a GID field of a frame by using the group ID.

Because the speed-up method by the extension of the channel bandwidth among the above-described speed-up technologies is easier to implement than the spatial multiplexing technology and the space division multiple access technology, it is a function implemented on many apparatuses. For example, the IEEE 802.11n standard has extended a channel bandwidth, which was fixed to 20 MHz in the IEEE 802.11a standard, to 40 MHz to thereby increase the speed. In addition, extension of a channel width to 80 MHz or 160 MHz is being investigated in the draft of the IEEE 802.11ac standard, which is currently being standardized in IEEE 802.11 Task Group ac (TGac). Here, for example, two adjacent 20 MHz channels are used when a width of 40 MHz is used and four adjacent 20 MHz channels are used when a width of 80 MHz is used.

In the wireless LAN system of the IEEE 802.11 standard, even when a wireless access point apparatus has a capability or function of performing transmission and reception in a wide band such as 40 MHz, 80 MHz, or 160 MHz as described above, a channel bandwidth available in actual transmission and reception is limited to a channel bandwidth supported by a wireless station apparatus (hereinafter referred to as a wireless station) associated with the wireless access point. That is, if it is impossible for the wireless station to transmit and receive a signal of a wide band such as 40 MHz, 80 MHz, or 160 MHz, the wireless access point has to perform transmission and reception of data using a channel bandwidth in a range that each wireless station can handle.

For example, the case in which the wireless access point can transmit and receive data using a band of 80 MHz conforming to the IEEE 802.11ac standard (draft) is considered. At this time, if the wireless station associated with the wireless access point can also use an 80 MHz mode conforming to the IEEE 802.11ac standard (draft), data transmission and data reception in the entire 80 MHz band between the wireless access point and the wireless station are possible. However, because a frequency available to the wireless station conforming to the IEEE 802.11a standard is 20 MHz, the above-described data transmission between the wireless access point and the wireless station is performed on one 20 MHz channel.

As described above, in the system conforming to the IEEE 802.11, it is difficult to sufficiently demonstrate the capability of the wireless access point if there is a difference in a channel bandwidth supported by the wireless station and the wireless access point. In addition, when the number of wireless stations of such a low function/capability increases, a frequency utilization efficiency and throughput performance of the entire system deteriorates.

Next, a method for wirelessly transmitting and receiving data in an IEEE 802.11 wireless LAN system will be described. In the wireless LAN system conforming to the IEEE 802.11, an access control procedure based on carrier sense multiple access with collision avoidance (CSMA/CA) is adopted and each wireless communication station (the wireless access point and the wireless station are collectively referred to as a wireless communication station) avoids a collision of a signal with that of another wireless communication station. A wireless communication station generating a transmission request first monitors a state of a wireless medium only in a predetermined sensing period (distributed inter-frame space (DIFS)). If there is no transmission signal by another wireless communication station during this period, the channel is regarded to be in an unused state (also referred to as an idle state) and the wireless communication station starts a random back-off procedure (a process of generating a random number within a predetermined range, determining a waiting time for collision avoidance control based on its value, and waiting for transmission for the time). The wireless communication station continues to monitor the wireless medium even during a random back-off period, and obtains an exclusive channel transmission right (transmission opportunity (TXOP)) over a predetermined period if there is no transmission signal by another wireless communication station even during the period. The wireless communication station obtaining the transmission right (TXOP) in this manner is referred to as a TXOP holder (hereinafter referred to as a transmission right acquiring wireless communication station). The wireless communication station becoming the transmission right acquiring wireless communication station can continuously transmit frames at very short time intervals referred to as short inter-frame spaces (SIFSs) without performing CSMA/CA within the TXOP period again.

In addition, there is "virtual carrier sense" as a method for solving a hidden terminal problem in wireless communication. Specifically, if Duration (continuous use period) information for providing the notification of a use time of wireless media is included when a wireless communication station receives a frame, the wireless communication station assumes that the media are used during a period corresponding to the Duration information (virtual carrier sense), sets the period as a transmission stop period (network allocation vector (NAV) period), and does not transmit a frame in the NAV period. Thereby, the exclusive use of the channel in the TXOP period is ensured.

When the wireless communication station receives the frame, the wireless communication station sets the NAV if necessary as described above and simultaneously records information (e.g., a MAC address) for identifying a transmission-source wireless communication station of the received frame, i.e., the transmission right acquiring wireless communication station, if the received frame is a frame which initiates the TXOP period (e.g., see Non-Patent Document 3). The stored information for identifying the transmission right acquiring wireless communication station is deleted when the TXOP period ends. It is to be noted that the frame initiating the TXOP period is not a special frame and it is a signal for reserving a channel over a fixed period by transmitting a control frame such as a request to send (RTS) frame.

When the wireless communication station receives a frame within the TXOP period again, the wireless communication station checks whether a transmission-source address of the received frame is the same as the MAC address stored as the information for identifying the transmission right acquiring wireless communication station. If they are the same, it is determined that the transmission-source wireless communication station of the received frame is the transmission right acquiring wireless communication station and a necessary reply frame is transmitted regardless of presence/absence of setting of the NAV within the wireless communication station itself. Thereby, the transmission right acquiring wireless communication station can transmit and receive data to and from a plurality of different wireless communication stations within the same TXOP period.

Hereinafter, an operation of transmitting and receiving a frame for transmitting and receiving data to be performed between wireless communication stations will be described with reference to FIGS. 72 to 74. FIG. 72 is a diagram illustrating a cell A of a wireless LAN constituted of one wireless access point AP1 and three wireless stations STA11 to STA13. It is assumed that the wireless access point AP1 and the wireless station STA13 conform to the IEEE 802.11ac standard and support three types of 20 MHz, 40 MHz, and 80 MHz as transmission/reception bandwidths. In addition, it is assumed that the wireless station STA11 conforms to the IEEE 802.11a standard, the wireless station STA12 conforms to the IEEE 802.11n standard, the wireless station STA11 supports a transmission/reception bandwidth of 20 MHz, and the wireless station STA12 supports transmission/reception bandwidths of 20 MHz and 40 MHz.

FIG. 73 is a time chart illustrating timings at which frames are transmitted when the transmission right acquiring wireless communication station transmits a plurality of frames addressed to other wireless communication stations within the TXOP. In FIG. 73, the horizontal axis represents time. The notation of (STA11) or the like within the frame represents a destination wireless communication station. For example, (STA11) represents that the destination is the wireless station STA11. In addition, the NAV (RTS) represents that the NAV is set after reception of an RTS which is not addressed to the station itself. Here, an example in which the wireless access point AP1 and the wireless stations STA11 to STA13 are present as the wireless communication stations and the wireless access point AP1 accommodates data for the wireless stations STA11 to STA13 and transmits frames addressed to the wireless stations STA11 to STA13 is shown. The wireless access point AP1 acquires the TXOP and transmits data on an 80 MHz channel to the wireless station STA13, which can use a largest band among the destination stations. When data communication with the wireless station STA13 ends, the wireless access point AP1 transmits data to the wireless station STA12, which can use a second largest band among the destination stations, and finally transmits data to the wireless station STA11, which can use a smallest band among the destination stations.

Hereinafter, operations of the wireless access point AP1 and the wireless stations STA11 to STA13 will be described with reference to FIG. 73. First, the wireless access point AP1 executes CSMA/CA when data for the wireless stations STA11 to STA13 is generated, and acquires the transmission right (TXOP) after confirming that a signal transmitted from another wireless communication station is not detected over a predetermined sensing period and a random back-off time. The wireless access point AP1 becomes the transmission right acquiring wireless communication station (TXOP holder) because the wireless access point AP1 has acquired the transmission right, and transmits a frame. The wireless access point AP1 transmits a request to send (RTS) frame serving as a start frame representing the start of the frame sequence for the wireless station STA13, which can use the largest band among the destination stations, to which data is to be transmitted (time $t_{111}$).

Because the destination of the RTS frame received by the wireless station STA13 is the station itself and a transmission stop period is not set within the station itself, the wireless station STA13 replies a clear to send (CTS: transmission permission) frame for the wireless access point AP1 (time $t_{112}$). Thereby, the wireless station STA13 notifies the wireless access point AP1 of the fact that the wireless station STA13 is in a state in which data can be received.

In contrast, because the destination of the RTS frame is not the wireless stations STA11 and STA12, which are the other wireless communication stations receiving the RTS frame from the wireless access point AP1, the wireless stations STA11 and STA12 set a period represented by the continuous use period information included in the RTS frame as an NAV period (transmission stop period) and do not perform frame transmission within the NAV period. In addition, the wireless stations STA11 to STA13 detect that the TXOP period (use transmission right period) starts because the RTS frame is received from the wireless access point AP1 and store the fact that the wireless access point AP1 is the transmission right acquiring wireless communication station (TXOP holder).

Subsequently, when the CTS frame is received from the wireless station STA13, the wireless access point AP1 transmits a frame for the wireless station STA13 (time $t_{113}$). If the frame for the station itself is correctly received, the wireless station STA13 replies a block ACK (BA) frame (or positive acknowledgement (ACK) frame) for the wireless access point AP1 (time $t_{114}$) and ends the transmission and reception of the frame.

Next, in order to transmit data for the wireless station STA12, which can use a second largest band among the destination stations, the wireless access point AP1 transmits an RTS frame, the destination of which is designated as the wireless station STA12 (time $t_{115}$). Here, although the NAV is set in the station itself, the wireless station STA12 replies a CTS frame for the transmission right acquiring wireless communication station AP1 because the frame from the TXOP holder is received (time $t_{116}$).

The wireless stations STA11 and STA13 set NAV periods because the RTS frame for another wireless station is received. In addition, if the NAV periods are already set, their NAV values are updated. If the CTS frame is correctly received from the wireless station STA12, the wireless access point AP1 transmits a frame for the wireless station STA12 (time $t_{117}$). If the frame is correctly received from the wireless access point AP1, the wireless station STA12 replies a BA frame (or ACK frame) for the wireless access point AP1 (time $t_{118}$) and ends the transmission and reception of the frame.

Next, in order to transmit data for the wireless station STA11, which can use a smallest band among the destination stations, the wireless access point AP1 transmits an RTS frame, the destination of which is designated as the wireless station STA11 (time $t_{119}$). Because the RTS frame is received from the wireless access point AP1, which is the transmission right acquiring wireless communication station, the wireless station STA11 replies a CTS frame for the transmission right acquiring wireless communication station regardless of whether the period is within the NAV period (time $t_{120}$).

In contrast, the wireless stations STA12 and STA13 set NAV periods because the RTS frame that is not addressed to the stations themselves is received. If the NAV periods are already set, the NAV values are updated. If the CTS frame is correctly received from the wireless station STA11, the wireless access point AP1 transmits a frame for the wireless station STA11 (time $t_{121}$). If the frame is correctly received from the wireless access point AP1, the wireless station STA11 replies a BA frame (or ACK frame) for the wireless access point AP1 (time $t_{122}$) and ends the transmission and reception of the frame.

Although the above description is an example of a frame sequence when a MAC protection technique by exchanging an RTS and a CTS is applied before the data is transmitted, a frame for data transmission may be transmitted immediately after an access right is acquired without exchanging an RTS and a CTS. In addition, the above description is an example in which a frame is transmitted for a plurality of stations within the same TXOP section. It is possible to transmit a frame to a plurality of stations as described above in a range which does not exceed an upper limit of the TXOP prescribed in the IEEE 802.11 standard. In addition, in this case, it is impossible to perform communication using a larger channel width than a channel width used once within the TXOP period. That is, although it is impossible to widen a width of a channel to be used in the TXOP section, it is possible to narrow the channel width if necessary. In the case of the example of FIG. 73, frames are transmitted in order from a destination in which an available channel width is larger because the wireless station STA11 can use channel 1 (CH1), the wireless station STA12 can use CH1 and CH2, and the wireless station STA13 can use CH1 to CH4.

Next, channel bandwidths used at the time of data transmissions between the wireless access point AP1 and the wireless stations STA11 to STA13 will be described with reference to FIG. 74. FIG. 74 is a diagram illustrating the channel bandwidths used at the time of the data transmissions between the wireless access point AP1 and the wireless stations STA11 to STA13. Because the wireless station STA11 can use only 20 MHz, the wireless access point AP1 communicates with the wireless station STA11 via channel 1 (CH1).

In Non-Patent Document 3, a unit channel to be necessarily used regardless of a transmission bandwidth when communication is performed within a cell constituted of a certain access point and stations is defined and it is called a primary channel. On the other hand, a channel which is used when communication is performed but is not the primary channel is called a secondary channel or a secondary x MHz channel (where x is a number among 20, 40, and 80) in Non-Patent Document 2. In the present Description, among all bands used in the cell, an arbitrary unit channel which is not the primary channel is referred to as a secondary channel.

FIG. 75 illustrates an example of the primary channel and the secondary channels when the unit channel is 20 MHz and the entire band used in the cell is 80 MHz. In FIG. 75, an example in which there are three secondary channels is illustrated.

Because the wireless station STA12 can handle up to 40 MHz, communication between the wireless access point AP1 and the wireless station STA12 is performed on the primary channel of 20 MHz and 20 MHz (secondary channel) adjacent to the primary channel (that is, on CH1 and CH2). In addition, because the wireless station STA13 can handle up to 80 MHz, communication between the wireless access point AP1 and the wireless station STA13 is performed on the primary channel and three secondary channels.

PRIOR ART DOCUMENTS

Non-Patent Documents

Non-Patent Document 1: "802.11 high-speed wireless LAN textbook" supervised by Masahiro Morikura and Shuji Kubota, Revised Third Edition, Impress R&D, Apr. 11, 2008.
Non-Patent Document 2: IEEE 802.11ac Draft Standard, D3.0, June 2012.
Non-Patent Document 3: IEEE, "IEEE Std 802.11-2012"
Non-Patent Document 4: Eldad Perahia and Robert Stacey, "Next Generation Wireless LANs", Cambridge University Press, 2010.

SUMMARY OF INVENTION

Problems to be Solved by the Invention

When bandwidths that can be transmitted and received between the wireless access point AP1 and the wireless stations STA11 to STA13 are different from one another as illustrated in FIG. 74, part of the entire frequency band that the wireless access point AP1 can handle may not be used. For example, channels CH2 to CH4 are unused when the wireless access point AP1 and the wireless station STA11 perform communication, and channels CH3 and CH4 are unused when the wireless access point AP1 and the wireless station STA12 perform communication.

In this case, because the capability of the wireless access point AP1 is not sufficiently utilized and frequency resources are not effectively used, there is a problem in that the throughput of the entire system deteriorates and service quality deteriorates.

The present invention has been made in view of such circumstances, and an object thereof is to provide a wireless communication system and a wireless communication method capable of improving the throughput of wireless communication by effectively using frequency resources.

Means for Solving the Problems

The present invention is a wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, wherein the first wireless access point comprises: an access right acquiring means which acquires an access right when data to be transmitted is generated; and a transmitting means of permission for use which transmits permission for use of channels which are not scheduled to use within the first cell, to the second wireless access point in a period in which the access right is acquired, and the second wireless access point comprises a communication means which communicates with the wireless stations within the second cell via the channels in which the permission for use is acquired.

In the wireless communication system of the present invention, the transmitting means of the permission for use transmits the permission for use of a secondary channel that is not scheduled to be used via a primary channel.

In the wireless communication system of the present invention, the transmitting means of the permission for use transmits the permission for use of a secondary channel that is not scheduled to be used via all channels.

In the wireless communication system of the present invention, the transmitting means of the permission for use transmits the permission for use of a channel on which a transmission permission is not sent as a reply to a transmission request transmitted via all channels.

In the wireless communication system of the present invention, the transmitting means of the permission for use transmits the permission for use of a channel that is not scheduled to be used based on a reply of transmission permission to a transmission request transmitted via all channels.

In the wireless communication system of the present invention, the transmitting means of the permission for use transmits the permission for use of a secondary channel when a wireless station with which to be communicated is not available of the orthogonal frequency division multiple access.

In the wireless communication system of the present invention, the transmitting means of the permission for use transmits the permission for use of a secondary channel when a wireless station with which to be communicated is not available of the orthogonal frequency-division multiple access, and the wireless stations associated with the second wireless access point acquiring the permission for use reply a transmission permission in accordance with an available channel.

In the wireless communication system of the present invention, the first wireless access point performs data transmission after determining a channel of which the permission for use is assignable and transmitting the permission for use via a primary channel through the transmitting means of the permission for use.

In the wireless communication system of the present invention, the first wireless access point performs data transmission after determining a channel of which the permission for use is assignable and transmitting the permission for use via all channels through the transmitting means of the permission for use.

In the wireless communication system of the present invention, the first wireless access point performs data transmission after determining a channel of which the permission for use is assignable, transmitting the permission for use via a primary channel through the transmitting means of the permission for use, and receiving a positive acknowledgement for the permission for use.

In the wireless communication system of the present invention, the first wireless access point performs data transmission after determining a channel of which the permission for use is assignable, transmitting the permission for use via all channels through the transmitting means of the permission for use, and receiving a positive acknowledgement for the permission for use.

The present invention is a wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, wherein each wireless station within the first cell comprises: a first data receiving means which receives different data destined to wireless stations transmitted from the first wireless access point on different channels by the orthogonal frequency-division multiple access; and a first acknowledgement transmitting means which transmits an acknowledgement if the data is correctly received by the first data receiving means, and each wireless station within the second cell comprises: a second data receiving means which receives data transmitted from the second wireless access point by the orthogonal frequency-division multiple access on a channel for which permission for use is acquired from the first wireless access point; and a second acknowledgement transmitting means which transmits an acknowledgement if the data is correctly received by the second data receiving means.

In the wireless communication system of the present invention, a reply of the acknowledgement with which each of the first acknowledgement transmitting means and the second acknowledgement transmitting means replies is made using uplink orthogonal frequency-division multiple access.

In the wireless communication system of the present invention, the second wireless access point comprises an access right acquiring means which acquires an access right, and wherein the acknowledgement is transmitted after the access right is acquired.

In the wireless communication system of the present invention, in the acknowledgement with which each of the first acknowledgement transmitting means and the second acknowledgement transmitting means replies, a reply of a second acknowledgement is sent on a primary channel after a first acknowledgement is transmitted on the primary channel.

The present invention is a wireless communication method to be performed by a wireless communication system in which a first wireless access point which communicates with one more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, the method comprising: an access right acquiring step of acquiring, by the first wireless access point, an access right when data to be transmitted is generated; a use permission transmitting step of transmitting, at the first wireless access point, permission for use of channels which are not scheduled to use within the first cell, to the second wireless access point in a period in which the access right is acquired; and a communication step of communicating, by the second wireless access point, with the wireless stations within the second cell via the channels in which the permission for use is acquired.

The present invention is a wireless communication method to be performed by a wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, the method comprising: a first data receiving step of receiving different data, at the wireless stations within the first cell, destined to wireless stations transmitted from the first wireless access point on different channels by the orthogonal frequency-division multiple access; a first acknowledgement transmitting step of transmitting, by the wireless stations within the first cell, an acknowledgement if the data is correctly received in the first data receiving step; a second data receiving step of receiving, by the wireless stations within the second cell, data transmitted from the second wireless access point by the orthogonal frequency-division multiple access on a channel for which permission for use is acquired from the first wireless access point; and a second acknowledgement transmitting step of transmitting, by the wireless stations within the second cell, an acknowledgement if the data is correctly received in the second data receiving step.

Advantageous Effects of the Invention

In accordance with the present invention, there is an advantageous effect in that frequency in use of secondary channels is improved and system throughput is improved by transmitting data to a plurality of wireless communication stations using orthogonal frequency-division multiple access (OFDMA). In addition, there is an advantageous effect in that data can be simultaneously transmitted to a station that can handle OFDMA through an unused secondary channel while data is transmitted to a legacy station (which handles an old standard) on a primary channel and thus frequency utilization efficiency is improved.

BRIEF DESCRIPTION OF DRAWINGS

FIG. 16 is a diagram illustrating formats of transmission frame when four wireless stations (STAs) perform space multiplexing transmission of CTS frames.

FIG. 41 is an illustration of frame sequences of MAC protection capable of being combined.

FIG. 42 is a time chart illustrating an example of a frame sequence in which frame sequences are combined.

FIG. 45 is a diagram illustrating combinations of frame sequences of MAC protection using ERTS.

FIG. 46 is a time chart illustrating a sequence in which MAC protection, data transmission, and acknowledgements are performed by combining frame sequences.

MODES FOR CARRYING OUT THE INVENTION

Figure 1:
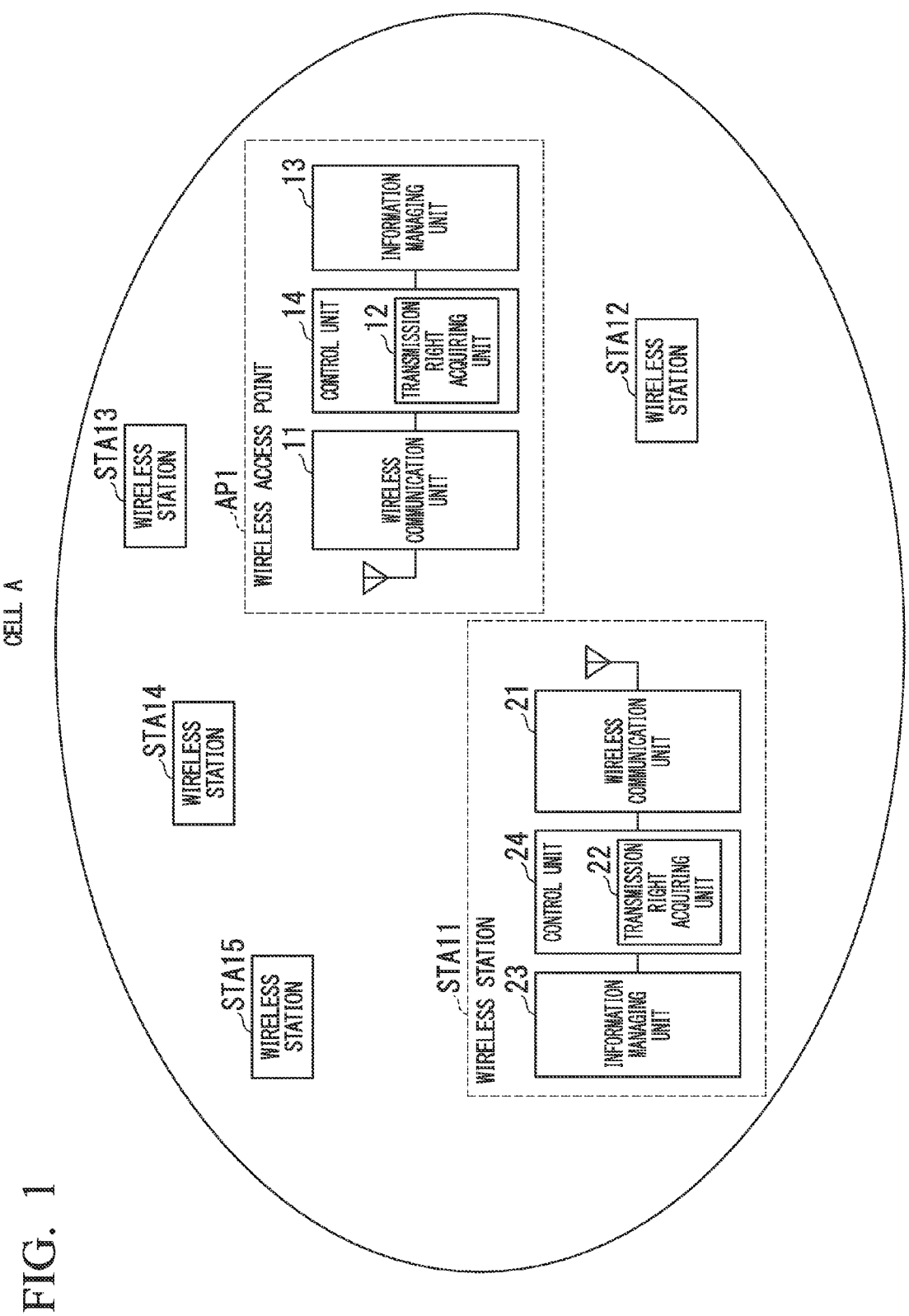
FIG. 1 is a diagram illustrating a block diagram of configurations of a wireless access point and wireless stations and a configuration of a network in an embodiment of the present invention.

Hereinafter, a wireless communication system in accordance with an embodiment of the present invention will be described with reference to the drawings. FIG. 1 is a diagram illustrating a block diagram of configurations of a wireless access point and wireless stations and a configuration of a network in the present embodiment. The wireless communication system in the present embodiment is characterized in that a wireless communication station serving as a transmission right acquiring wireless communication station transmits data for a plurality of wireless communication stations on a plurality of channels using orthogonal frequency-division multiple access (OFDMA). A cell A of the wireless communication system illustrated in FIG. 1 includes a wireless access point AP1, which is a wireless communication station, and five wireless stations STA11 to STA15. It is assumed that the wireless access point AP1 and the wireless stations STA14 and STA15 are wireless communication stations that can handle OFDMA and support a maximum of 80 MHz as a transmission/reception bandwidth. In contrast, it is assumed that the wireless station STA13 conforms to the IEEE 802.11ac standard and supports three types of 20 MHz, 40 MHz, and 80 MHz as transmission/reception bandwidths. In addition, it is assumed that the wireless station STA11 conforms to the IEEE 802.11a standard, the wireless station STA12 conforms to the IEEE 802.11n standard, the wireless station STA11 supports a transmission/reception bandwidth of 20 MHz, and the wireless station STA12 supports transmission/reception bandwidths of 20 MHz and 40 MHz.

In the following description of the present Description, an IEEE 802.11ax wireless station (hereinafter referred to as an 11ax wireless station) is a general term for a wireless communication station having a function capable of implementing the present embodiment in addition to a function provided in a wireless communication station that conforms to the IEEE 802.11ac. In addition, a legacy station is a general term for a wireless communication station that conforms to an existing standard (IEEE 802.11a, IEEE 802.11n, or IEEE 802.11ac) which does not have a function prescribed in the present Description. Hereinafter, like the 11ax wireless station, the wireless station that conforms to the IEEE 802.11a standard is referred to as an 11a wireless station, the wireless station that conforms to the IEEE 802.11n standard is referred to as an 11n wireless station, and the wireless station that conforms to the IEEE 802.11 ac standard is referred to as an 11ac wireless station.

In the present embodiment, an unused channel is effectively used by causing a wireless communication station that transmits and receives data in an IEEE 802.11 wireless LAN system to perform an orthogonal frequency-division multiple access (OFDMA) operation. By using OFDMA technology in the IEEE 802.11 wireless LAN, for example, when the wireless access point AP1 transmits data to the wireless station STA11 via channel 1 in the wireless communication system illustrated in FIG. 1, it is possible to transmit data for another wireless communication station (e.g., the wireless station STA14, which can use OFDMA) via the remaining channels 2 to 4. Likewise, when the wireless access point AP1 transmits data to the wireless station STA12 via channels 1 and 2, it is possible to transmit data to another wireless communication station (e.g., the wireless station STA14) via the remaining channels 3 and 4.

It is to be noted that frames may be simultaneously transmitted to a plurality of wireless communication stations using the remaining band after providing a guard band (GB) between channels without performing OFDMA in the entire available band to avoid interference between adjacent channels. For example, when a guard band of 20 MHz is provided and the wireless access point AP1 transmits a frame to the wireless station STA11 via channel 1, channel 2 is used as the guard band and the frame is transmitted to another wireless communication station (e.g., the wireless station STA14) via the remaining channels 3 and 4. Likewise, when the wireless access point AP1 transmits a frame to the wireless station STA12 via channels 1 and 2, channel 3 is used as the guard band, and the frame is transmitted to another wireless communication station (e.g., the wireless station STA14) via channel 4.

Here, for ease of description, a destination wireless communication station to which a wireless communication station acquiring the access right transmits data on a primary channel is referred to as a primary wireless communication station (primary STA). In addition, a station (the wireless station STA14 in the case of the above example) to which the wireless communication station acquiring the access right transmits data in accordance with OFDMA using all or part of a band which does not include a primary channel is referred to as a secondary wireless communication station (secondary STA). It is to be noted that although there is only one primary wireless communication station in the IEEE 802.11a standard and the IEEE 802.11n standard, there may be a plurality of primary wireless communication stations in the IEEE 802.11ac standard (draft) using MU-MIMO. In contrast, there is no secondary wireless communication station in previous wireless LAN systems such as those of the IEEE 802.11a standard, the IEEE 802.11n standard, and the IEEE 802.11ac standard (draft). In the OFDM wireless LAN system of the present embodiment, there may be a plurality of secondary wireless communication stations in addition to the primary wireless communication station.

The transmission right acquiring wireless communication station can transmit data for the primary wireless communication station via a plurality of channels. For example, if the primary wireless communication station is a station conforming to the IEEE 802.11a standard, only one 20 MHz channel (primary channel) is used for data transmission, but if the primary wireless communication station is a station conforming to the IEEE 802.11n standard or the IEEE 802.11ac standard, it is possible to transmit and receive data using a maximum of two or eight 20 MHz channels, respectively. In this manner, a channel group including primary channels to be used in communication with the primary wireless communication station is referred to as a primary channel group (primary channels).

Likewise, the transmission right acquiring wireless communication station can transmit data for a secondary wireless communication station via one or more channels in a range in which there is no interference with the primary wireless communication station. In this manner, a channel group that does not include the primary channel and that is used in communication with the secondary wireless communication station is referred to as a secondary channel group (secondary channels).

When the transmission right acquiring wireless communication station (the wireless access point AP1 in the above example) simultaneously transmits signals to the primary wireless communication station and the secondary wireless communication station using OFDMA, MAC protection such as an RTS and a CTS may be performed even on the secondary channel group, if necessary. In addition, the upper limit of the length of a period of communication with the secondary wireless communication station is a period (a so-called TXOP period acquired and set in accordance with the IEEE 802.11 standard) of communication with the primary wireless communication station.

The wireless access point AP1 illustrated in FIG. 1 includes a wireless communication unit 11, a transmission right acquiring unit 12, an information managing unit 13, and a control unit 14. In addition, the wireless station STA11 illustrated in FIG. 1 has a configuration similar to that of the wireless access point AP1, and includes a wireless communication unit 21, a transmission right acquiring unit 22, an information managing unit 23, and a control unit 24. Because the wireless stations STA12 to STA15 are different in terms of, for example, a use bandwidth and whether or not they support OFDM transmission but have configurations similar to that of the wireless station STA11, a detailed illustration thereof is omitted in FIG. 1.

The wireless communication unit 11 performs transmission and reception of a frame to and from other wireless communication stations (wireless stations STA11 to STA15) using a predetermined frequency band. When data to be transmitted to the other wireless communication stations is generated in the apparatus itself, the control unit 14 requests the transmission right acquiring unit 12 to acquire a transmission right (TXOP). The information managing unit 13 stores information. The control unit 14 controls transmission and reception of frames to be performed by the wireless communication unit 11 based on a transmission right acquisition state from the transmission right acquiring unit 12 and the information stored in the information managing unit 13.

The wireless communication unit 21 performs transmission and reception of frames to and from another wireless communication station (wireless access point AP1) using a predetermined frequency band. When data to be transmitted to the other wireless communication station is generated in the apparatus itself, the control unit 24 requests the transmission right acquiring unit 22 to acquire a transmission right (TXOP). The information managing unit 23 stores information. The control unit 24 controls the transmission and reception of frames to be performed by the wireless communication unit 21 based on a transmission right acquisition state from the transmission right acquiring unit 22 and the information stored in the information managing unit 23.

Figure 2:
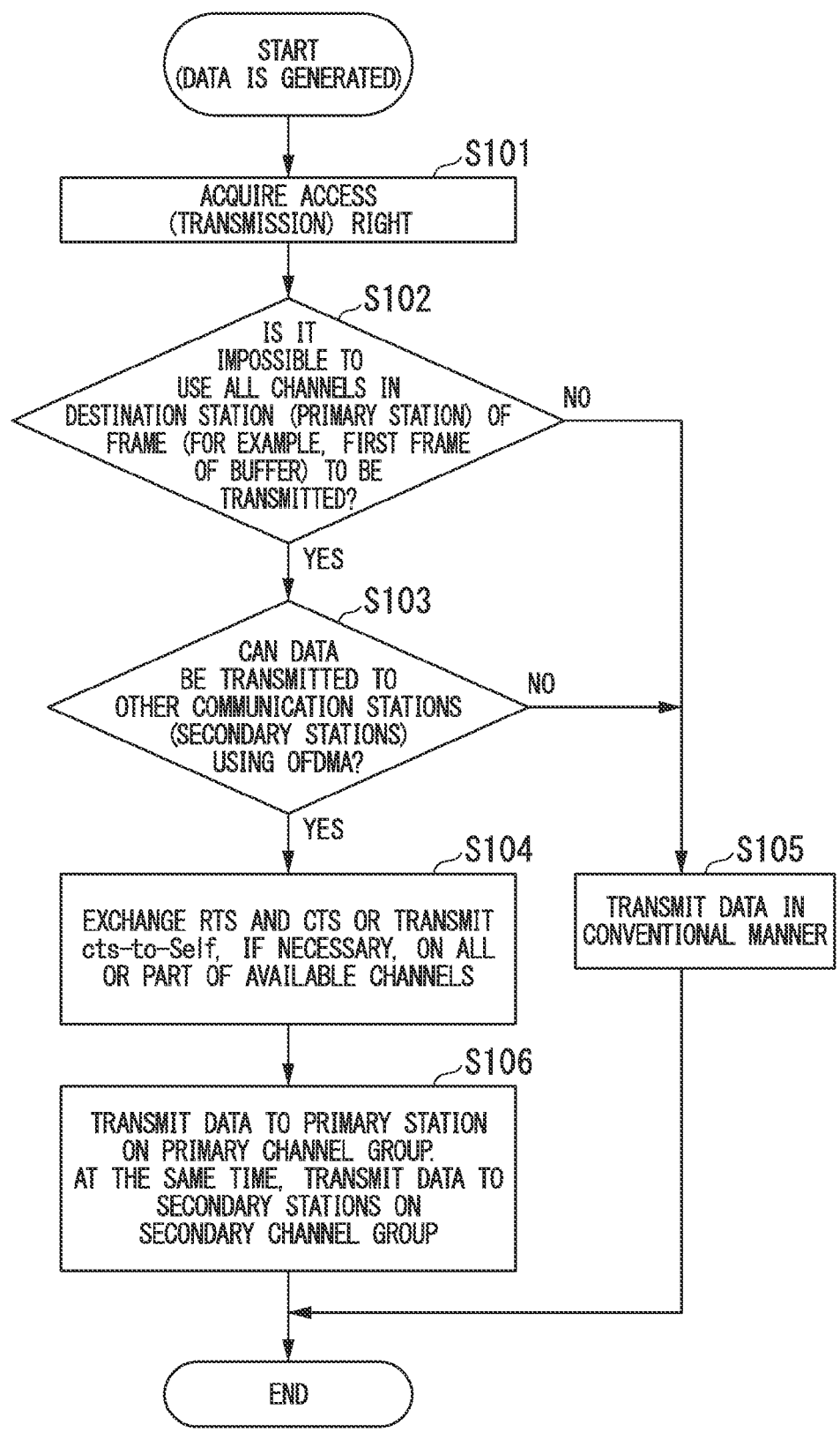
FIG. 2 is a flowchart illustrating a transmission processing operation of a wireless access point AP1 illustrated in FIG. 1.

Next, a transmission processing operation of the wireless access point AP1 illustrated in FIG. 1 will be described with reference to FIG. 2. FIG. 2 is a flowchart illustrating the transmission processing operation of the wireless access point AP1 illustrated in FIG. 1. When data to be transmitted to other wireless communication stations (wireless stations STA11 to STA15) is generated in the wireless access point AP1, the control unit 14 requests the transmission right acquiring unit 12 to acquire a transmission right and the transmission right acquiring unit 12 acquires the transmission right after confirming an unused state in which a signal transmitted from the other wireless communication stations is not detected via the wireless communication unit 11 over a predetermined sensing period and a random back-off time (step S101).

Next, the control unit 14 refers to the information stored in the information managing unit 3 and determines whether a destination wireless communication station (a so-called primary wireless communication station) of a frame to be transmitted can transmit and receive a signal in the same bandwidth as that of the wireless communication station itself (step S102).

Next, if it is determined that the primary wireless communication station is a wireless communication station having the capability to receive a signal in the same bandwidth as that of the wireless communication station itself in the determination of step S102 (step S102: No), the control unit 14 requests the wireless communication unit 11 to perform frame transmission, the wireless communication unit 11 performs the frame transmission in a conventional manner in response to the request (step S105), and the transmission ends.

In contrast, if the determination result of step S102 represents that the primary wireless communication station is not a wireless communication station having the capability to receive a signal in the same bandwidth as that of the wireless communication station itself (step S102: Yes), the control unit 14 determines whether it is possible to transmit the data to secondary wireless communication stations using OFDMA (step S103). If a result of this determination represents that it is impossible to perform the OFDMA (step S103: No), the control unit 14 requests the wireless communication unit 11 to perform frame transmission and the wireless communication unit 11 performs the frame transmission and reception in a conventional manner in response to the request (step S105), and the transmission ends.

In contrast, if there is data to be transmitted to the secondary wireless communication stations and it is possible to perform the OFDMA (step S103: YES), the control unit 14 performs MAC protection by exchanging an RTS frame and a CTS frame with the secondary wireless communication stations capable of transmitting and receiving data in a larger band, rather than a primary wireless communication station which transmits and receives data on the primary channel group, or by transmitting a CTS-to-Self frame, using a non-HT duplicate mode via the wireless communication unit 11, if necessary, on all channels available in the secondary wireless communication stations or part of the channels depending on transmission power, a MCS for use in transmission, and the like (step S104).

Then, the control unit 14 requests the wireless communication unit 11 to perform frame transmission, and the wireless communication unit 11 transmits a frame for the primary wireless communication station on the primary channel group and transmits frames for the secondary communication stations on the secondary channel group in response to the request and ends the TXOP period (step S106).

Figure 3:
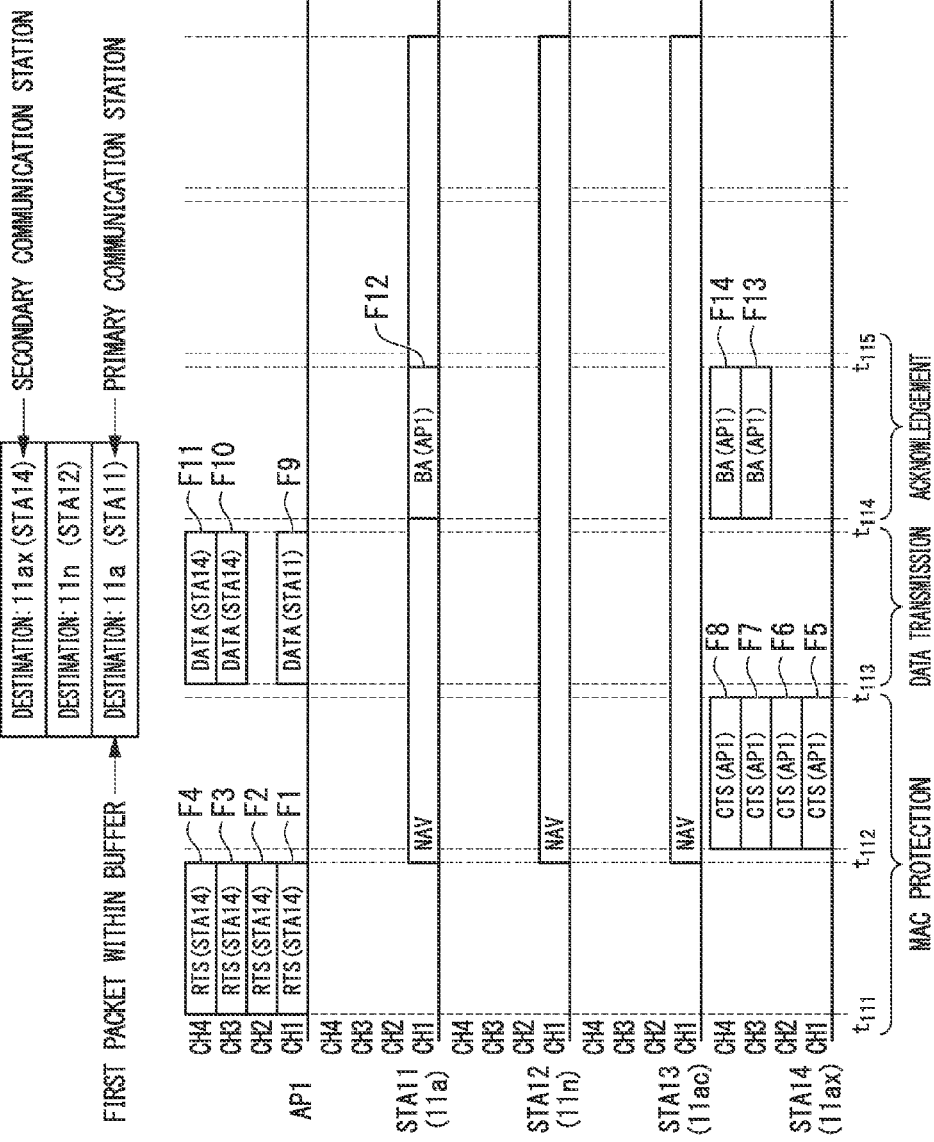
FIG. 3 is a time chart illustrating a frame sequence when a transmission right acquiring wireless communication station (wireless access point AP1) transmits a plurality of frames to other wireless communication stations (wireless stations).

Next, timings at which the transmission right acquiring wireless communication station (wireless access point AP1) transmits frames will be described. FIG. 3 is a time chart illustrating a frame sequence when the transmission right acquiring wireless communication station (wireless access point AP1) transmits a plurality of frames to other wireless communication stations (wireless stations). In FIG. 3, the horizontal axis represents time, and the vertical axis for each wireless communication station represents channels for use in data transmission, which are channel 1 (CH1), channel 2 (CH2), channel 3 (CH3), and channel 4 (CH4) from the bottom for each of the wireless communication stations. In the following drawings illustrating frame sequences, only relevant wireless stations (wireless stations STA11 to STA14 in FIG. 3) are illustrated. In addition, the notation such as "(STA14)" within the frame represents a destination wireless communication station and "(STA14)" represents that the destination is the wireless station STA14.

When data for the wireless stations STA11 to STA14 is generated, first, the wireless access point AP1 performs CSMA/CA (carrier sense) and acquires a transmission right (TXOP) after confirming that there is no signal transmitted from the other wireless communication stations (wireless stations STA11 to STA15) over the predetermined sensing period and the random back-off period. Because the wireless access point AP1 has acquired the transmission right, the wireless access point AP1 serves as a transmission right acquiring wireless communication station and performs frame transmission.

Although the destination of the first frame within a packet queue (buffer) of the wireless access point AP1 is the wireless station STA11, a channel available to the wireless station STA11 is only channel 1 (primary channel), and thus the wireless access point AP1 transmits RTS frames F1 to F4 as start frames for the wireless station STA14 capable of communicating on more channels (time $t_{111}$). Here, the wireless access point AP1 transmits the RTS frames to be transmitted in the duplicate mode prescribed in the IEEE 802.11n or 802.11ac standard, that is, a signal of a 20 MHz channel bandwidth is transmitted in all available 20 MHz width channels (here, four 20 MHz width channels).

In response thereto, the wireless stations STA11 to STA14 receive the RTS frames transmitted from the wireless access point AP1. Each of the wireless stations STA11 to STA13 sets a period represented by continuous use period information (Duration) included in the received RTS frames as a NAV period and prevents frame transmission from being performed in the NAV period because the RTS frames which are not addressed to the apparatus itself has been received. In addition, the wireless stations STA11 to STA13 also store the fact that a transmission-source station (wireless access point AP1) of the received RTS frames is a wireless communication station acquiring the TXOP in the information managing unit 23.

When the RTS frames are received from the wireless access point AP1, the wireless station STA14 detects that the destination of the received RTS frames is the apparatus itself and replies CTS frames F5 to F8 to the wireless access point AP1 on channels in which no NAV is set or channels in which no signal is detected over a predetermined period (time $t_{112}$).

When the CTS frames are received from the wireless station STA14, the wireless access point AP1 transmits frames F9 to F11 for the wireless stations STA11 and STA14 using the OFDMA (time $t_{113}$). Here, the wireless access point AP1 transmits, to the primary wireless communication station, relevant frames using all bands available to the primary wireless communication station. In the remaining bands, the guard band is provided, if necessary, and frames of the wireless station STA14 are transmitted for the wireless station STA14 on the remaining channels. In FIG. 3, the frame is transmitted for the wireless station STA11 on channel 1, channel 2 is unused for the guard band, and the frames are transmitted to the wireless station STA14 on channels 3 and 4.

If the frame for the apparatus itself is correctly received from the wireless access point AP1, the wireless station STA11 transmits a BA frame F12 (or ACK frame) to the wireless access point AP1 (time $t_{114}$), and ends transmission and reception of the frame. At this time, the wireless station STA11 replies the BA on the same channel as that of the signal received from the wireless access point AP1.

In contrast, if the frames for the apparatus itself are correctly received from the wireless access point AP1, the wireless station STA14 transmits BA frames F13 and F14 (or ACK frames) to the wireless access point AP1 (time $t_{114}$), and ends transmission and reception of the frames. The wireless station STA14 replies the BAs on the same secondary channel group as that of the signals received from the wireless access point AP1.

Although the legacy RTS/CTS exchange is used to prevent access by the other stations, the above-described RTS/CTS exchange makes it possible to prevent the access by the other stations and confirm a band to be used for each wireless station using the OFDMA.

Next, a modified example of the frame sequence illustrated in FIG. 3 will be described. The description of the modified example will be given by dividing the frame sequence into a frame sequence when MAC protection is performed, a frame sequence when data transmission is performed, and a frame sequence when an acknowledgement is performed.

<Frame Sequence when MAC Protection is Performed>

Figure 4:
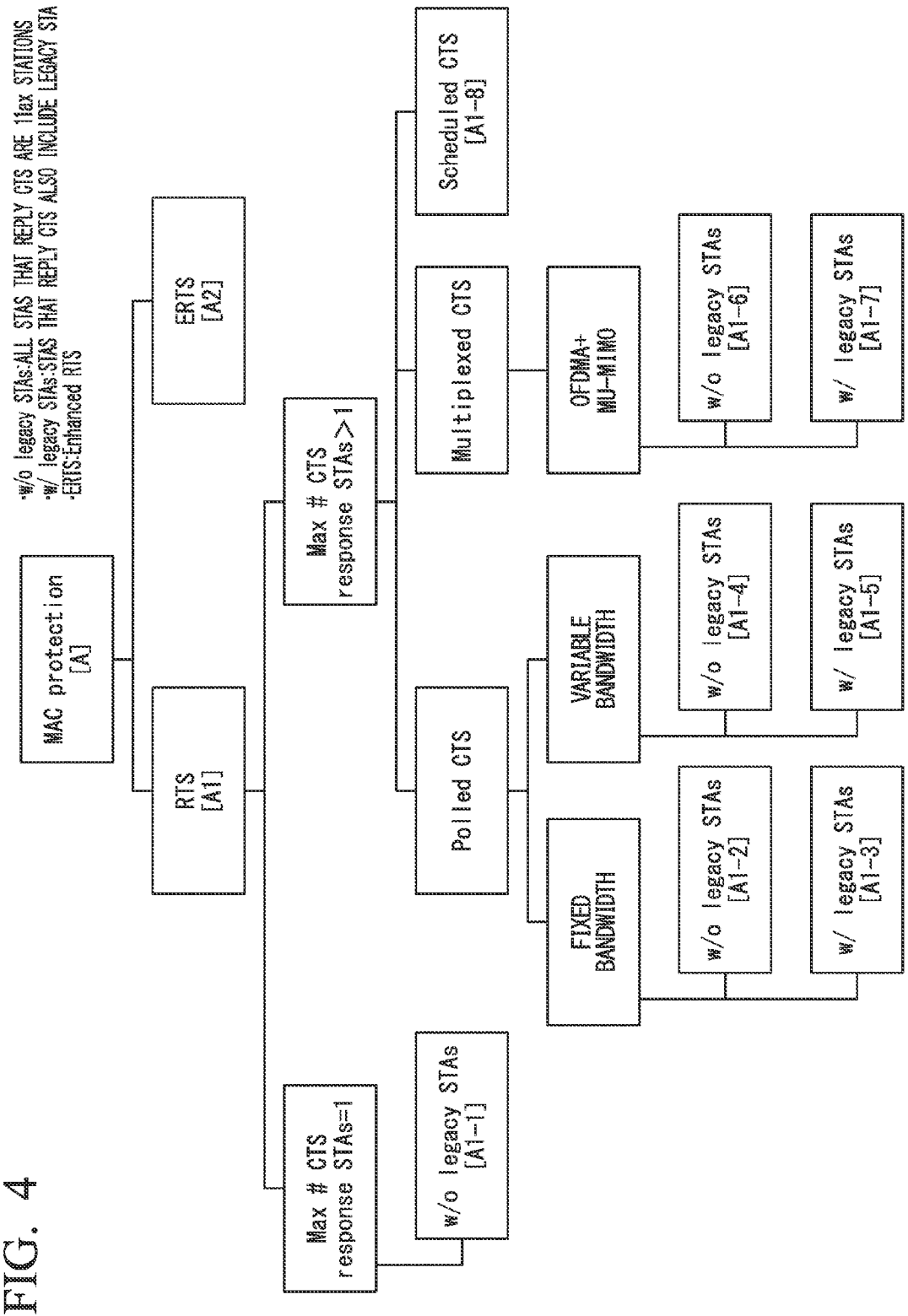
FIG. 4 is a diagram illustrating classifications of MAC protection.

Next, the modified example of the frame sequence illustrated in FIG. 3 when the MAC protection is performed will be described. First, classifications of the MAC protection will be described with reference to FIG. 4. FIG. 4 is a diagram illustrating the classifications of the MAC protection. As illustrated in FIG. 4, the MAC protection (its identification name is denoted as "A") can be classified into the case (its identification name is denoted as "A1") in which a normal RTS is used and the case (its identification name is denoted as "A2") in which an extended RTS (referred to as enhanced RTS (ERTS)) is used. The case (A1) in which the normal RTS is used can be subdivided into A1-1, A1-2, A1-3, A1-4, A1-5, A1-6, A1-7, and A1-8. Hereinafter, a description will be given based on these classifications. It is to be noted that the case (A2) in which the ERTS is used will be described later.

<A1-1>

Figure 5:
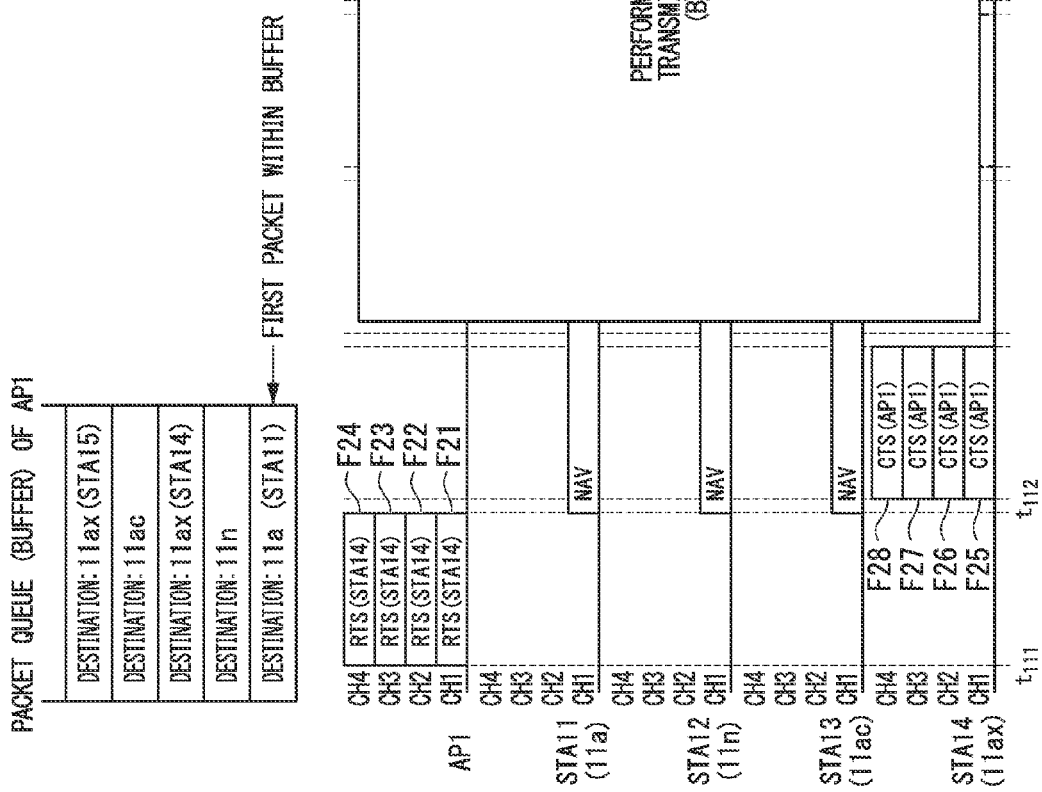
FIG. 5 is a time chart illustrating a frame sequence when the number of responding wireless stations is 1 and a wireless station that replies CTS is an 11ax wireless station (that can handle OFDMA).

First, a frame sequence (A1-1 illustrated in FIG. 4) when the number of responding wireless stations is 1 and a wireless station that replies CTSs is an 11ax wireless station will be described with reference to FIG. 5. FIG. 5 is a time chart illustrating the frame sequence when the number of responding wireless stations is 1 and the wireless station that replies CTSs is an 11ax wireless station. When the modified example of the frame sequence is described, only the differences from the above-described frame sequence illustrated in FIG. 3 will be described and a detailed description of an operation equivalent to that of the frame sequence illustrated in FIG. 3 will be omitted.

When the number of responding wireless stations is 1 and the wireless station that replies CTSs is the 11ax wireless station, although the first packet of a buffer is addressed to the 11a wireless station, the wireless station AP1 first transmits RTS frames F21 to F24 (a non-HT duplicate mode and a dynamic BW mode) via all channels each having a 20 MHz for the 11ax wireless station (wireless station STA14) and reserves a larger band (time $t_{11}$). Here, the non-HT duplicate mode is a mode in which a signal of 20 MHz is duplicated in a frequency domain, signals are transmitted in parallel, and all signals can be decoded by receiving only any 20 MHz. In addition, the dynamic BW mode is a mode in which a reply of a CTS is sent on a non-busy channel among channels provided by a notification with the RTSs. In response thereto, the wireless station STA14 replies CTS frames F25 to F28 via all channels (time $t_{112}$). This frame sequence is equivalent to that illustrated in FIG. 3.

<A1-2>

Figure 6:
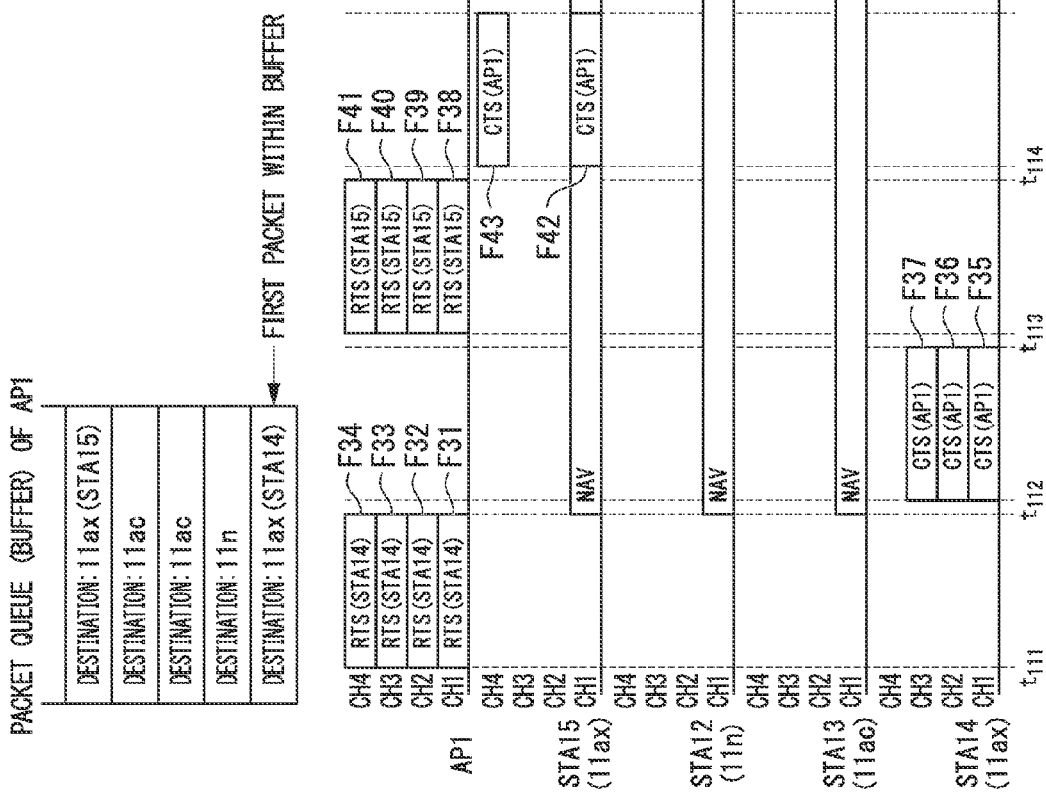
FIG. 6 is a time chart illustrating a frame sequence when the number of responding wireless stations is two or more, RTS frames are transmitted for wireless stations using the same bandwidth, and all the wireless stations that reply CTSs are (11ax) stations that can handle OFDMA.

Next, a frame sequence (A1-2 illustrated in FIG. 4) when the number of responding wireless stations is two or more, RTS frames using the same bandwidth are transmitted for the wireless stations, and all the wireless stations that reply CTSs are (11ax) stations that can handle OFDMA will be described with reference to FIG. 6. Here, the same bandwidth means that signals for the MAC protection is always transmitted on the entire band used when the MAC protection is applied (at the time of RTS transmission) in the TXOP section. FIG. 6 is a time chart illustrating a frame sequence when the number of responding wireless stations is two or more, RTS frames using the same bandwidth are transmitted for the wireless stations, and all the wireless stations that reply CTSs are (11ax) stations that can handle OFDMA. A query about a use situation of the channels is sent to the wireless stations that can handle the OFDMA using RTSs, resources are secured in a larger band, and the resources are redistributed to other stations. At this time, the wireless access point AP1 always transmits (in a fixed bandwidth) frames on a set of channels used in initial frame transmission. It is to be noted that FIG. 6 is a frame sequence when the number of responding stations is two or more, but illustrates only two responding wireless stations. It is possible to apply a similar frame sequence even when the number of responding stations is three or more. The same is true in the following description also in the frame sequences in which the number of responding stations is two or more.

First, the wireless access point AP1 transmits RTS frames F31 to F34 (a non-HT duplicate mode and a dynamic BW mode) via all channels each having a 20 MHz for the 11ax wireless station STA14 and reserves a larger band (time $t_{111}$). In response thereto, the wireless station STA14 replies CTS frames F35 to F37 (time $t_{112}$). Although the wireless access point AP1 receives the CTSs in part of the bands (e.g., the wireless access point STA14 detects interference in CH4), the wireless access point AP1 transmits RTS frames F38 to F41 to the other wireless station (here, the wireless station STA15) in the entire band again (time $t_{113}$). In response thereto, the wireless station STA15 replies CTS frames F42 and F43 (time $t_{114}$).

In this manner, when there is no CTS reply on part of the channels (CH4) from the destination communication station (wireless station STA14) of the RTS frames, it is possible to reconfirm whether frame transmission on a channel on which there is no CTS reply is possible by transmitting RTSs on all channels (fixed bandwidth mode) used in immediately previous transmission of the RTS frames to the other wireless communication station (wireless station STA15).

<A1-3(1)>

Figure 7:
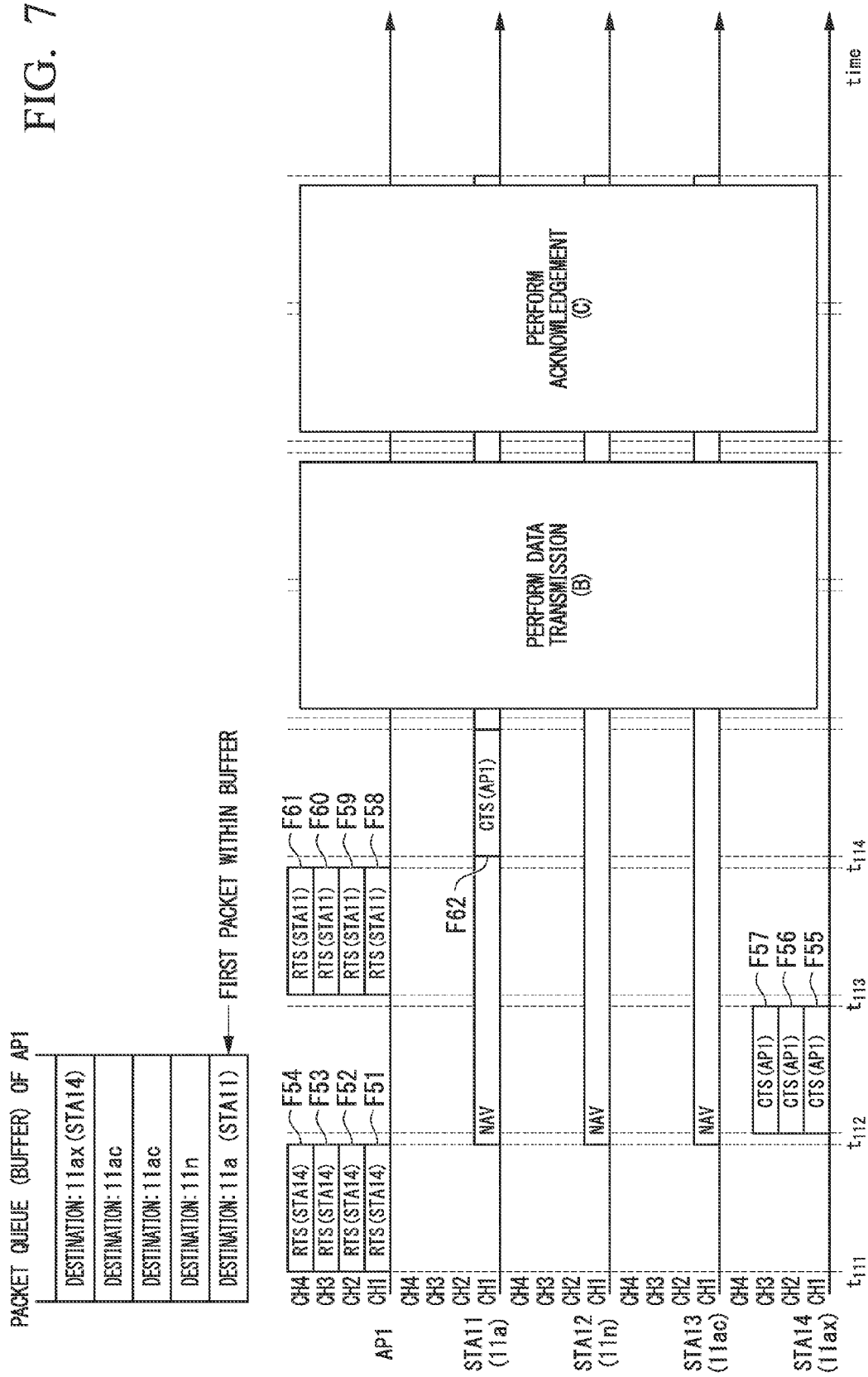
FIG. 7 is a time chart illustrating a frame sequence when the number of responding wireless stations is two or more, RTS frames using the same bandwidth are transmitted for wireless stations, and a legacy station, which cannot handle the OFDMA, is also included in wireless stations that reply CTSs.

Next, a frame sequence (A1-3 illustrated in FIG. 4) when the number of responding wireless stations is two or more, RTS frames are transmitted for the wireless stations using the same bandwidth, and a legacy station, which cannot handle the OFDMA, is also included in wireless stations that reply CTSs will be described with reference to FIG. 7. FIG. 7 is a time chart illustrating the frame sequence when the number of responding wireless stations is two or more, the RTS frames are transmitted for the wireless stations using the same bandwidth, and the legacy station, which cannot handle the OFDMA, is also included in the wireless stations that reply CTSs.

Although a first packet of a packet queue of the wireless access point AP1 is addressed to an 11a wireless station, the wireless access point AP1 first transmits RTS frames F51 to F54 (the non-HT duplicate mode and the dynamic BW mode) via all channels each having a 20 MHz for the 11ax wireless station STA14 and reserves a larger band (time $t_{111}$). In response thereto, the wireless station STA14 replies CTS frames F55 to F57 (time $t_{112}$).

Next, the wireless access point AP1 transmits RTS frames F58 to F61 for checking whether it is possible to transmit data for the 11a wireless station STA11 (time $t_{113}$). The stations that can handle 11e, 11s, and 11n also store the TXOP holder when they set the NAVs, and thus they return responses if there is a call from the TXOP holder even when the NAVs are set. In response to the RTSs, the wireless station STA11 replies a CTS frame F62 (time $t_{114}$).

In this manner, after the RTS frames are transmitted to the secondary wireless communication station on all channels and the CTS replies are sent, exchange of an RTS and a CTS is performed again even for the primary wireless communication station. Although the primary wireless communication station can use only part of the channels (in this example, only CH1 can be used), the wireless access point AP1, which is the transmission right acquiring communication station, transmits RTSs to also the primary wireless communication station on all channels and prevent the interruption in the secondary channels from being caused by a third wireless communication station.

<A1-3 (2)>

Figure 8:
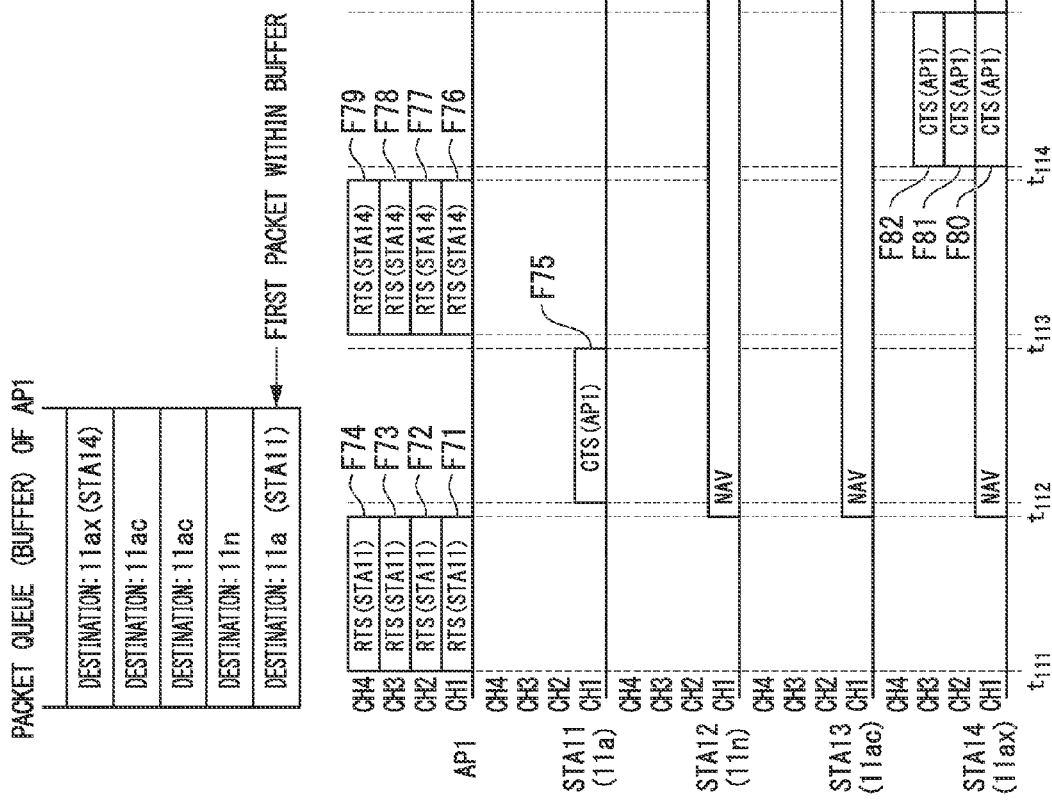
FIG. 8 is a time chart illustrating a modified example of the frame sequence illustrated in FIG. 7.

Next, a modified example of the frame sequence illustrated in FIG. 7 will be described with reference to FIG. 8. FIG. 8 is a time chart illustrating the modified example of the frame sequence illustrated in FIG. 7. In the frame sequence illustrated in FIG. 8, first, RTSs are transmitted to a legacy station on all channels.

The wireless access point AP1 transmits RTS frames F71 to F74 (the non-HT duplicate mode) via all channels each having a 20 MHz for the 11a wireless station STA11 and reserves a larger band (time $t_{111}$). In response thereto, the wireless station STA11 replies a CTS frame F75 (time $t_{112}$). Next, RTS frames F76 to F79 are transmitted for the 11ax wireless station STA14 (the non-HT duplicate mode and the dynamic mode) and it is determined whether there is a secondary channel that can perform reception using the OFDMA (time $t_{113}$). In response thereto, the wireless station STA14 replies CTS frames F80 and F82 (time $t_{114}$).

In this manner, when there is no CTS reply from the destination communication station of the RTS frames on part of the channels, it is possible to reconfirm whether frame transmission on a channel in which there is no CTS reply is possible by transmitting RTSs on all channels (fixed bandwidth mode) used in immediately previous RTS frame transmission to another wireless communication station.

<A1-8>

Figure 9:
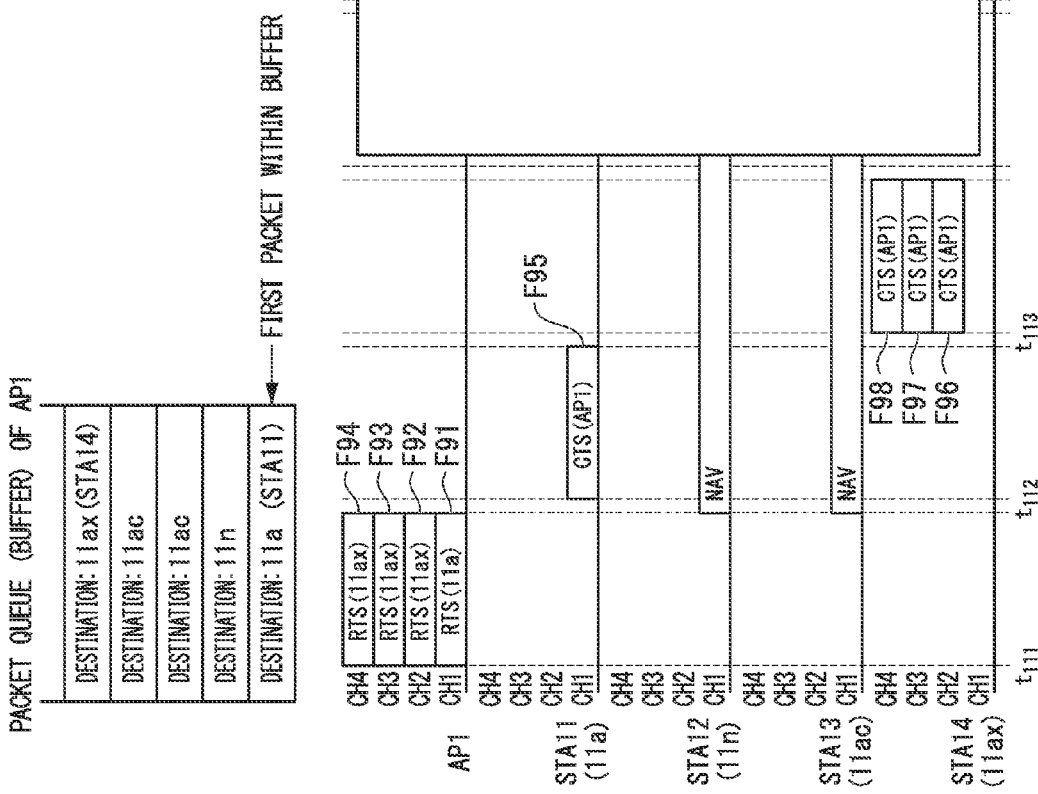
FIG. 9 is a time chart illustrating a frame sequence when the number of wireless stations that respond to RTS frames transmitted by the OFDMA is two or more and a reply of CTS frame(s) is sent at a predetermined time on a channel through which each wireless station has received RTS(s) for each station itself.

Next, a frame sequence (A1-8 illustrated in FIG. 4) when the number of wireless stations that respond to RTS frames transmitted using the OFDMA is two or more and replies of CTS frames are sent at predetermined times will be described with reference to FIG. 9. FIG. 9 is a time chart illustrating the frame sequence when the number of wireless stations that respond to the RTS frames transmitted using the OFDMA is two or more and the replies of the CTS frames are sent at predetermined times. A scheduling-type CTS reply is made using the legacy RTS. When the RTSs are received on the secondary, the 11ax wireless station replies CTSs after a (CTS+2SIFS) period.

First, the wireless access point AP1 allocates an RTS frame F91 for the legacy station to the primary channel, allocates RTS frames F92 to F94 for the 11ax wireless station to the secondary channels, and transmits the RTS frames using the OFDMA (time $t_{111}$). In response thereto, the wireless station STA11 replies a CTS frame F95, and the 11ax wireless station STA14 determines whether there is RTS frames for the 11ax wireless station on the secondary channels from the RTS frame on the primary channel and replies CTS frames F96 to F98.

Figure 10:
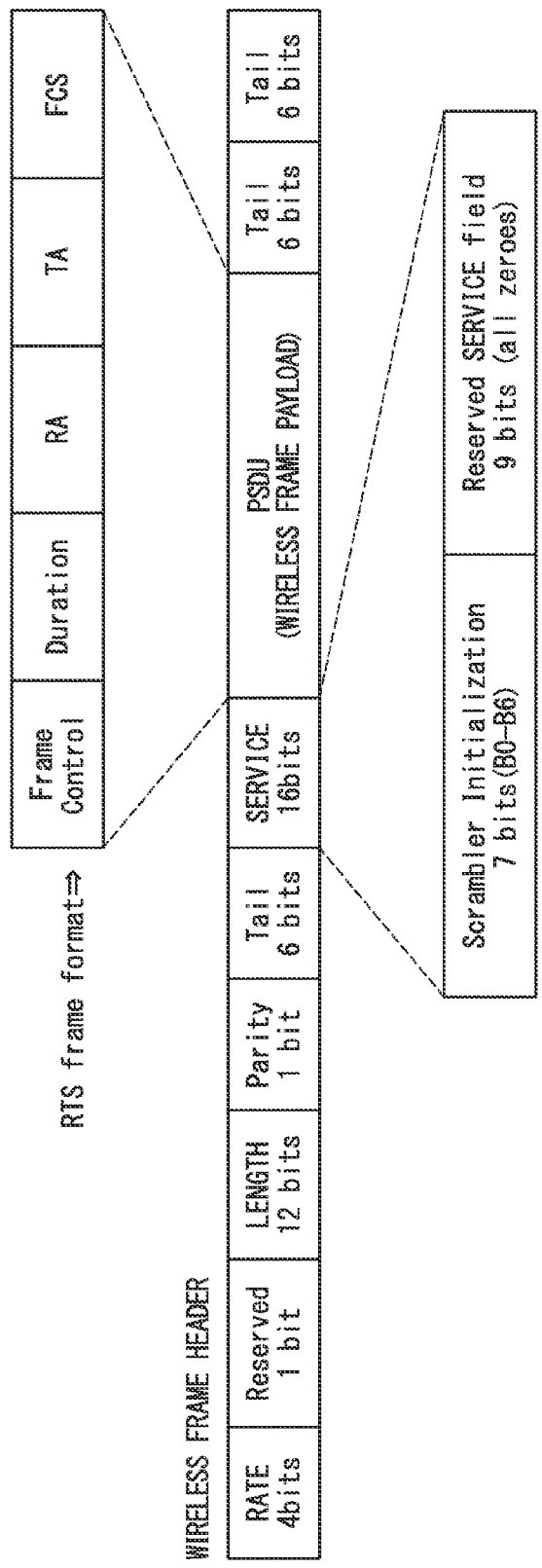
FIG. 10 is a diagram illustrating a format of an RTS frame.

Here, a format of an RTS frame will be described with reference to FIG. 10. FIG. 10 is a diagram illustrating the format of the RTS frame. In the RTS frame, the notification of a channel bandwidth and a static/dynamic BW mode in which the RTS frame is copied is provided using scrambler initialization of a wireless frame header and TA of a payload portion.

The scrambler initialization portion is set to all zeroes in the 11a/n wireless communication stations and it is set to all zeroes if the head of the TA is zero in the 11ac wireless communication station. If the head of the TA is 1, the notification of the RTS bandwidth and the static/dynamic BW is provided in accordance with Table 1.

TABLE 1

| Transmission/reception | Conditions of transmitting STA and receiving STA | Format of 7 bits of scrambler initialization portion | | |
|---|---|---|---|---|
| | | B0 to B3 | B4 | B5 B6 |
| At the time of transmission | Only static BW is supported | Random sequence (that does not make B0 to B6 all zeroes) | | Bandwidth in which RTS frame is transmitted (20/40/60/80/160 MHz) |
| | Dynamic BW is supported | Random sequence (that does not make B0 to B6 all zeroes) | It is indicated whether CTS frame of dynamic BW is requested | |
| At the time of reception | Dynamic BW is supported | (No reference) | It is indicated whether CTS frame of dynamic BW is requested through received RTS frame | Transmission bandwidth indicated in RTS frame |

In the present embodiment, B1 to B3 of the scrambler initialization portion are used as an example of a method for notifying whether an RTS frame different from that of the primary channel is transmitted in accordance with OFDMA on a secondary channel using an RTS of the primary channel. In the 11ax wireless station, B1 to B3 are set to all zeroes if the head (individual/group bit) of the TA is 0. If the head of the TA is 1, the notification of the RTS bandwidth, the static/dynamic BW, and whether the RTS frame of the secondary channel is different from that of the primary channel is provided in accordance with the following format. For example, in the case of 80 MHz, an extension shown in Table 2 is performed. Because the legacy station, which does not support OFDMA communication of an RTS frame, decodes only the RTS frame of the primary channel and sets the NAV without referring to information of B0 to B3, backward compatibility can be secured.

TABLE 2

| Transmission/reception | Conditions of transmitting STA and receiving STA | | B0 | B1 to B3 | B4 | B5 B6 |
|---|---|---|---|---|---|---|
| At the time of transmission | Only static BW is supported | | Random sequence (that does not make B0 to B6 all zeroes) | | | Bandwidth in which RTS frame is transmitted |
| | Dynamic BW is supported | OFDMA transmission of RTS frame is not supported | Random sequence (B0 to B6 are set so that B0 to B6 are not all zeroes) | | It is indicated whether CTS frame of dynamic BW is requested | |
| | | OFDMA transmission of RTS frame is supported | Random sequence (B0 to B6 are set so that B0 to B6 are not all zeroes) | It is reported whether there is RTS frame different from that of primary channel in each secondary channel other than primary channel | | |
| At the time of reception | Dynamic BW is supported | OFDMA transmission of RTS frame is not supported | | (No reference) | It is indicated whether CTS frame of dynamic BW is requested through received RTS frame | Transmission bandwidth indicated in RTS frame |
| | | OFDMA transmission of RTS frame is supported | No reference | It is determined whether there is RTS frame different from that of primary channel in each secondary channel other than primary channel | | |

Next, examples of formats of B1 to B3 will be described. For each of 20 MHz sub-channels in order from a lower band in the entire band of an RTS frame, if the same RTS as that of the primary channel is transmitted using the OFDMA, 1 is input; otherwise (if the same RTS frame is transmitted), 0 is input. One-bit information indicating whether there are one or more pieces of RTSs on all secondary channels other than the primary channel may be input.

On the receiver end, the 11ax wireless station receiving an RTS frame in which the first address of the TA is 1 on the primary channel refers to B1 to B3 of the scrambler initialization portion and determines whether there is an RTS frame different from that of the primary channel on the secondary channels. Then, information of the secondary channels is also decoded if it is present, and the 11ax wireless station replies CTS frames via all or part of the channels if the RTS frames are addressed to the station itself.

In this manner, it is possible to check whether frame transmission for all destination stations is possible using a single RTS frame and reduce the overhead of wireless channels by transmitting an RTS frame to request a destination station conforming to an existing standard (IEEE 802.11a, 11n, or 11ac) to transmit a CTS frame via the primary channel and requesting a destination station that can handle OFDMA to transmit CTS frames via the secondary channels.

<A1-4>

Figure 11:
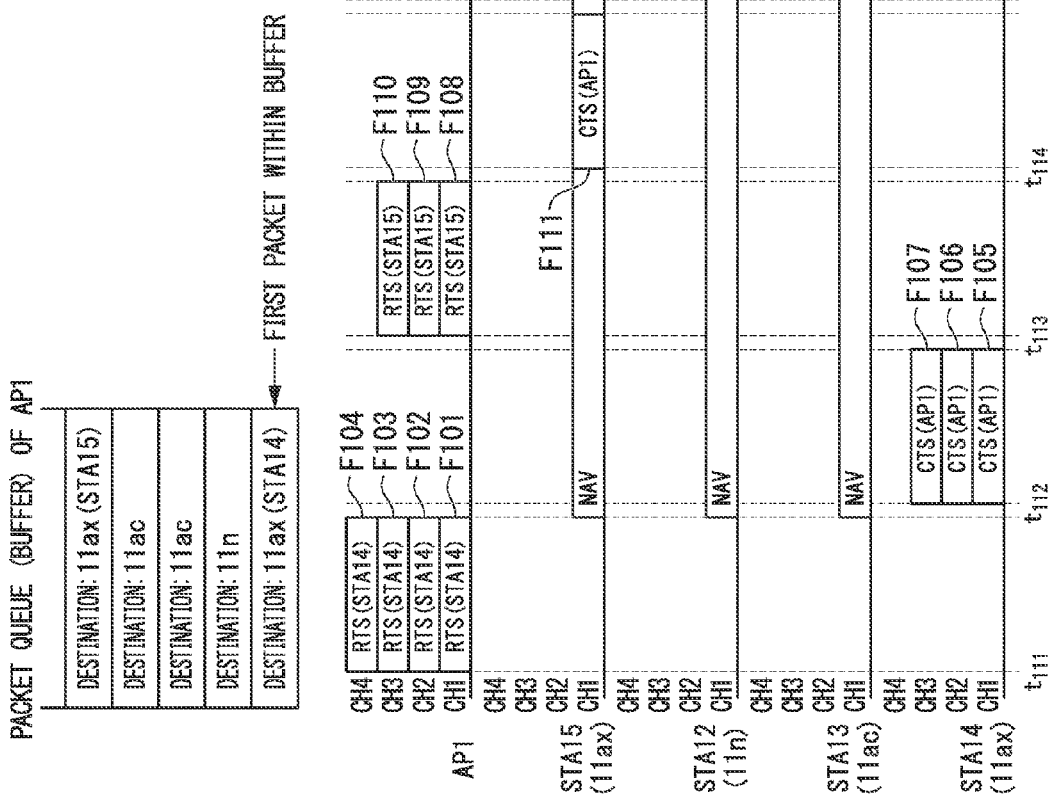
FIG. 11 is a time chart illustrating a frame sequence when the number of responding wireless stations is two or more, RTS frames are transmitted for wireless stations, all wireless stations that reply CTSs are 11ax wireless stations, and transmission bandwidths of second and subsequent RTS frames are set to be less than or equal to a bandwidth confirmed with immediately previously received CTS frames.

Next, a frame sequence (A1-4 illustrated in FIG. 4) when the number of responding wireless stations is two or more, RTS frames are transmitted to the wireless stations, all wireless stations that reply CTSs are 11ax wireless stations, and transmission bandwidths of second and subsequent RTS frames are set to be less than or equal to a bandwidth confirmed in an immediately previously received CTS frame will be described with reference to FIG. 11. FIG. 11 is a time chart illustrating the frame sequence when the number of responding wireless stations is two or more, the RTS frames are transmitted to the wireless stations, all the wireless stations that reply the CTSs are the 11ax wireless stations, and the transmission bandwidths of the second and subsequent RTS frames are set to be less than or equal to the bandwidth confirmed in the immediately previously received CTS frame. Resources in a larger band is secured, the resources are redistributed to other stations, and the wireless access point AP1 determines that a channel on which there is no CTS reply is busy and prevents RTS transmission from being performed on the busy channel, thereby realizing a variable bandwidth.

First, the wireless access point AP1 transmits RTS frames F101 to F104 (the non-HT duplicate mode and the dynamic BW mode) via all channels each having a 20 MHz for the 11ax wireless station STA14 and reserves a larger band (time $t_{111}$). In response thereto, the wireless station STA14 replies CTS frames F105 to F107 (time $t_{112}$). Then, the wireless access point AP1 determines that a channel on which there is no CTS reply is busy and transmits RTS frames F108 to F110 so that no RTS transmission is performed on the busy channel (time $t_{113}$). In response thereto, the wireless station STA15 replies a CTS frame F111 (time $t_{114}$).

In this manner, it is possible realize a variable bandwidth mode in which a channel width used by the wireless access point AP1 is reduced (limited) as compared to A1-2. When the wireless station STA14 replies CTSs on only channels 1 to 3 for RTSs by the wireless access point AP1, the wireless access point AP1 transmits the next RTS frames only on channels 1 to 3. That is, the RTS frames are transmitted again to the different wireless station STA15 only on channels in which there are CTS replies without using a channel on which there is no CTS reply.

<A1-5>

Figure 12:
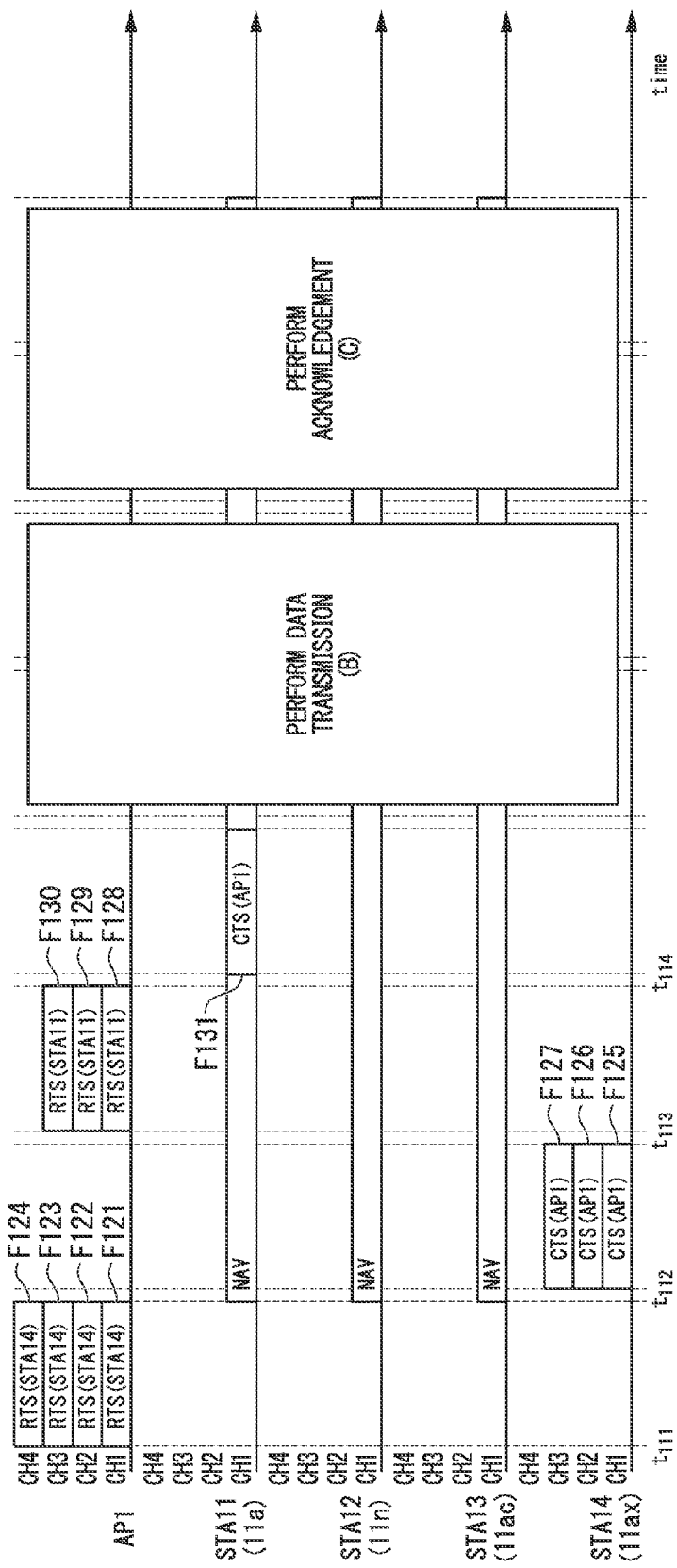
FIG. 12 is a time chart illustrating a frame sequence when the number of responding wireless stations is two or more, RTS frames are transmitted for wireless stations, a legacy station is also included in wireless stations that reply CTSs, and transmission bandwidths of second and subsequent RTS frames are set to be less than or equal to a bandwidth confirmed with immediately previously received CTS frames.

Next, a frame sequence (A1-5 illustrated in FIG. 4) when the number of responding wireless stations is two or more, RTS frames are transmitted to the wireless stations, a legacy station is also included in wireless stations that reply a CTS, and transmission bandwidths of second and subsequent RTS frames are set to be less than or equal to a bandwidth confirmed in an immediately previously received CTS frame will be described with reference to FIG. 12. FIG. 12 is a time chart illustrating the frame sequence when the number of responding wireless stations is two or more, the RTS frames are transmitted to the wireless stations, the legacy station is also included in the wireless stations that reply the CTSs, and the transmission bandwidths of the second and subsequent RTS frames are set to be less than or equal to the bandwidth confirmed in the immediately previously received CTS frame. This is substantially the same as A1-4, but is a frame sequence when there is a wireless communication station (legacy station) which cannot use the OFDMA.

Although a first packet of a packet queue of the wireless access point AP1 is addressed to the 11a wireless station, the wireless access point AP1 transmits RTS frames F121 to F124 (the non-HT duplicate mode and the dynamic BW mode) via all channels each having a 20 MHz for the 11ax wireless station STA14 and reserves a larger band (time $t_{111}$). In response thereto, the wireless station STA14 replies CTS frames F125 to F127 (time $t_{112}$).

Next, the wireless access point AP1 transmits RTS frames F128 to F130 for checking whether it is possible to transmit data for the 11a wireless station STA11 (time $t_{113}$). In response thereto, the wireless station STA11 replies a CTS frame F131 (time $t_{114}$).

In this manner, it is checked whether a destination station that is capable of making a reply in which a band is dynamically set can perform frame transmission in the front of the sequence and secured resources are re-distributed to another station. It is possible to re-distribute the resources to both a destination station that can handle OFDMA in which the bandwidth can be variably set and a destination station of the existing standard (11a or 11n) in which the bandwidth is fixed.

<A1-6(1)>

Figure 13:
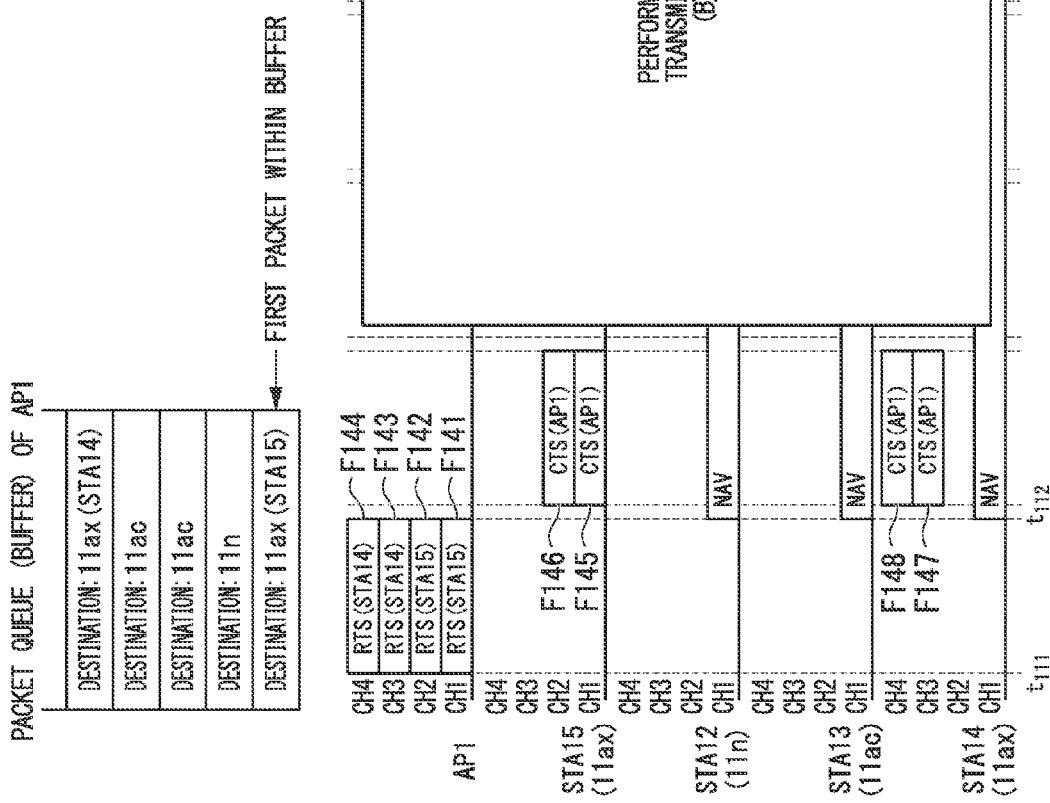
FIG. 13 is a time chart illustrating a frame sequence when the number of responding wireless stations is two or more, all wireless stations that reply CTSs are 11ax wireless stations, and CTS frames are transmitted using OFDMA.

Next, a frame sequence (A1-6 illustrated in FIG. 4) when the number of responding wireless stations is two or more, all wireless stations that reply CTSs are 11ax wireless stations, and the CTSs are transmitted using the OFDMA will be described with reference to FIG. 13. FIG. 13 is a time chart illustrating a frame sequence when the number of responding wireless stations is two or more, all the wireless stations that reply the CTSs are the 11ax wireless stations, and the CTSs are transmitted using the OFDMA. CTS multiplexing is applied using UL-OFDMA, and RTSs and CTSs are exchanged in the form in which a channel is associated with a wireless station. The UL-OFDMA is known technology disclosed in the Document K. Kim, et al., "Joint Subcarrier and Power Allocation in Uplink OFDMA Systems", IEEE Communications Letters, Vol. 9, No. 6, June 2005. Although there is no field for identifying a transmission-source station in the CTS frame, the wireless access point AP1 identifies the transmission-source wireless station by referring to a channel on which the CTS is received.

First, the wireless access point AP1 simultaneously transmits RTS frames F143 and F144 for the wireless station STA14 and RTS frames F141 and F142 for the wireless station STA15 using the OFDMA (time $t_{111}$). In response thereto, the wireless stations STA14 and STA15 reply CTS frames F145 to F148 (time $t_{112}$).

In this manner, the RTS frames are transmitted for different wireless stations using downlink OFDMA. Each of the wireless stations STA14 and STA15 receiving the RTS frames replies the CTSs using uplink OFDMA. Because each wireless communication station replies the CTSs only on channels on which the RTS frames are received, it is possible to simultaneously transmit the CTS frames.

<A1-6(2)>

Figure 14:
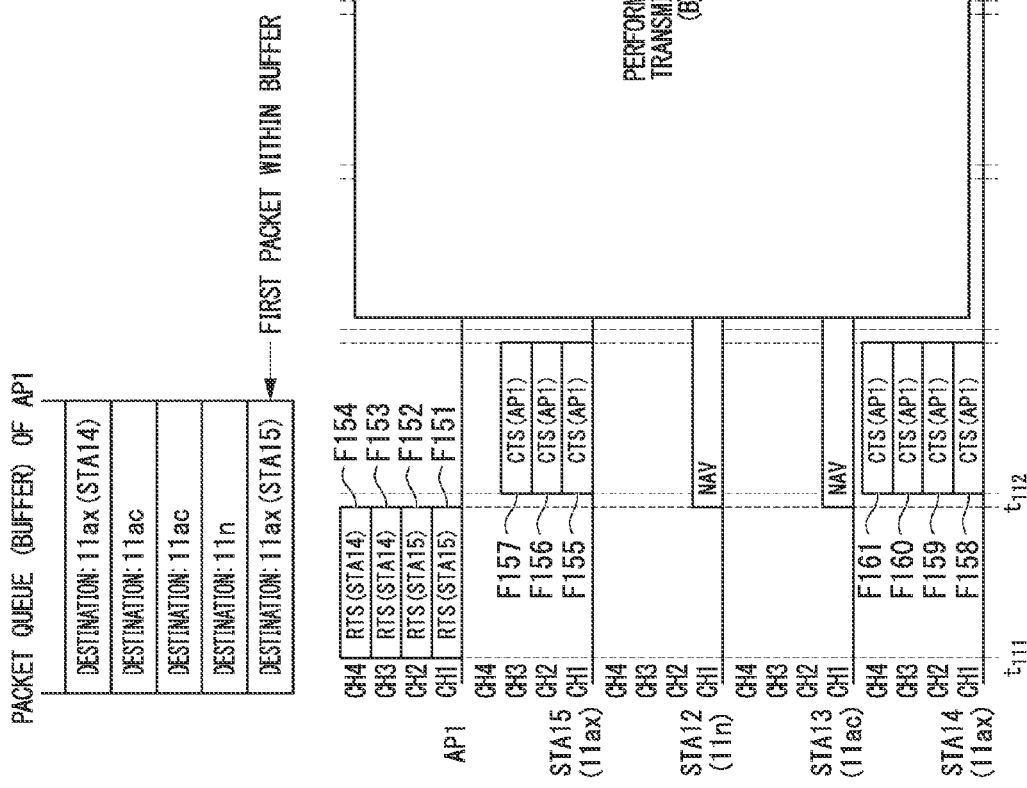
FIG. 14 is a time chart illustrating a frame sequence when the number of responding wireless stations is two or more, all wireless stations that reply CTSs are 11ax wireless stations, and CTS frames are transmitted using MU-MIMO.

Next, a modified example of the frame sequence illustrated in FIG. 13 will be described with reference to FIG. 14. FIG. 14 is a time chart illustrating a frame sequence when the number of responding wireless stations is two or more, all wireless stations that reply CTSs are 11ax wireless stations, and CTS frames are transmitted using MU-MIMO. CTS multiplexing is performed using UL-OFDMA and SDMA, and a transmission-source wireless station is identified by signal processing using CSD in PHY because there is no field for identifying the transmission-source station in the CTS frames and therefore it is difficult for the wireless access point AP1 to identify a wireless station which has replied the CTSs.

First, the wireless access point AP1 simultaneously transmits RTS frames F153 and F154 for the wireless station STA14 and RTS frames F151 and F152 for the wireless station STA15 using the OFDMA (time $t_{111}$). In response thereto, the 11ax wireless station STA14 replies CTS frames F158 to F161 on all available channels and the 11ax wireless station STA 15 replies CTS frames F155 to F157 on all available channels (time $t_{112}$).

Figure 15:
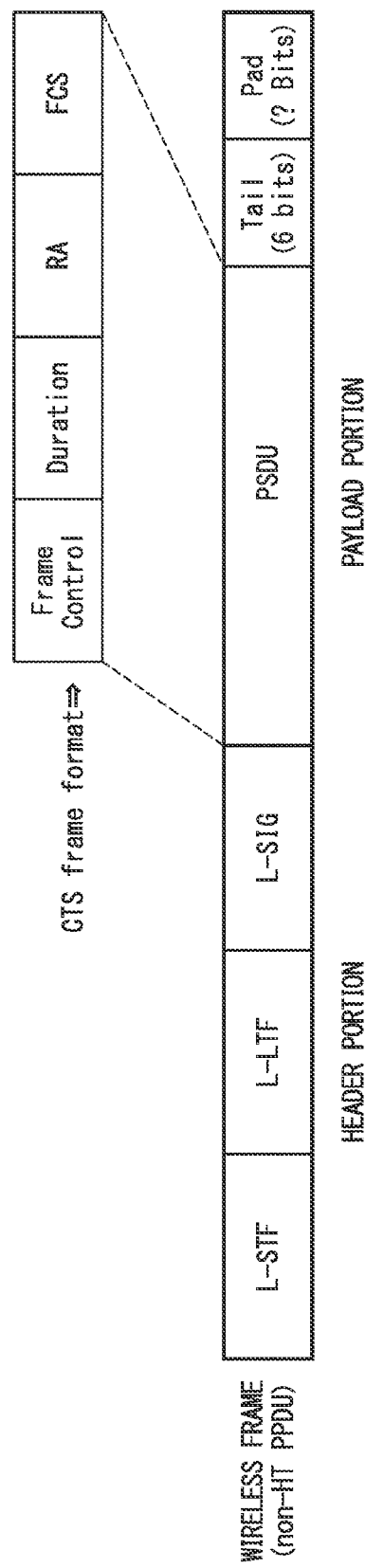
FIG. 15 is a diagram illustrating a format of a CTS frame in 11a/n/ac.

Here, a CTS frame for use in a CTS reply will be described. FIG. 15 is a diagram illustrating a format of a CTS frame in 11a/n/ac. It is impossible to merely use the CTS frame illustrated in FIG. 15 in spatial multiplexing transmission. The reason is that because only an L-LTF is used for channel estimation and there is substantially only information for one OFDM symbol, there is no orthogonality between spatial streams, separation is impossible, it is impossible to estimate MIMO channels, and it is also impossible to correctly decode a subsequent payload portion. Because it is impossible to perform identification using a header portion of a non-HT PPDU, the header portion is changed here. Specifically, a VHT frame format is utilized.

Figure 16:
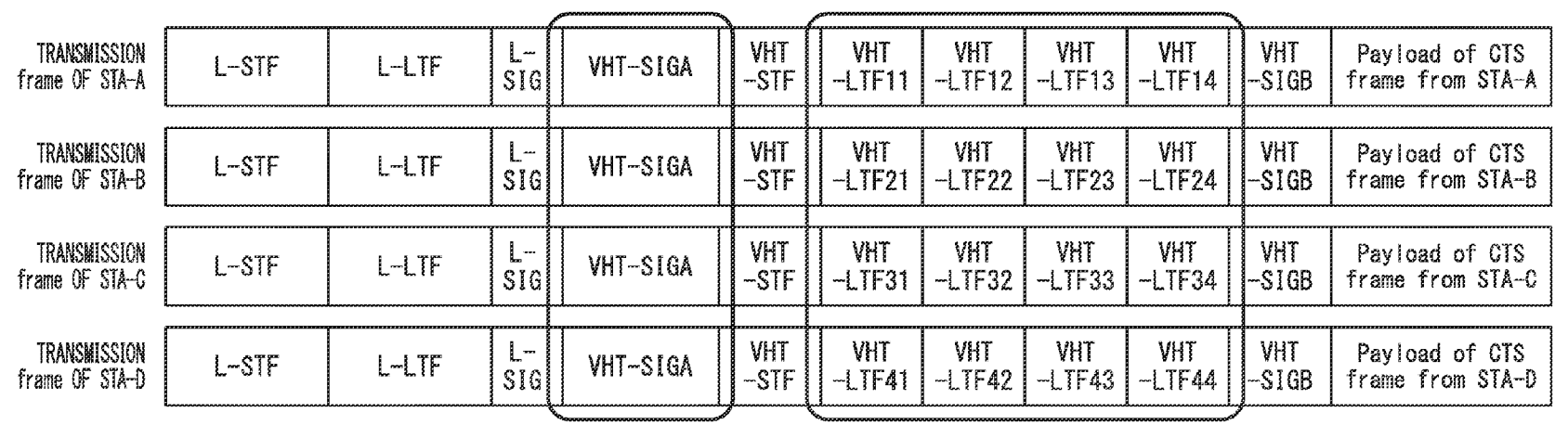

FIG. 16 is a diagram illustrating a format of a transmission frame when four wireless stations (STAs) perform space multiplexing transmission of CTS frames. In order to realize the spatial multiplexing transmission, the following two pieces of information are included in VHT-SIG-A. The first information is list information of wireless stations that simultaneously transmit or information (e.g., a group ID) based on the list information. In addition, the second information is the number of spatial streams to be transmitted by each wireless station and numbers thereof. In the example illustrated in FIG. 16, a wireless station (STA-A) transmits one stream (first spatial stream), a wireless station (STA-B) transmits one stream (second spatial stream), a wireless station (STA-C) transmits one stream (third spatial stream), and a wireless station (STA-D) transmits one stream (fourth spatial stream). It is possible to perform SISO decoding on a received signal in which a plurality of signals are superposed by setting the same information in VHT-SIG-A for all spatial streams. The wireless access point refers to this information and decodes a UL-MU-MIMO signal.

In addition, each wireless station performs transmission using a prescribed pattern so that a 4×4 matrix of each subcarrier constituted of 16 fields of VHT-LTF11 to VHT-LTF44 has an inverse matrix. An example corresponding to FIG. 16 is as follows.

VHT-LTF11=+1
VHT-LTF12=+1
VHT-LTF13=−1
VHT-LTF14=+1
VHT-LTF21=+1
VHT-LTF22=−1
VHT-LTF23=+1
VHT-LTF24=+1
VHT-LTF31=−1
VHT-LTF32=+1
VHT-LTF33=+1
VHT-LTF34=+1
VHT-LTF41=+1
VHT-LTF42=+1

VHT-LTF43=+1
VHT-LTF44=−1

The wireless access point estimates the states of propagation paths of MU-MIMO transmission using the above-described VHT-LTFs. Because the wireless access point can read a correspondence relationship between a spatial stream and a wireless station from the VHT-SIG-A, it is possible to identify the wireless station transmitting the CTS stream even when a transmission-source address is not included in a payload portion and completely the same bit information is included therein. For example, if decoding of the third CTS frame has succeeded, this is considered to be a CTS frame transmitted from the wireless station (STA-C).

In this manner, it is possible to reply CTSs on all channels in which no NAV is set and on which no signal is received over a predetermined period among all available channels as well as a channel on which an RTS frame is received.

<A1-7(1)>

Figure 17:
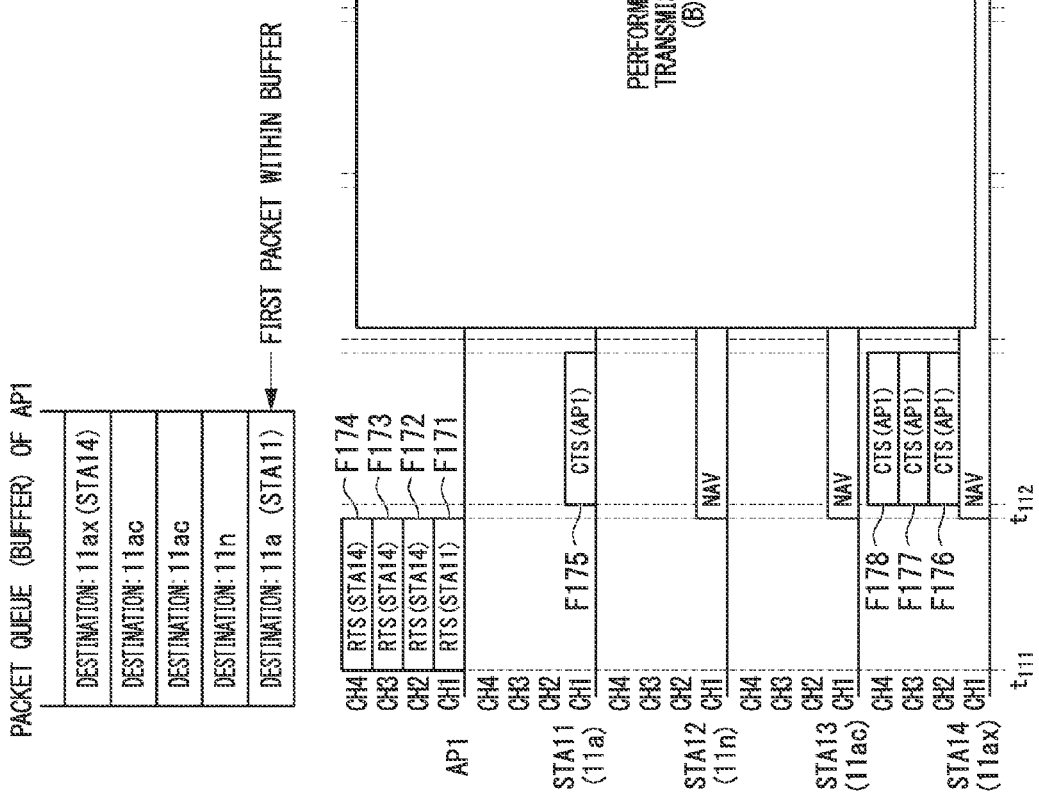
FIG. 17 is a time chart illustrating a frame sequence of the case in which the number of responding wireless stations is two or more and CTS frames are transmitted using OFDMA when a legacy station is also included in wireless stations that reply CTSs.

Next, a frame sequence of the case (A1-7 illustrated in FIG. 4) in which the number of responding wireless stations is two or more and CTS frames are transmitted using OFDMA when a legacy station is also included in wireless stations that reply CTSs will be described with reference to FIG. 17. FIG. 17 is a time chart illustrating the frame sequence when the number of responding wireless stations is two or more and the CTS frames are transmitted using the OFDMA when the legacy station is also included in the wireless stations that reply the CTSs. CTS multiplexing is applied using UL-OFDMA and RTSs and CTSs are exchanged in the form in which a channel is associated with a wireless station. Although there is no field for identifying a transmission-source station in the CTS frame, the wireless access point AP1 identifies the transmission-source wireless station by referring to a channel on which the CTS is received.

First, the wireless access point AP1 allocates an RTS frame F171 for the legacy station (wireless station STA11) to the primary channel and simultaneously transmits RTS frames F172 to F174 to the wireless station STA14 using the OFDMA (time $t_{111}$). In response thereto, the wireless stations STA11 and STA14 reply CTS frames F175 to F178 (time $t_{112}$).

In this manner, when RTSs are transmitted using the OFDMA, it is possible to transmit an RTS to the legacy station which can use only a smaller number of channels on the primary channel and transmit RTSs to another station on the secondary channels.

<A1-7(2)>

Figure 18:
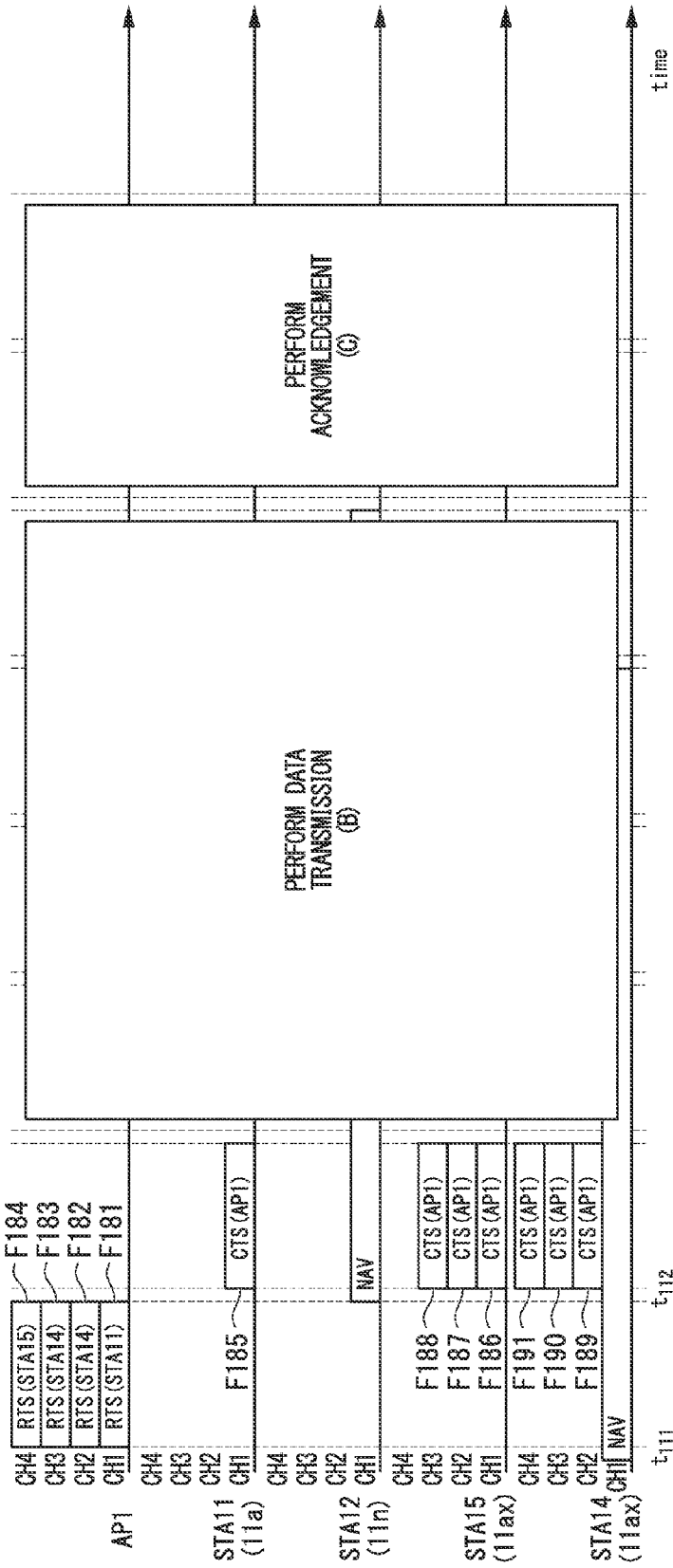
FIG. 18 is a time chart illustrating a modified example of the frame sequence illustrated in FIG. 17.

Next, a modified example of the frame sequence illustrated in FIG. 17 will be described with reference to FIG. 18. FIG. 18 is a time chart illustrating the modified example of the frame sequence illustrated in FIG. 17. CTS multiplexing is performed using UL-OFDMA and SDMA and a transmission-source STA is identified by signal processing using a CSD in a PHY because there is no field for identifying the transmission-source station in the CTS frame and therefore it is difficult for the wireless access point AP1 to identify a wireless station which has replied the CTS.

First, the wireless access point AP1 allocates an RTS frame F181 for the legacy station (wireless station STA11) to the primary channel and simultaneously transmits RTS frames F182 to F184 for the wireless station STA14 using the OFDMA (time $t_{111}$). In response thereto, the 11ax wireless station STA14 replies CTS frames F186 to F188 on all unused channels, the 11ax wireless station STA15 replies CTS frames F189 to F191 on all unused channels, and the wireless station STA11 replies a CTS frame F185 via the primary channel (time $t_{112}$).

In this manner, when the legacy station is present, it is possible to transmit RTSs on the secondary channels for different secondary wireless communication stations using the OFDMA.

Figure 19:
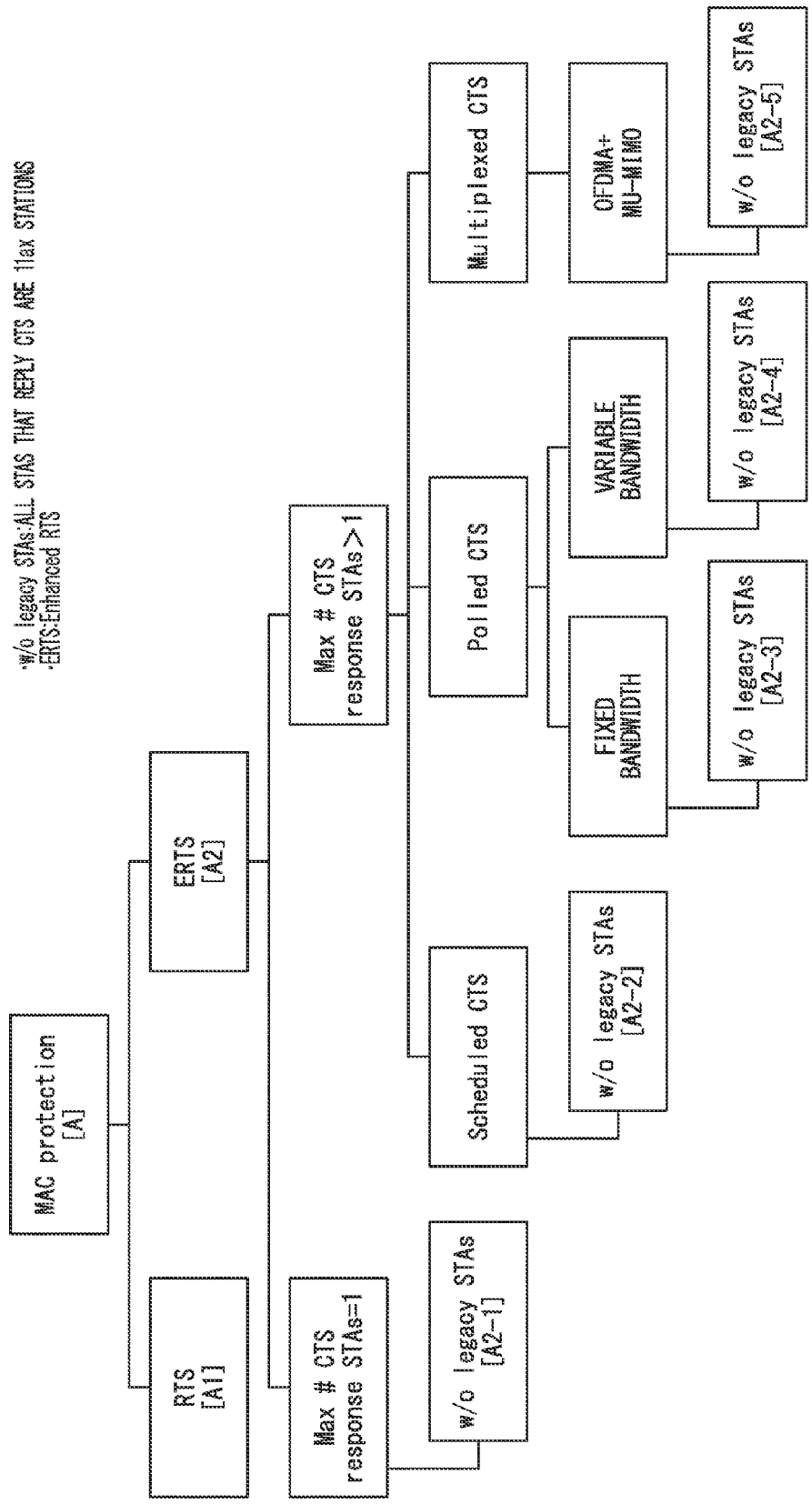
FIG. 19 is a diagram illustrating further details of the case (A2) in which an extended RTS (ETRS) among the classifications of MAC protection is used.

Next, MAC protection when an enhanced RTS (ETRS) is used will be described. FIG. 19 is a diagram illustrating further details of the case (A2) in which the enhanced RTS (ETRS) is used among the classifications of the MAC protection. Hereinafter, a description will be given based on classifications illustrated in FIG. 19.

<A2-1(1)>

Figure 20:
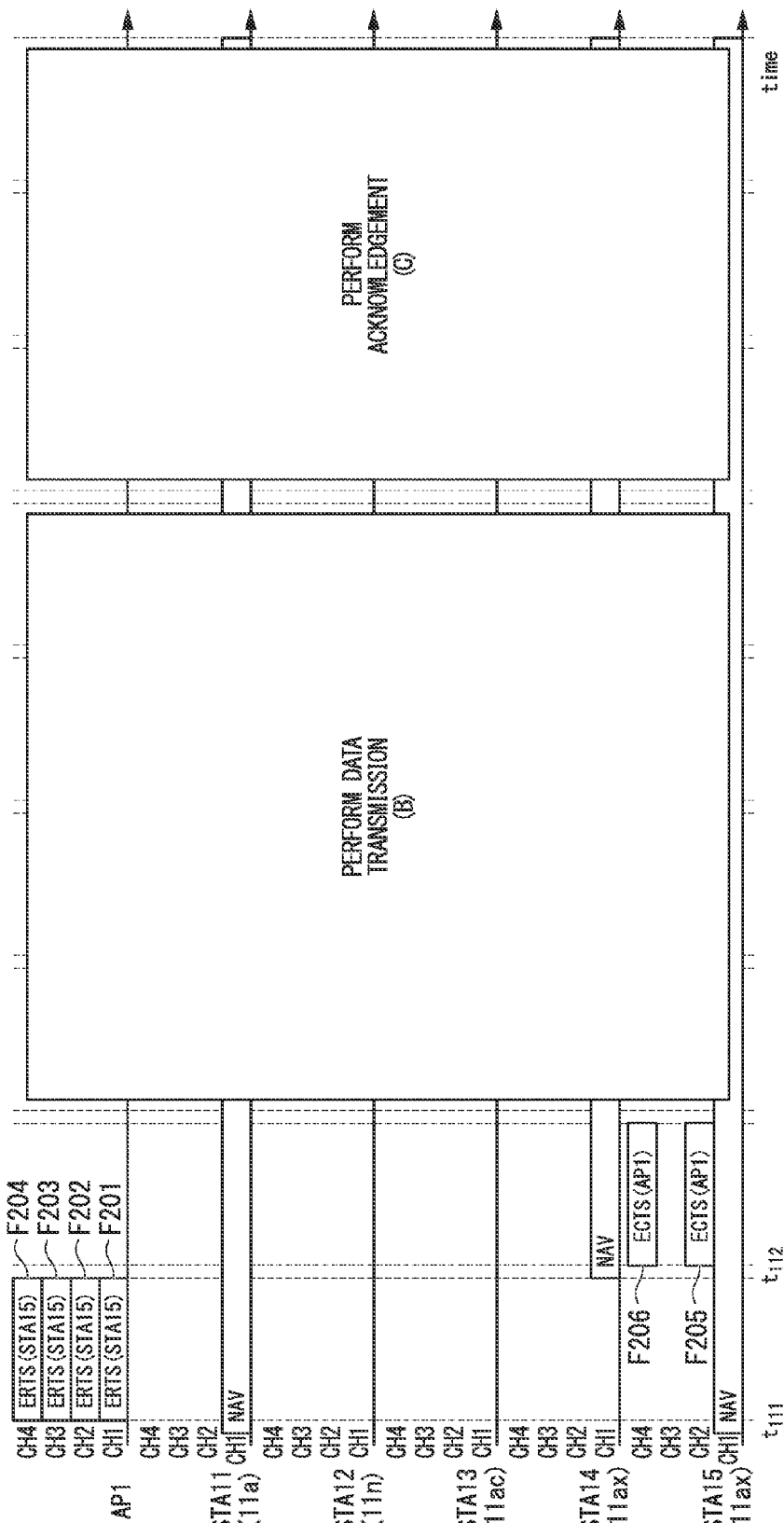
FIG. 20 is a time chart illustrating a frame sequence when the number of responding stations is 1 and all wireless stations that reply a CTS are 11ax wireless stations.

Next, a frame sequence (A2-1 of FIG. 19) when the number of responding stations is 1 and all wireless stations that reply CTSs are 11ax wireless stations will be described with reference to FIG. 20. FIG. 20 is a time chart illustrating the frame sequence when the number of responding stations is 1 and all the wireless stations that reply the CTSs are the 11ax wireless stations. Even when the primary channel is busy, reply of extended CTS (ECTS) frames each obtained by extending a CTS frame is performed on unused secondary channels, and the ECTSs are transmitted on discontinuous channels.

First, the wireless access point AP1 transmits ERTS frames F201 to F204 to the wireless station STA15 via all channels (time $t_{111}$). These ERTS frames include list information of numbers of channels to be used in data transmission. In response thereto, the wireless station STA15 replies ECTS frames F205 and F206 on unused secondary channels (channels 2 and 4) (time $t_{112}$). These ECTS frames include list information of numbers of available channels among the channel numbers provided in the notification using the ERTSs.

In this manner, the extended RTS frame, ERTS, is defined and ERTSs and ECTSs are exchanged. Because it is impossible for the legacy station to decode the ERTS frame, the destination of the ERTS is always a wireless communication station in which the OFDMA is available. Although there is a condition that the primary channel be idle as one of legacy conditions when returning a CTS for an RTS, there is no such condition when returning an ECTS for an ERTS. Because ECTSs are returned on idle channels in a wireless station on the receiving-end among channels on which ERTSs are received, it is possible to reply ECTSs on a plurality of discontinuous channels.

<A2-1(2)>

Figure 21:
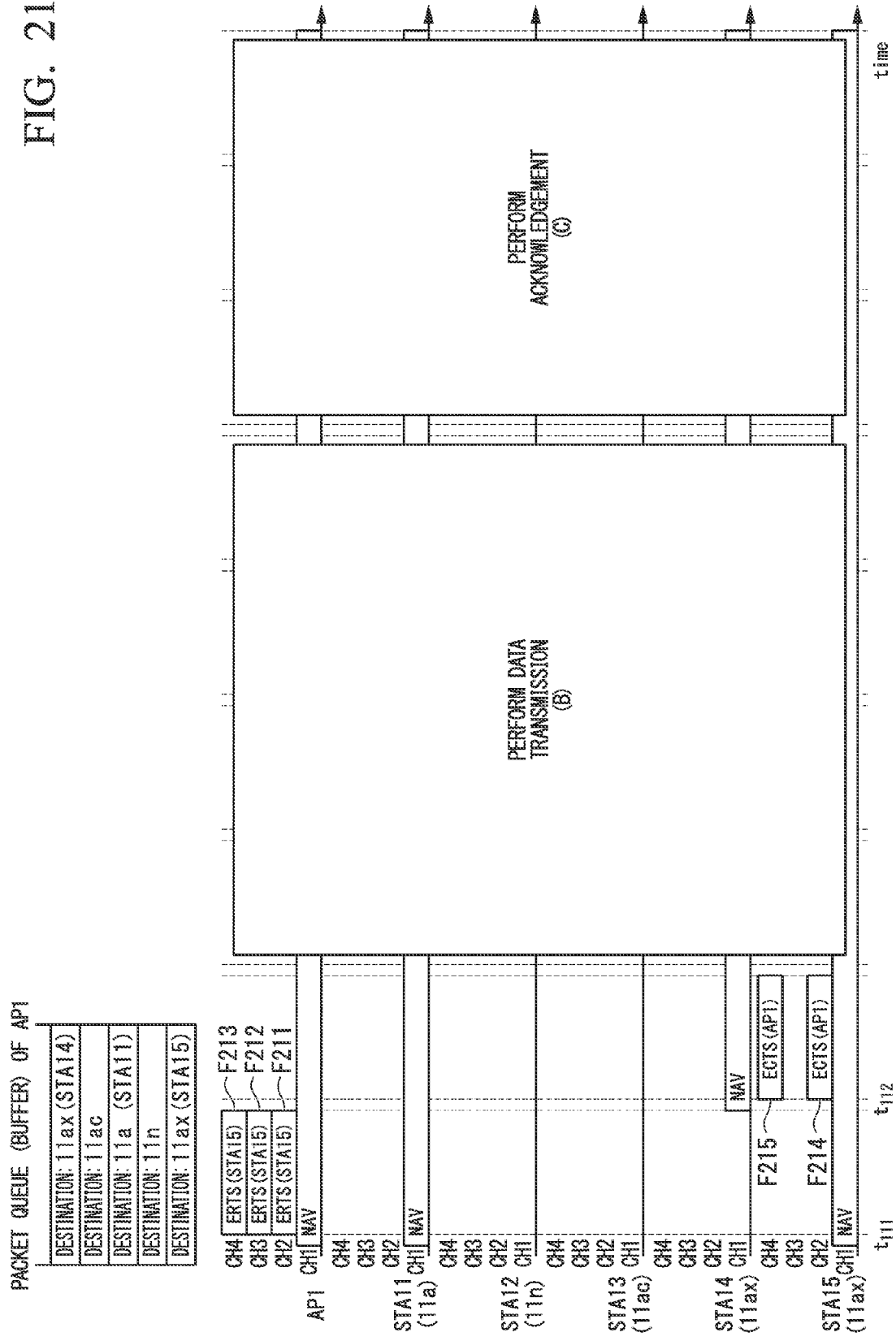
FIG. 21 is a time chart illustrating a modified example of the frame sequence illustrated in FIG. 20.

Next, a modified example of the frame sequence illustrated in FIG. 20 will be described with reference to FIG. 21. FIG. 21 is a time chart illustrating the modified example of the frame sequence illustrated in FIG. 20. Even when a primary channel is busy, if secondary channels are unused, the wireless access point AP1 acquires an access right and performs communication via only the secondary channels, wherein the wireless access point AP1 temporarily uses one of the unused secondary channels as the primary channel and further transmits ECTSs on discontinuous channels.

First, if the primary channel is busy, the wireless access point AP1 transmits ERTS frames F211 to F213 to the wireless station STA15 via only the secondary channels (channels 2 to 4) (time $t_{111}$). These ERTS frames include list information of numbers of channels to be used in data transmission and a number of a channel to be temporarily used within a time set in a Duration field as the primary channel. In addition, at this time, the NAV period is adjusted to the primary channel.

In response thereto, the wireless station STA15 replies ECTS frames F214 and F215 via secondary channels (channels 2 and 4) (time $t_{112}$). These ECTS frames include list information of numbers of available channels among the channel numbers provided in the notification using the ERTSs. The wireless station STA15 uses an available channel as the primary channel during a period in which the primary channel is busy.

In this manner, it is possible to check whether communication via only the secondary channels is possible if the primary channel is busy due to interference or the like.

<A2-2>

Figure 22:
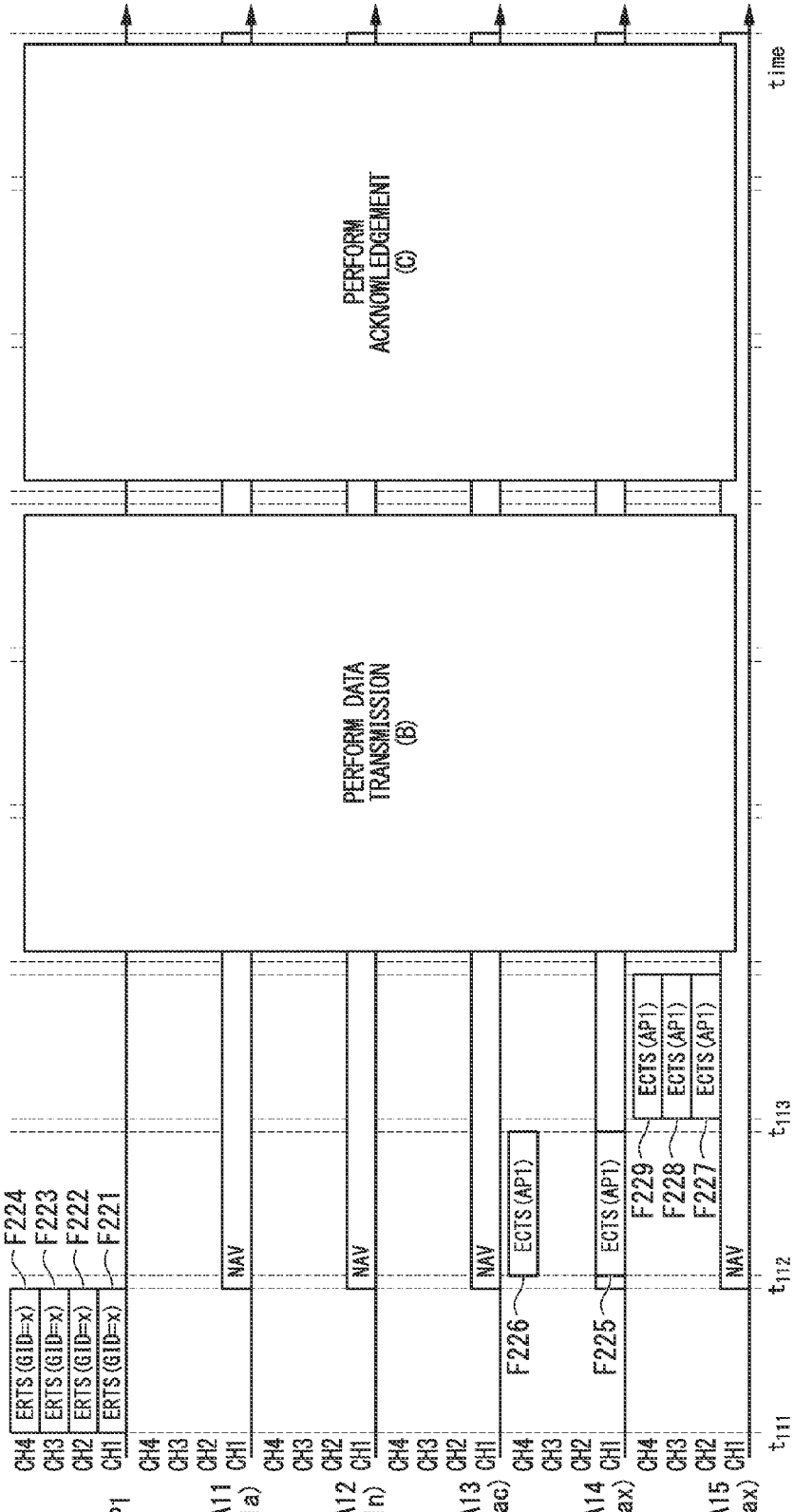
FIG. 22 is a time chart illustrating a frame sequence when the number of wireless stations responding to RTS frames transmitted using OFDMA is two or more and all wireless stations that reply CTS frames at predetermined times are 11ax wireless stations.

Next, a frame sequence (A2-2 illustrated in FIG. 19) when the number of wireless stations responding to RTS frames transmitted using the OFDMA is two or more and all wireless stations that reply CTS frames at predetermined times are 11ax wireless stations will be described with reference to FIG. 22. FIG. 22 is a time chart illustrating the frame sequence when the number of wireless stations responding to the RTS frames transmitted using the OFDMA is two or more and all the wireless stations that reply the CTS frames at the predetermined times are the 11ax wireless stations. ERTSs for a plurality of wireless stations are transmitted using a group ID (GID) and the notification of the transmission order of ECTSs is provided using GID information within the ERTS.

First, the wireless access point AP1 designates a group ID (GID) and transmits ERTS frames F221 to F224 in order to investigate the situation of unused channels in the 11ax wireless stations (here, the wireless stations STA14 and STA15) (time $t_{111}$). These ERTS frames include list information of numbers of channels to be used in data transmission, list information (GID) of a wireless station group serving as a data transmission candidate, and ECTS reply order information.

In response thereto, the wireless station STA14 replies ECTS frames F225 and F226 (time $t_{112}$) and the wireless station STA15 also replies ECTS frames F227 to F229 (time $t_{113}$). These ECTS frames include list information of numbers of available channels among the channel numbers provided in the notification using the ERTSs and the address of a transmission-source wireless station.

In this manner, ERTS frames are simultaneously transmitted for a plurality of wireless communication stations using a group ID (GID) concept. The reply order of ECTSs for the ERTSs is specified within the ERTS frames. Thereby, it is possible to request a plurality of stations that can handle OFDMA to reply ECTSs by using a single ERTS frame and thus the overhead of a wireless section can be reduced.

<A2-3>

Figure 23:
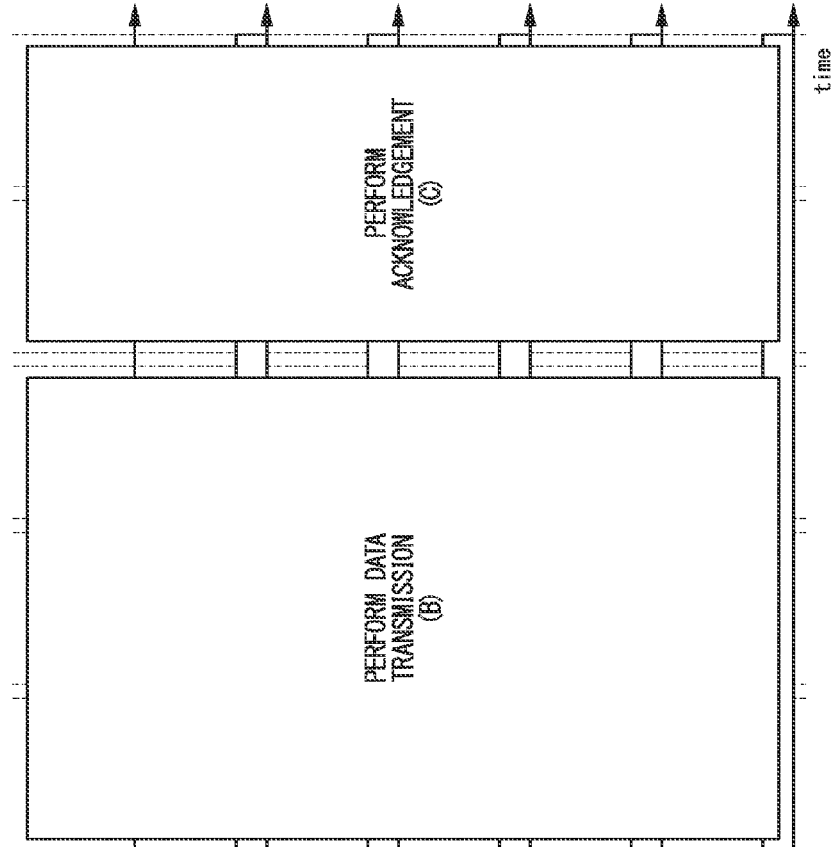
FIG. 23 is a time chart illustrating a frame sequence of the case in which the number of responding wireless stations is two or more and all wireless stations that reply CTSs are 11ax wireless stations when RTS frames using the same fixed bandwidth are transmitted for the wireless stations.

Next, a frame sequence of the case (A2-3 illustrated in FIG. 19) in which the number of responding wireless stations is two or more and all wireless stations that reply CTSs are 11ax wireless stations when RTS frames using the same fixed bandwidth are transmitted for wireless stations will be described with reference to FIG. 23. FIG. 23 is a time chart illustrating the frame sequence when the number of responding wireless stations is two or more and all the wireless stations that reply the CTSs are the 11ax wireless stations when the RTS frames using the same fixed bandwidth are transmitted for the wireless stations. The wireless access point AP1 acquiring an access right transmits ERTSs for a plurality of wireless stations in the fixed bandwidth.

First, the wireless access point AP1 transmits ERTS frames F231 to F234 to the wireless station STA15 (time $t_{111}$). These ERTS frames include list information of numbers of channels to be used in data transmission. In response thereto, the wireless station STA15 replies ECTS frames F235 to F237 (time $t_{112}$). These ECTS frames include list information of numbers of available channels among the channel numbers provided in the notification using the ERTSs.

Next, the wireless access point AP1 transmits ERTS frames F238 to F241 for the wireless station STA14 (time $t_{113}$). In response thereto, the wireless station STA14 replies ECTS frames F242 to F244 (time $t_{114}$).

In this manner, it is possible to transmit ERTS frames to a plurality of wireless communication stations using the fixed bandwidth and check whether the OFDMA and spatial multiplexing is available.

<A2-4>

Figure 24:
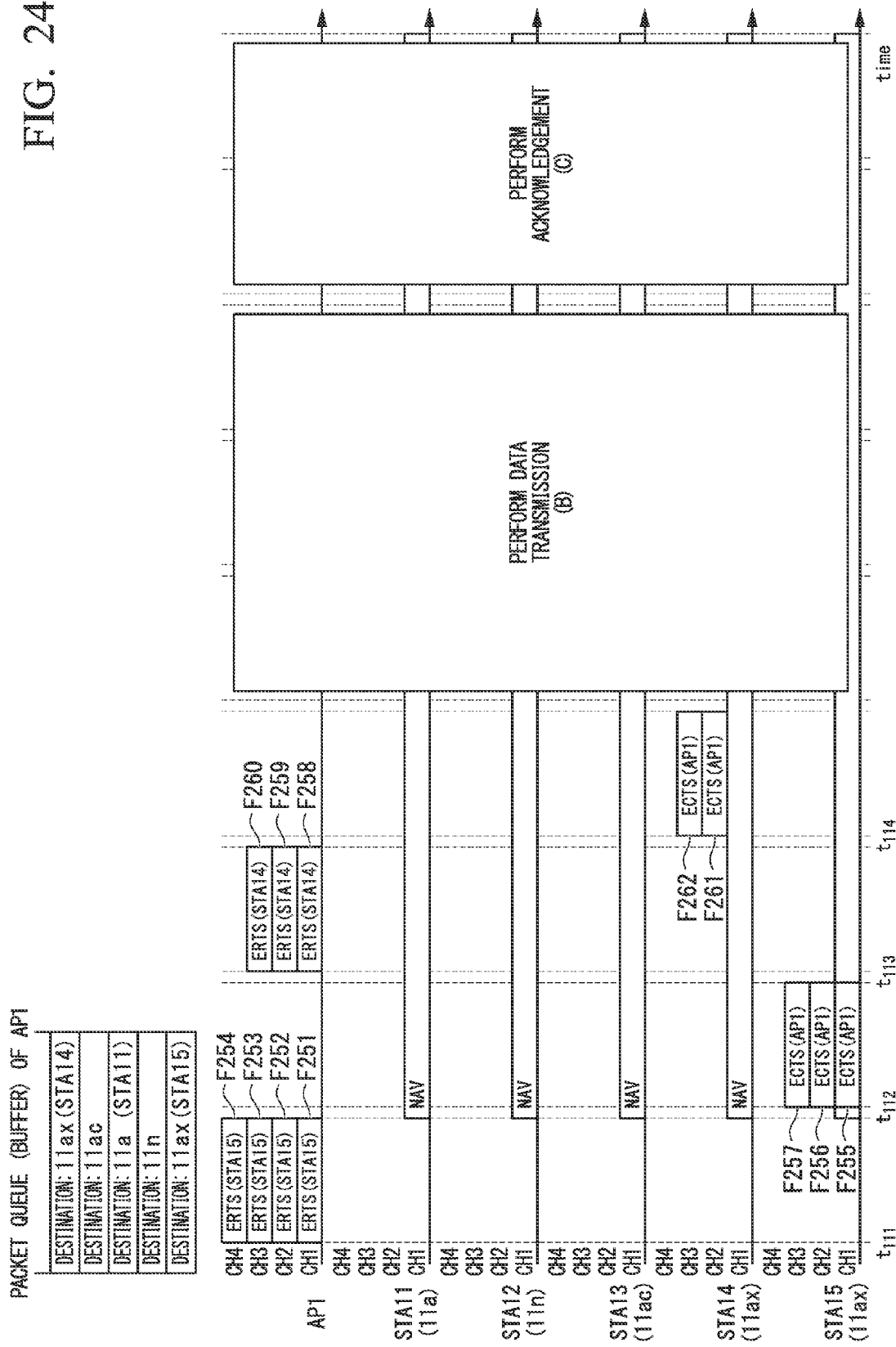
FIG. 24 is a time chart illustrating a frame sequence of the case in which the number of responding wireless stations is two or more and all wireless stations that reply CTSs are 11ax wireless stations when RTS frames are transmitted for the wireless stations using a variable bandwidth.

Next, a frame sequence of the case (A2-4 illustrated in FIG. 19) in which the number of responding wireless stations is two or more and all wireless stations that reply CTSs are 11ax wireless stations when RTS frames using a variable bandwidth are transmitted for wireless stations will be described with reference to FIG. 24. FIG. 24 is a time chart illustrating the frame sequence when the number of responding wireless stations is two or more and all the wireless stations that reply the CTSs are the 11ax wireless stations when the RTS frames using the variable bandwidth are transmitted for the wireless stations. The wireless access point AP1 acquiring an access right transmits ERTSs for a plurality of wireless stations using a variable bandwidth.

First, the wireless access point AP1 transmits ERTS frames F251 to F254 for the wireless station STA15 (time $t_{111}$). These ERTS frames include list information of numbers of channels to be used in data transmission. In response thereto, the wireless station STA15 replies ECTS frames F255 to F257 (time $t_{112}$). These ECTS frames include list information of available channel numbers among the channel numbers provided in the notification using the ERTSs.

Next, the wireless access point AP1 transmits ERTS frames F258 to F260 for the wireless station STA14 (time $t_{113}$). In response thereto, the wireless station STA14 replies ECTS frames F261 and F262 (time $t_{114}$).

In this manner, it is possible to check information of a 20 MHz width channel available in each wireless communication station by exchanging ERTS frames and ECTS frames with a plurality of wireless communication stations. In this TXOP section, a channel on which no ECTS reply is sent is not used.

<A2-5(1)>

Figure 25:
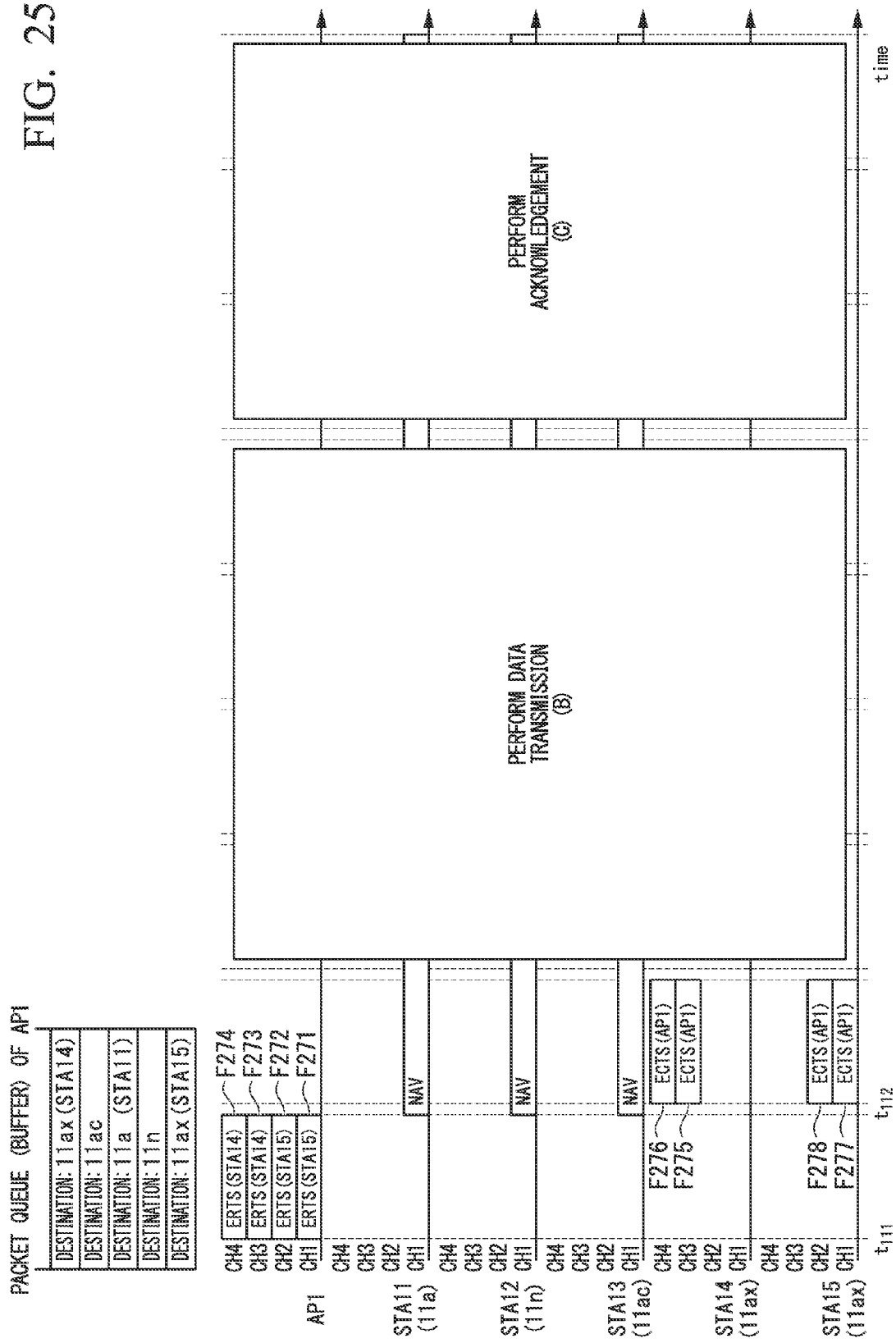
FIG. 25 is a time chart illustrating a frame sequence of the case in which the number of responding wireless stations is two or more and ECTS frames are transmitted using OFDMA when all wireless stations that reply CTSs are 11ax wireless stations.

Next, a frame sequence of the case (A2-5 illustrated in FIG. 19) in which the number of responding wireless stations is two or more and ECTS frames are transmitted using OFDMA when all wireless stations that reply CTSs are 11ax wireless stations will be described with reference to FIG. 25. FIG. 25 is a time chart illustrating the frame sequence when the number of responding wireless stations is two or more and the ECTS frames are transmitted using the OFDMA when all the wireless stations that reply the CTSs are the 11ax wireless stations. Multiplexing of ECTSs is performed and a wireless station replies an ECTS on an associated channel.

First, the wireless access point AP1 transmits ERTS frames F271 to F274 for the wireless stations STA14 and STA15 using the OFDMA (time $t_{111}$). These ERTS frames include list information of numbers of channels to be used in data transmission. In response thereto, the wireless station STA14 replies ECTS frames F275 and F276 and the wireless station STA15 replies ECTS frames F277 and F278 (time $t_{112}$). These ECTS frames include list information of available channel numbers among the channel numbers provided in the notification using the ERTSs.

In this manner, the wireless station can determine a channel on which an ECTS reply is sent in association with an ERTS by transmitting ERTS frames for different wireless communication stations on different 20 MHz width channels using the OFDMA.

<A2-5(2)>

Figure 26:
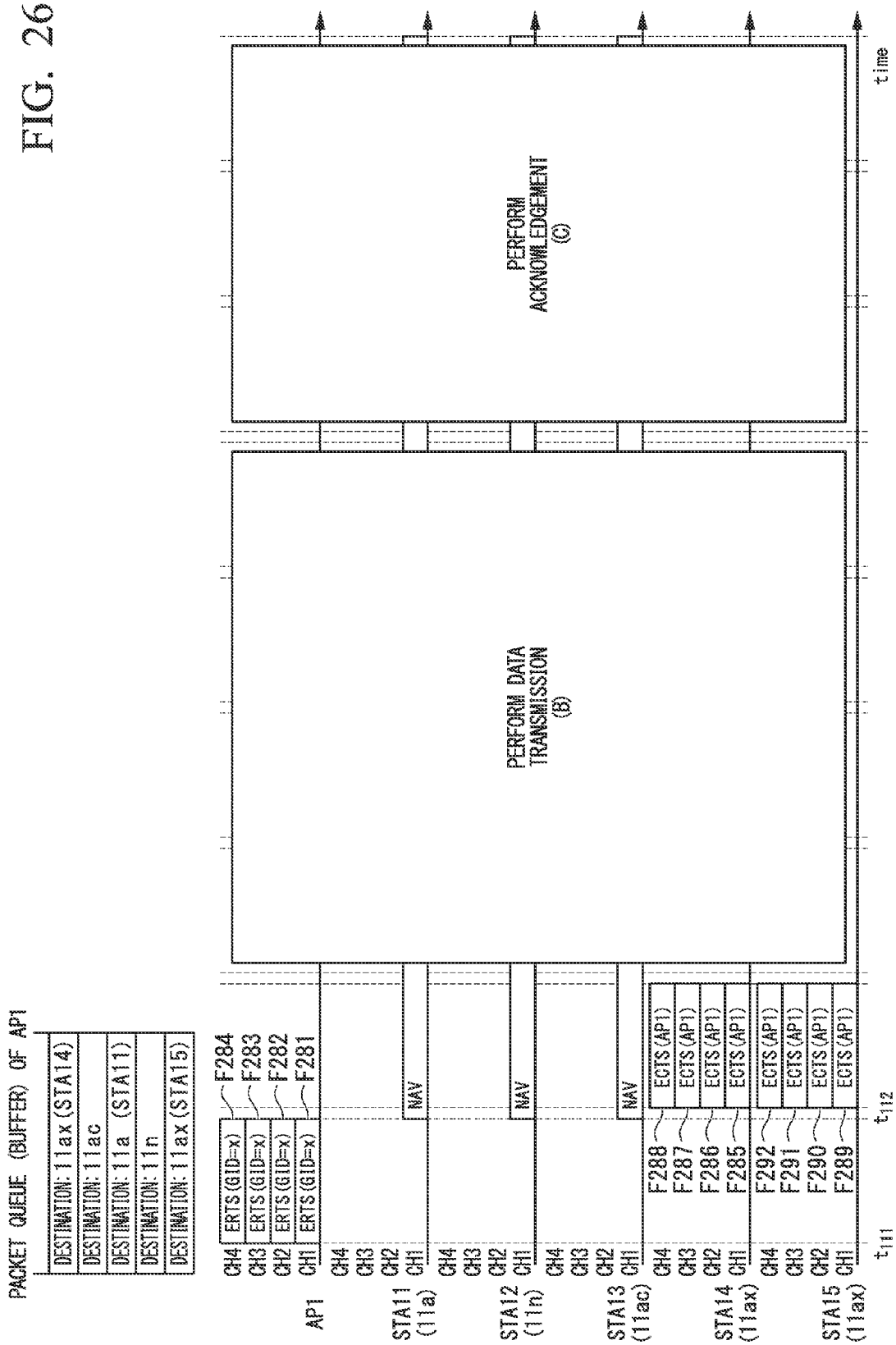
FIG. 26 is a time chart illustrating a modified example of the frame sequence illustrated in FIG. 25.

Next, a modified example of the frame sequence illustrated in FIG. 25 will be described with reference to FIG. 26. FIG. 26 is a time chart illustrating the modified example of the frame sequence illustrated in FIG. 25. Multiplexing of ECTSs is performed and ERTSs are transmitted in a duplicate mode.

First, the wireless access point AP1 designates a group ID (GID) and transmits ERTS frames F281 to F284 (time $t_{111}$). These ERTS frames include list information of numbers of channels to be used in data transmission and list information of wireless stations serving as data transmission candidates. In response thereto, the wireless station STA14 replies ECTS frames F285 to F288 and the wireless station STA15 replies ECTS frames F289 to F292 (time $t_{112}$). These ECTS frames include list information of available channel numbers among the channel numbers provided in the notification using the ERTSs and the address of a transmission-source wireless station.

In this manner, it is possible to transmit ERTSs simultaneously for a plurality of wireless communication stations in the duplicate mode using the group ID concept and collect information of available channels in each wireless communication station from their responses.

<A2-5(3)>

Figure 27:
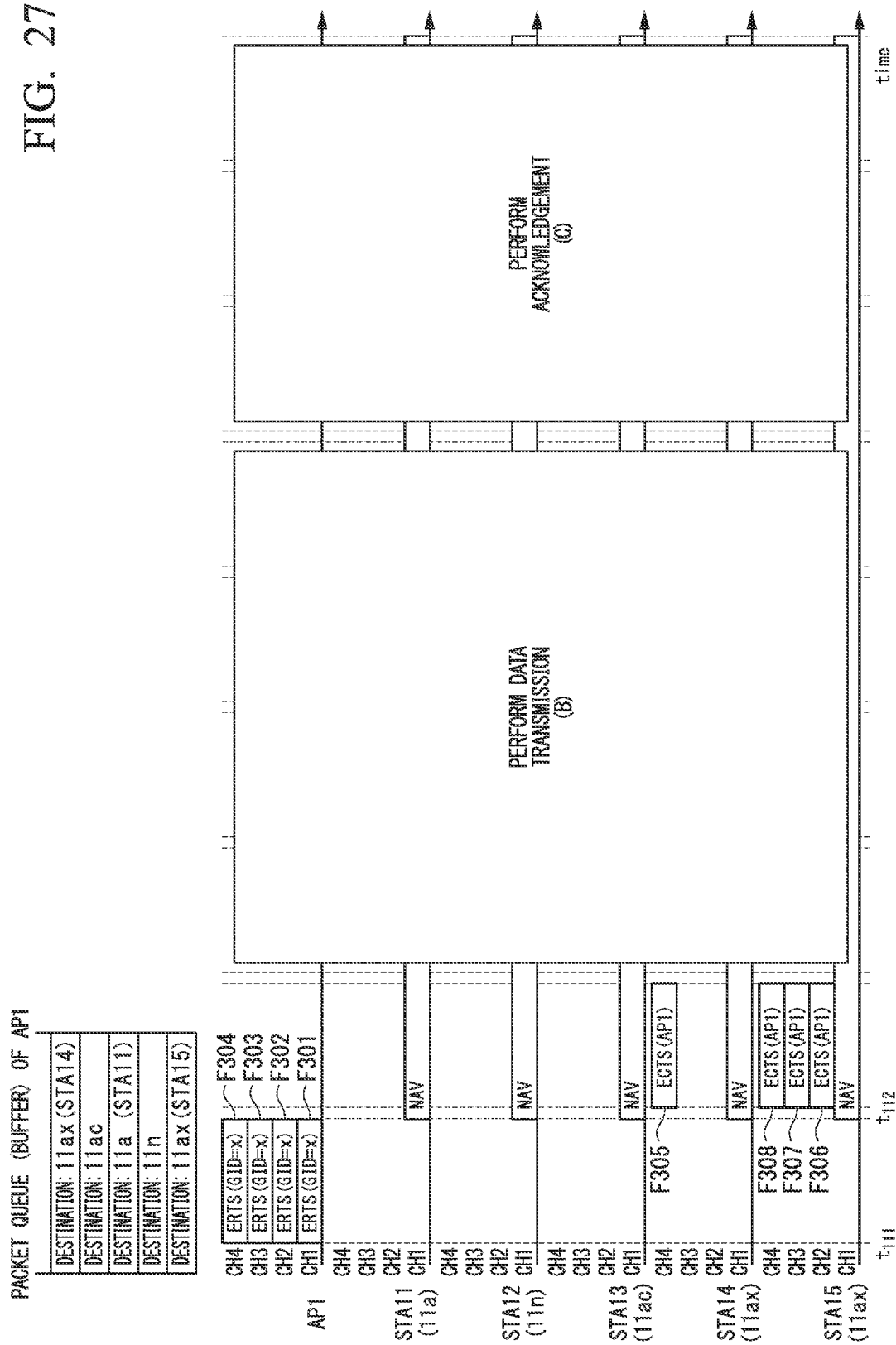
FIG. 27 is a time chart illustrating another modified example of the frame sequence illustrated in FIG. 25.

Next, another modified example of the frame sequence illustrated in FIG. 25 will be described with reference to FIG. 27. FIG. 27 is a time chart illustrating the other modified example of the frame sequence illustrated in FIG. 25. Multiplexing of ECTSs is performed and ERTSs are transmitted in the duplicate mode. A receiving wireless station replies ECTSs even when the primary channel is used. The ECTS reply is sent using UL MU-MIMO.

First, the wireless access point AP1 designates a group ID (GID) and transmits ERTS frames F301 to F304 (time $t_{111}$). These ERTS frames include list information of numbers of channels to be used in data transmission and list information of wireless stations serving as data transmission candidates. In response thereto, the wireless station STA14 replies an ECTS frame F305 using the UL MU-MIMO and the wireless station STA15 replies ECTS frames F306 to F308 using the UL MU-MIMO (time $t_{112}$). These ECTS frames include list information of available channel numbers among the channel numbers provided in the notification using the ERTSs and the address of a transmission-source wireless station.

In this manner, a reply (ECTSs) to ERTSs is transmitted using uplink MU-MIMO. Thereby, it is possible to transmit the ECTSs even if the primary channel is used.

<A2-5(4)>

Figure 28:
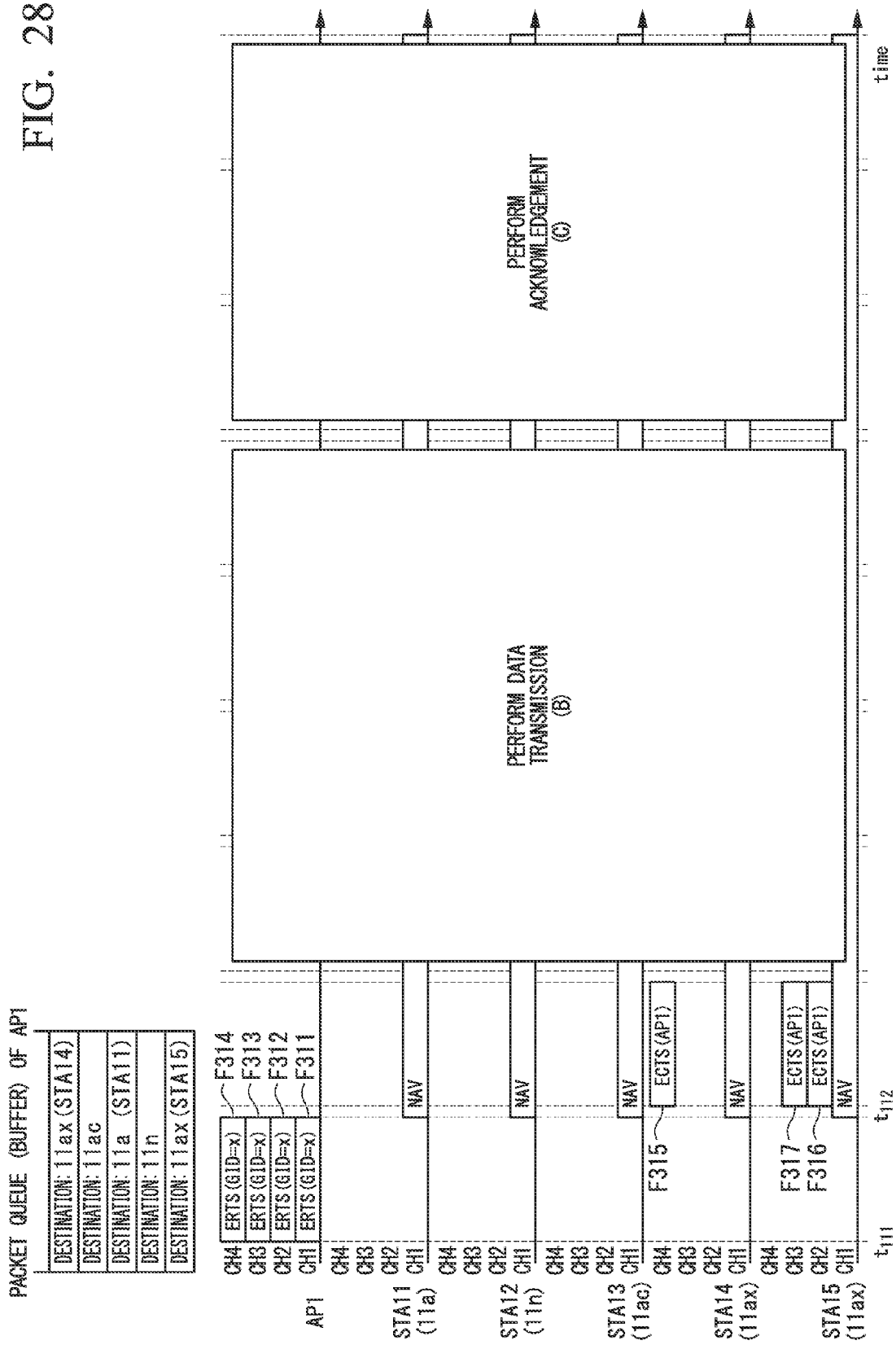
FIG. 28 is a time chart illustrating a modified example of the frame sequence illustrated in FIG. 27.

Next, a modified example of the frame sequence illustrated in FIG. 27 will be described with reference to FIG. 28. FIG. 28 is a time chart illustrating the modified example of the frame sequence illustrated in FIG. 27. Multiplexing of ECTSs is performed and ERTSs are transmitted in the duplicate mode. A receiving wireless station replies ECTSs even when the primary channel is used. The ECTS reply is sent using UL OFDMA.

First, the wireless access point AP1 designates a group ID (GID) and transmits ERTS frames F311 to F314 (time $t_{111}$). These ERTS frames include list information of numbers of channels to be used in data transmission and list information of wireless stations serving as data transmission candidates. In response thereto, the wireless station STA14 replies an ECTS frame F315 using the UL OFDMA and the wireless station STA15 replies ECTS frames F316 and F317 using the UL OFDMA (time $t_{112}$). These ECTS frames include list information of available channel numbers among the channel numbers provided in the notification using the ERTSs.

In this manner, a reply (ECTSs) to ERTSs is transmitted using uplink OFDMA. Thereby, it is possible to transmit the ECTSs even if the primary channel is used.

Although the above-described frame sequence describes that reply frames to ERTSs are ECTSs, the legacy CTS may be used, if necessary, instead of the ECTS as long as information to be included in the ECTS can be transmitted using the legacy CTS. For example, in the case of A2-1(1), an ECTS frame to be transmitted by each wireless station to the wireless access point has to be in a transmission form in which the wireless access point can determine a channel on which each wireless station transmits a CTS, but it can be realized by the legacy CTS transmission.

<Frame Sequence when Data Transmission is Performed>

Figure 29:
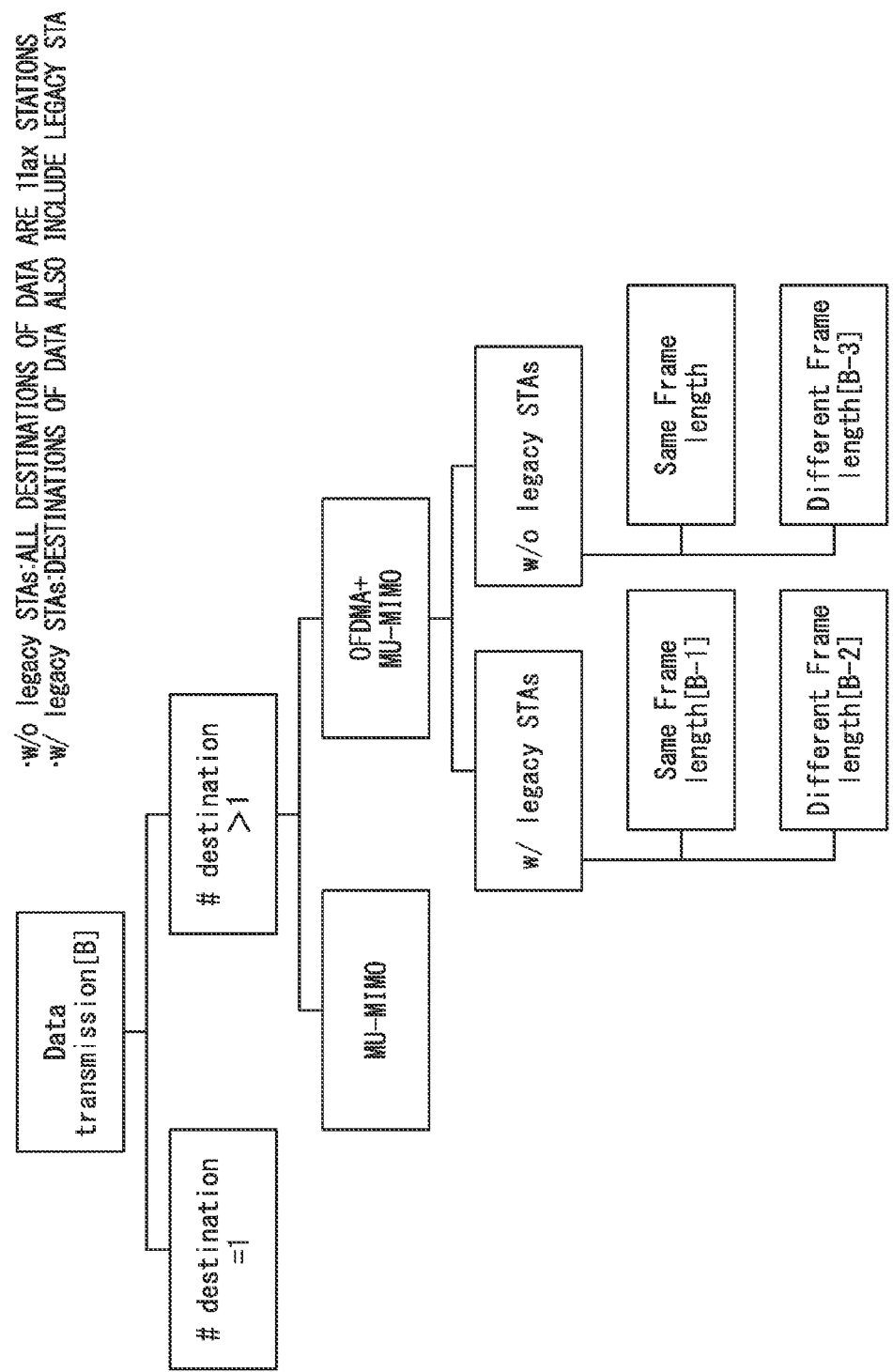
FIG. 29 is a diagram illustrating classifications of data transmission.

Next, a modified example of the frame sequence illustrated in FIG. 3 when data transmission is performed will be described. First, classifications of data transmission will be described with reference to FIG. 29. FIG. 29 is a diagram illustrating the classifications of data transmission. As illustrated in FIG. 29, data transmission (the identification name of which is denoted as B) when OFDMA+MU-MIMO is used can be sub-divided into B-1, B-2, and B-3. Because the other classifications correspond to data transmission by the legacy technology, a detailed description thereof will be omitted here. Hereinafter, the description will be given based on the classifications.

<B-1(1)>

Figure 30:
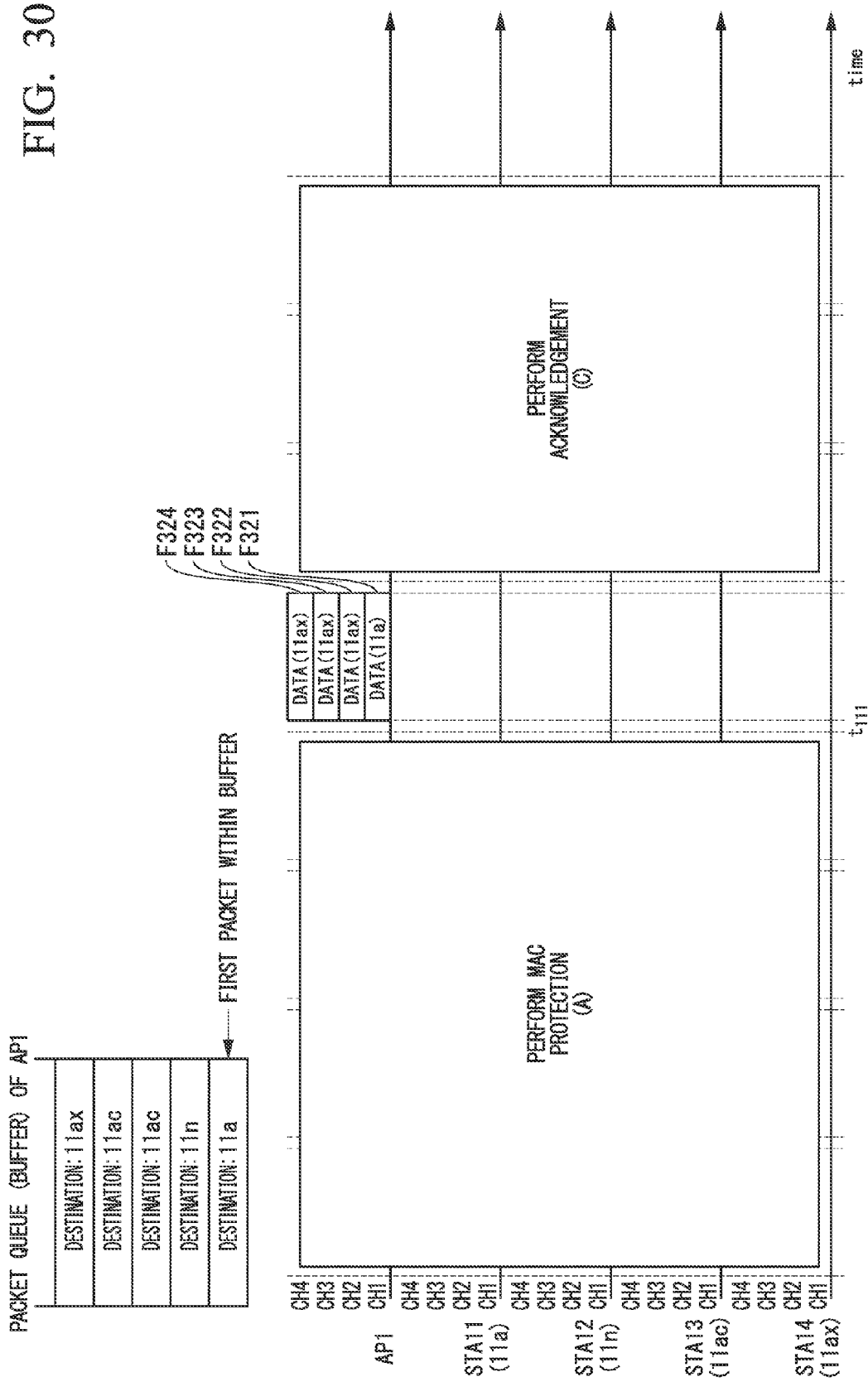
FIG. 30 is a time chart illustrating a frame sequence when OFDMA+MU-MIMO is used, a legacy station is included in destinations of data, and data lengths are the same.

First, a frame sequence (B-1 illustrated in FIG. 29) when OFDMA+MU-MIMO is used, a legacy station is included in destinations of data, and data lengths (frame lengths) are the same will be described with reference to FIG. 30. FIG. 30 is a time chart illustrating the frame sequence when OFDMA+MU-MIMO is used, the legacy station is included in the destinations of the data, and the data lengths are the same. Here, the data length refers to a time (unit: time unit) necessary to transmit a frame (unit: bits or bytes) to a wireless medium.

First, if there is data for 11a/n/ac and 11ax wireless stations in a packet queue, the wireless access point AP1 allocates a primary channel to the legacy station (wireless station STA11), transmits a frame F321, allocates the remaining secondary channels to the 11ax wireless stations, and transmits frames F322 to F324 (time $t_{111}$). At this time, the wireless access point AP1 sets a duration value to a timing at which all acknowledgements are completed. Then, the value of LENGTH is also set in accordance with a PPDU time length to be transmitted using OFDMA. That is, a numerical value transferred from TXVECTOR is adjusted to a frame length of MU-PPDU by the OFDMA.

In this manner, it is possible to effectively use secondary channels, which are conventionally wasted, by transmitting data for a legacy station on a primary channel and transmitting data for wireless stations that can perform reception using OFDMA on a secondary channel group.

<B-1(2)>

Figure 31:
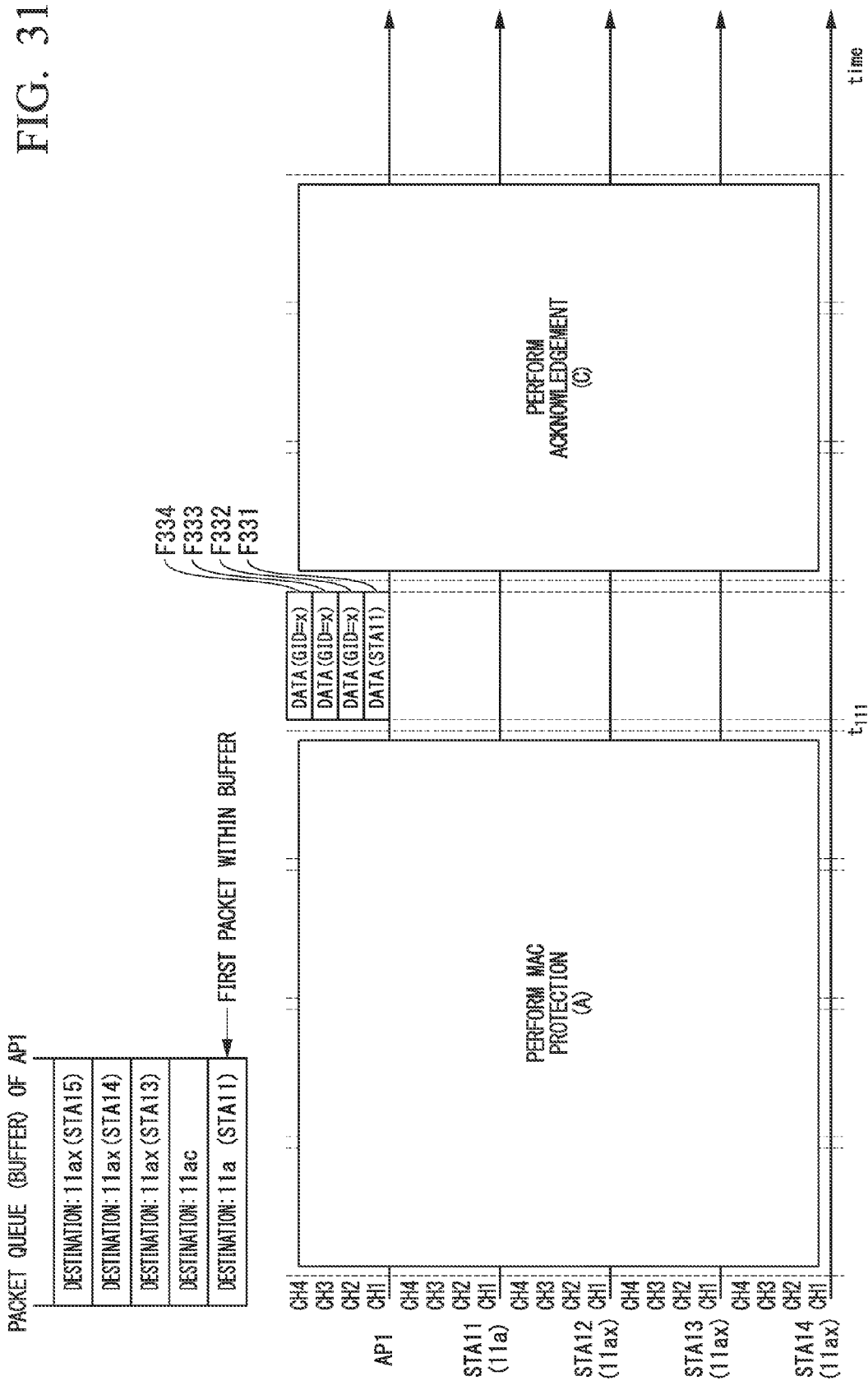
FIG. 31 is a time chart illustrating a modified example of the frame sequence illustrated in FIG. 30.

Next, a modified example of the frame sequence illustrated in FIG. 30 will be described with reference to FIG. 31. FIG. 31 is a time chart illustrating the modified example of the frame sequence illustrated in FIG. 30. The primary channel is allocated to the legacy station and then a wireless station and the number of streams to be transmitted to the wireless station are determined for each sub-channel of the secondary channels.

First, if there is data for 11a/n/ac and 11ax wireless stations in a packet queue, the wireless access point AP1 allocates a primary channel to the legacy station (wireless station STA11), transmits a frame F331, designates a group ID (e.g., a group ID of the wireless stations STA13, STA14, and STA15) of the 11ax wireless stations, allocates the remaining secondary channels to the 11ax wireless stations, and transmits frames F332 to F334 (time $t_{111}$). At this time, DL OFDMA and DL MU-MIMO are combined and the number of transmission streams is changed for every wireless station. If the number of streams for a certain wireless station is 0, data is not transmitted for the wireless station on relevant channels.

In this manner, high frequency utilization efficiency can be obtained because it is possible to simultaneously transmit data on a plurality of channels for a plurality of wireless communication stations while separating the data in frequency and space in accordance with MU-MIMO and OFDMA using a group ID concept.

<B-2>

Figure 32:
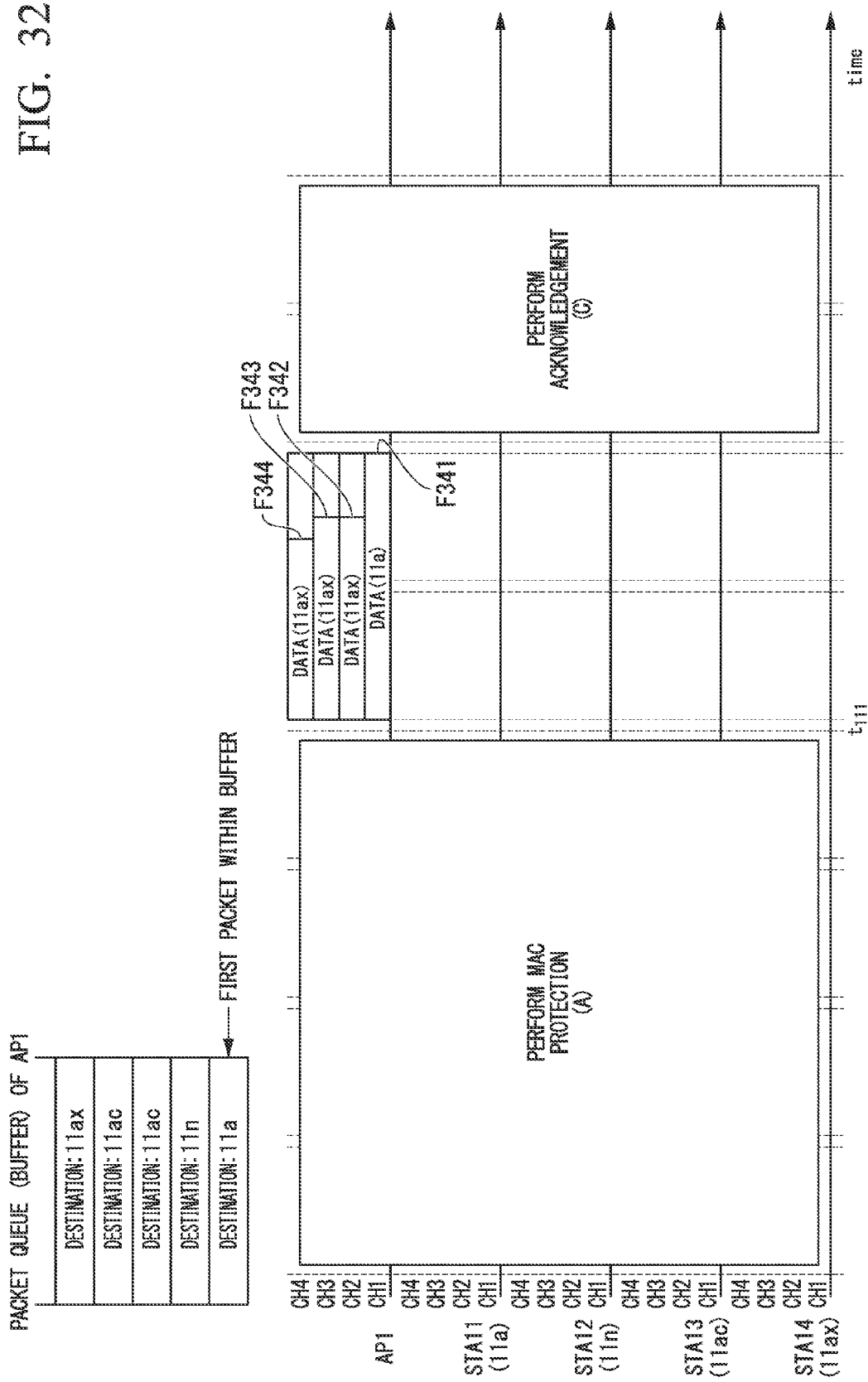
FIG. 32 is a time chart illustrating a modified example of the frame sequence illustrated in FIG. 30.

Next, a frame sequence (B-2 illustrated in FIG. 29) when OFDMA+MU-MIMO is used, a legacy station is also included in destinations of data, and data lengths (frame lengths) are different will be described with reference to FIG. 32. FIG. 32 is a time chart illustrating the frame sequence when OFDMA+MU-MIMO is used, all destinations of the data are 11ax wireless stations, and data lengths are different.

First, when data lengths of data to be transmitted to wireless stations are different from one another, the wireless access point AP1 adjusting data lengths of frames F342 to F344 of the 11ax wireless stations to a data length of a frame F341 of the legacy station (11a wireless station) and performs data transmission (time $t_{111}$). As a method for adjusting the data lengths, (1) addition of padding bits, (2) adjustment of a transmission rate (MCS), the number of streams, and STBC, (3) frame aggregation, (4) MPDU duplicate transmission, or the like is applicable.

In this manner, there is an advantageous effect in that it is possible to maintain constant transmission power in signal processing of data by setting a data length of a primary wireless communication station as an upper limit, adjusting the data length (length in the time domain) thereto, and performing data transmission. In addition, if this operation is not performed, a non-signal period occurs on a channel of a destination station having a short frame length and another wireless station may acquire a channel access right during channel access based on CSMA/CA; in contrast, it is possible for the present invention to perform a process from data transmission to an acknowledgement process necessary for stations including the legacy station as a series of sequences in the acquired TXOP and thus it is possible to perform retransmission of data necessary to be retransmitted as a result of the acknowledgement by quickly acquiring another TXOP and improve transmission quality of data.

<B-3>

Figure 33:
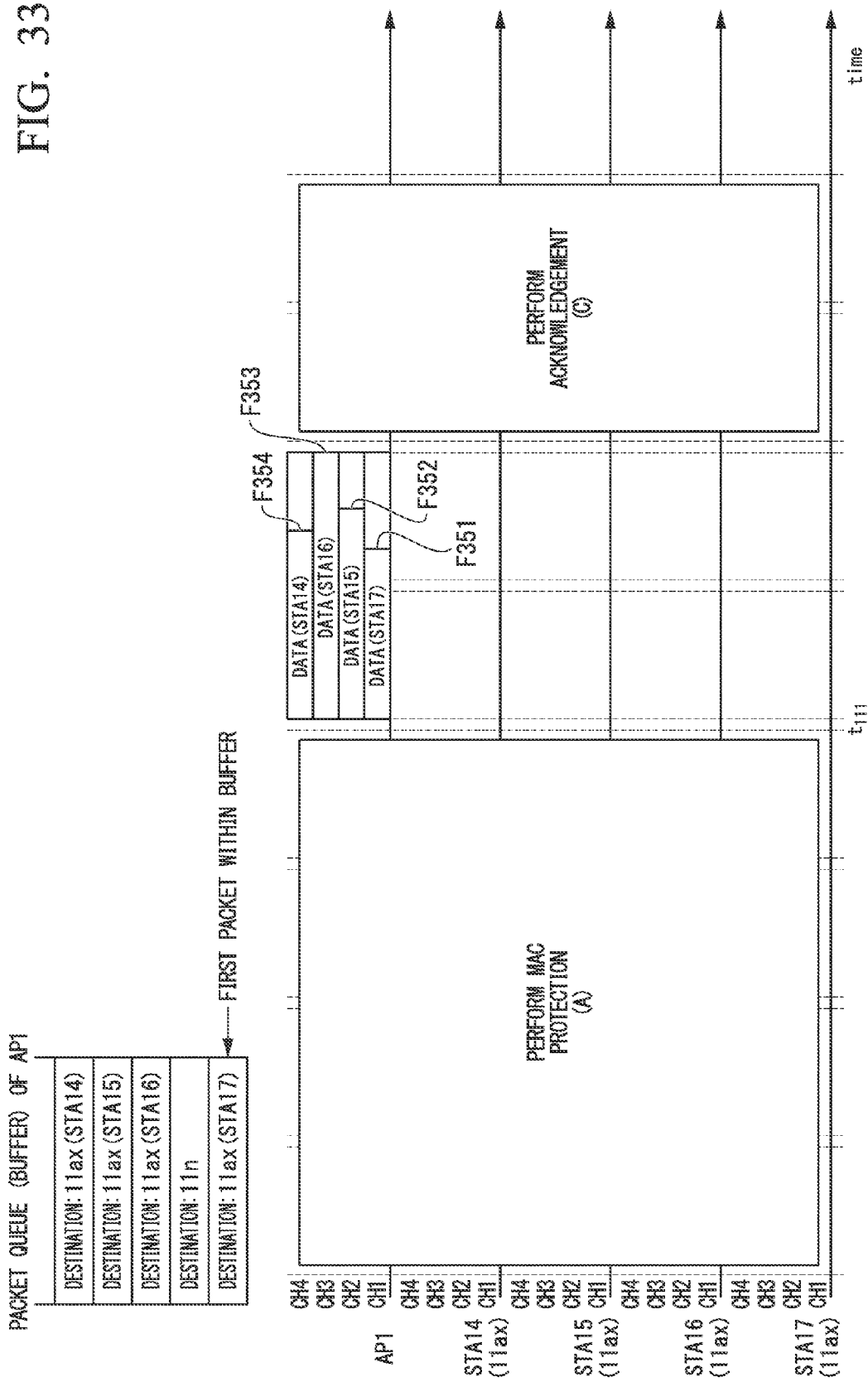
FIG. 33 is a time chart illustrating a frame sequence when OFDMA+MU-MIMO is used, all destinations of data are 11ax wireless stations, and data lengths are different from one another.

Next, a frame sequence (B-3 illustrated in FIG. 29) when OFDMA+MU-MIMO is used, no legacy station is included in destinations of data, and data lengths (frame lengths) are different will be described with reference to FIG. 33. FIG. 33 is a time chart illustrating a frame sequence when OFDMA+ MU-MIMO is used, all destinations of data are 11ax wireless stations, and data lengths are different.

First, when data lengths of frames F351 to F354 to be transmitted to wireless stations are different from one another, the wireless access point AP1 adjusts other data lengths to a data length of a longest frame F353 and performs data transmission (time $t_{111}$). As a method for adjusting the data lengths, (1) addition of padding bits, (2) adjustment of a transmission rate (MCS), the number of streams, and an STBC, (3) frame aggregation, (4) MPDU duplicate transmission, or the like is applicable.

In this manner, there is an advantageous effect in that it is possible to maintain constant transmission power in signal processing of data by setting other data lengths to a data length (length in the time domain) of a longest frame and performing data transmission. If this operation is not performed, a non-transmission section occurs on a channel of a destination station having a short frame length and another wireless station may acquire a channel access right during channel access based on CAMA/CA; in contrast, it is possible for the present invention to perform a process from data transmission to a necessary acknowledgement process as a series of sequences in the acquired TXOP, and thus it is possible to perform retransmission of data necessary to be retransmitted as a result of the acknowledgement by quickly acquiring another TXOP and improve transmission quality of data.

<Frame Sequence when Acknowledgement is Performed>

Figure 34:
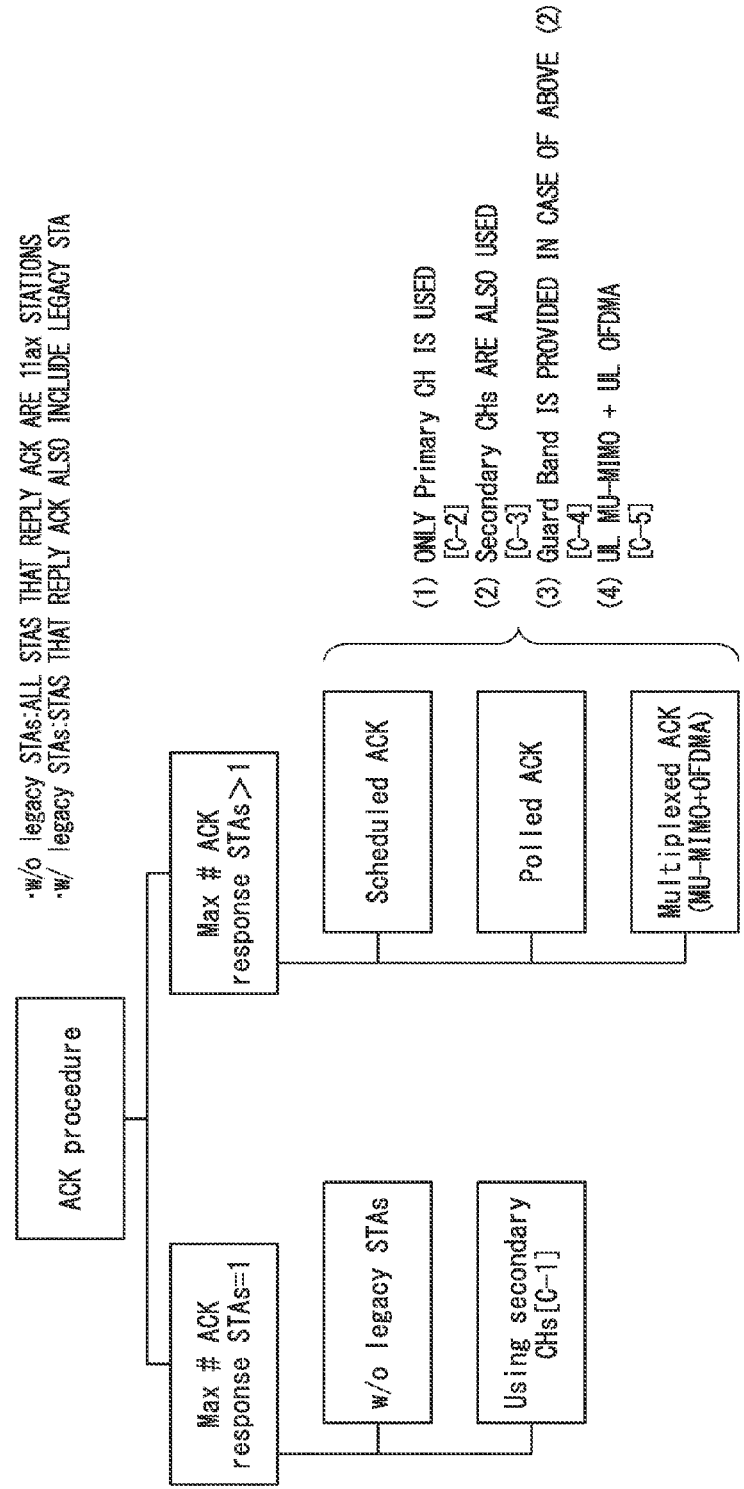
FIG. 34 is a diagram illustrating classifications of an acknowledgement.

Next, a modified example of the frame sequence illustrated in FIG. 3 when the acknowledgement is performed will be described. First, classifications of the acknowledgement will be described with reference to FIG. 34. FIG. 34 is a diagram illustrating the classifications of the acknowledgement. As illustrated in FIG. 34, the acknowledgement (the identification name of which is denoted as C) can be sub-divided into C-1, C-2, C-3, C-4, and C-5. Hereinafter, a description will be given based on the classifications.

<C-1>

Figure 35:
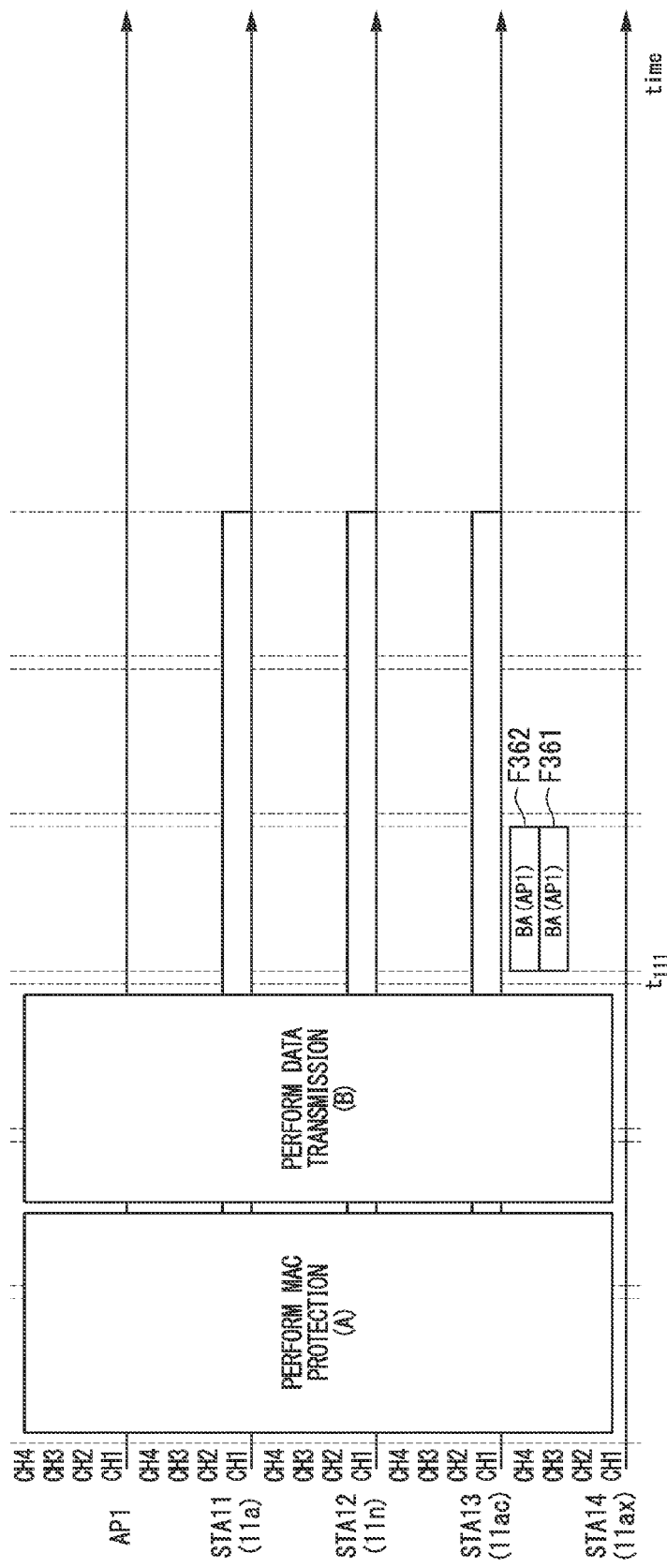
FIG. 35 is a time chart illustrating a frame sequence when the number of responding stations is 1, all wireless stations that reply ACKs are 11ax stations, and used channels are secondary channels.

First, a frame sequence (C-1 illustrated in FIG. 34) when the number of responding wireless stations is 1, a wireless station that replies a response is an 11ax station, and used channels are secondary channels will be described with reference to FIG. 35. FIG. 35 is a time chart illustrating the frame sequence when the number of responding wireless stations is 1, the wireless station that replies the response is the 11ax station, and the used channels are the secondary channels. An 11ax wireless station replies a block ACK (BA) with which responses for a plurality of received frames are collectively returned on channels on which data is received.

First, when the 11ax wireless station STA14 receives data on only secondary channels from the wireless access point AP1, the 11ax wireless station STA14 replies BA frames F361 and F362 for the wireless access point AP1 via only the secondary channels (channels 3 and 4) (time $t_{111}$).

In this manner, the secondary wireless communication station replies the block ACKs (BAs) on a secondary channel group through which data is received. Thereby, because it is possible to reply of responses independent of a sequence in the primary channel, it is possible to advance a time at which the reply of the responses is completed as compared to the case in which the reply of the responses is sent on the primary channel. In addition, because it is possible to prevent interference in the primary channel, it is possible to improve frequency utilization efficiency on all channels.

<C-2>

Figure 36:
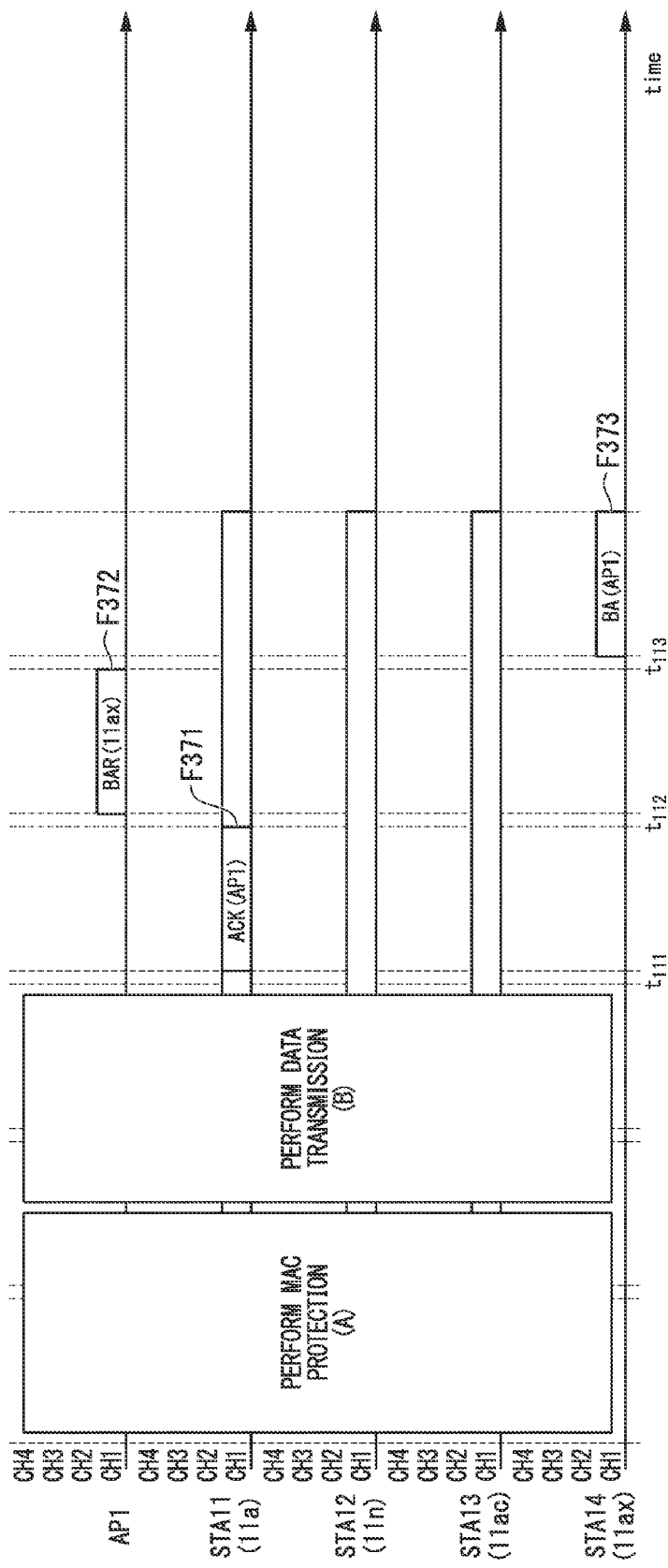
FIG. 36 is a time chart illustrating a frame sequence when the number of responding stations is two or more and a channel used for an acknowledgement is a primary channel.

Next, a frame sequence (C-2 illustrated in FIG. 34) when the number of responding wireless stations is two or more and a channel used for an acknowledgement is a primary channel will be described with reference to FIG. 36. FIG. 36 is a time chart illustrating the frame sequence when the number of responding wireless stations is two or more and the channel used for the acknowledgement is the primary channel. The secondary channels are quickly released and acknowledgements are performed via only the primary channel after data transmissions for the wireless station STA11, which is an 11a wireless station, via the primary channel and for the wireless station STA14, which is an 11ax wireless station, via the secondary channel are simultaneously performed. At this time, the acknowledgement of the legacy station is first performed and then the response of the 11ax wireless station is checked using polling.

First, when the wireless access point AP1 performs data transmissions for the 11a and 11ax wireless stations, the wireless station STA11 replies an ACK frame F371 (time $t_{111}$). In response thereto, the wireless access point AP1 transmits a block ACK request (BAR) frame F372 to the 11ax wireless station (time $t_{112}$). In response thereto, the wireless station STA14, which is an 11ax wireless station, replies a BA frame F373 (time $t_{113}$).

In this manner, it is possible to release the secondary channel group after data transmission by performing the acknowledgements only on the primary channel. In addition, interruption by another wireless communication station is very unlikely to occur during the sequence because all acknowledgements for data transmitted by the wireless access point AP1 are performed on the primary channel, it is possible to initiate a process of quickly acquiring another TXOP if the necessity of retransmission occurs, and thus a transmission delay of frames can be reduced.

<C-3>

Figure 37:
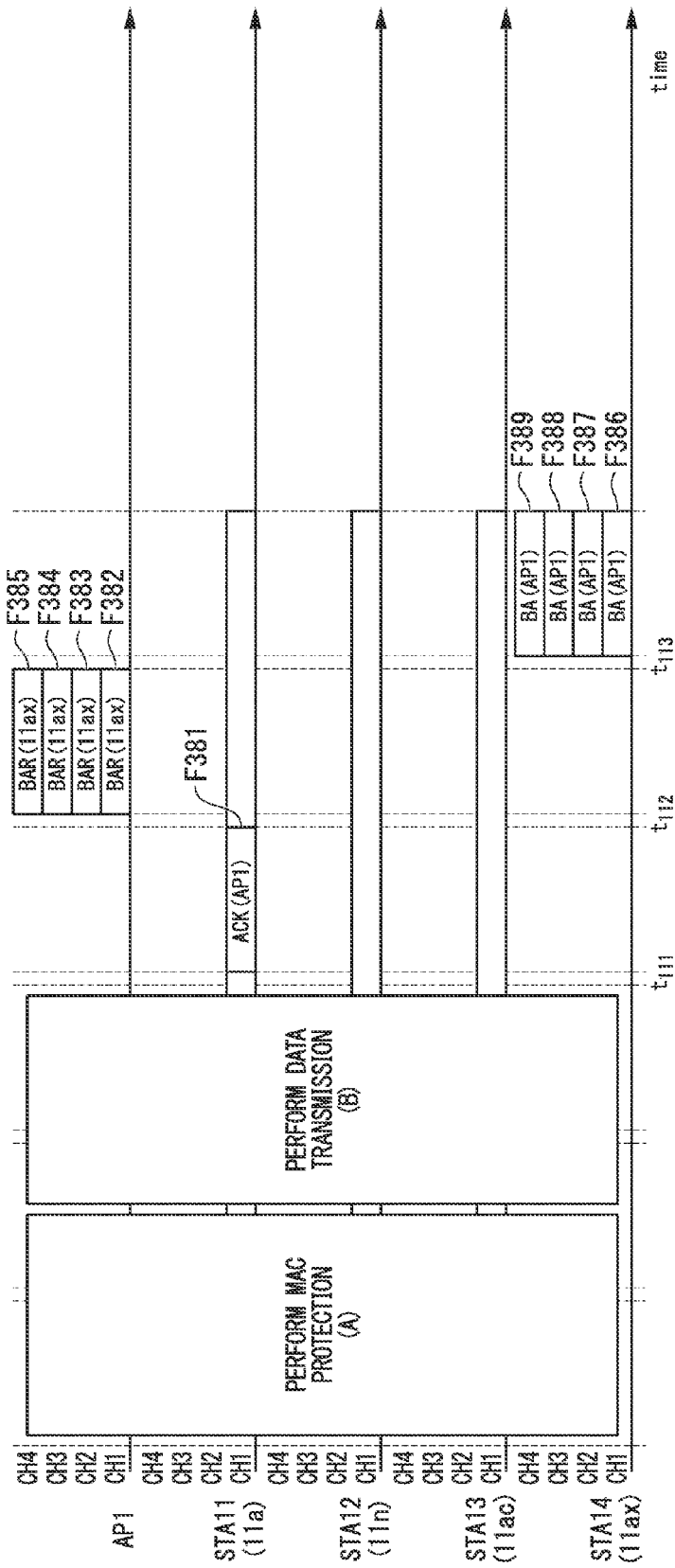
FIG. 37 is a time chart illustrating a frame sequence when the number of responding stations is two or more and secondary channels are also used as channels used for acknowledgements.

Next, a frame sequence (C-3 illustrated in FIG. 34) when the number of responding wireless stations is two or more and a secondary channel is also used as a channel used for an acknowledgement will be described with reference to FIG. 37. FIG. 37 is a time chart illustrating the frame sequence when the number of responding wireless stations is two or more and the secondary channel is also used as the channel used for the acknowledgement. The acknowledgement is performed via the primary channel as well as the secondary channel used in data transmission.

First, when the wireless access point AP1 performs data transmissions for the 11a and 11ax wireless stations, the wireless station STA11 replies an ACK frame F381 (time $t_{111}$). In response thereto, the wireless access point AP1 transmits block ACK request (BAR) frames F382 to F385 to the 11ax wireless station via all channels (time $t_{112}$). In response thereto, the wireless station STA14, which is an 11ax wireless station, replies BA frames F386 to F389 (time $t_{113}$).

In this manner, it is possible to transmit the BARs to the secondary wireless communication station even on the primary channel at the time of the acknowledgement using the BARs.

<C-4>

Figure 38:
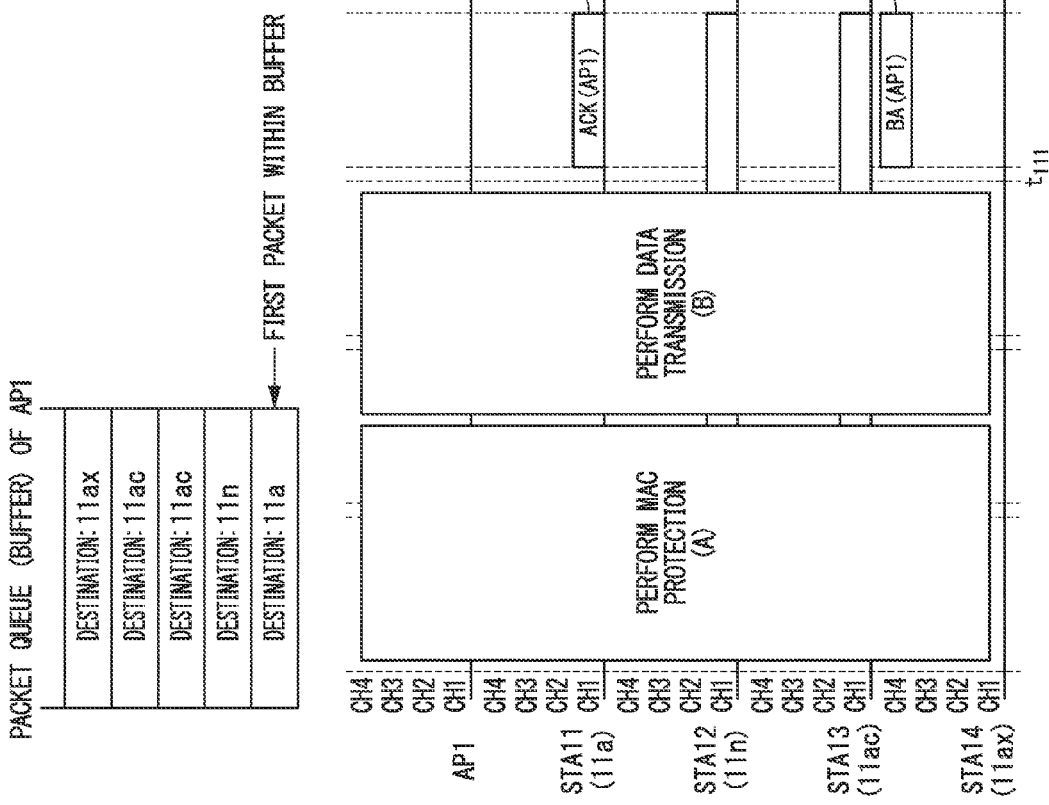
FIG. 38 is a time chart illustrating a frame sequence of the case in which the number of responding stations is two or more and a guard band is provided when secondary channels are also used as channels used for acknowledgements.

Next, a frame sequence of the case (C-4 illustrated in FIG. 34) in which the number of responding wireless stations is two or more and a guard band is provided when a secondary channel is also used as a channel used for an acknowledgement will be described with reference to FIG. 38. FIG. 38 is a time chart illustrating the frame sequence when the number of responding wireless stations is two or more and the guard band is provided when the secondary channel is also used as the channel used for the acknowledgement. The legacy station replies an ACK (or BA) on the primary channel and the 11ax wireless station replies a BA via a channel separated as much as possible from the primary channel among secondary channels on which frames are received. In order to realize this, the length of the BA is adjusted in accordance with a transmission time of the ACK by, for example, changing an MCS and the 11ax wireless station makes an adjustment to a center frequency (carrier frequency) used by the legacy station. Thereby, it is possible to reduce an inter-channel interference problem.

First, when the wireless access point AP1 transmits data to the 11a wireless station via channel 1 and transmits data to the 11ax wireless station via channels 2, 3, and 4, the 11a wireless station STA11 replies an ACK frame F391 via channel 1 (primary channel) (time $t_{111}$). In parallel therewith, the 11ax wireless station STA14 replies a BA frame F392 via a secondary channel separated as much as possible from channel 1 (time $t_{111}$). For example, when the 11a wireless station uses channel 1, the 11ax wireless station uses channel 4.

In this manner, the acknowledgement of the secondary wireless communication station can prevent an influence on communication of the legacy station by performing the acknowledgement on one channel separated as much as possible from the primary channel group.

<C-5(1)>

Figure 39:
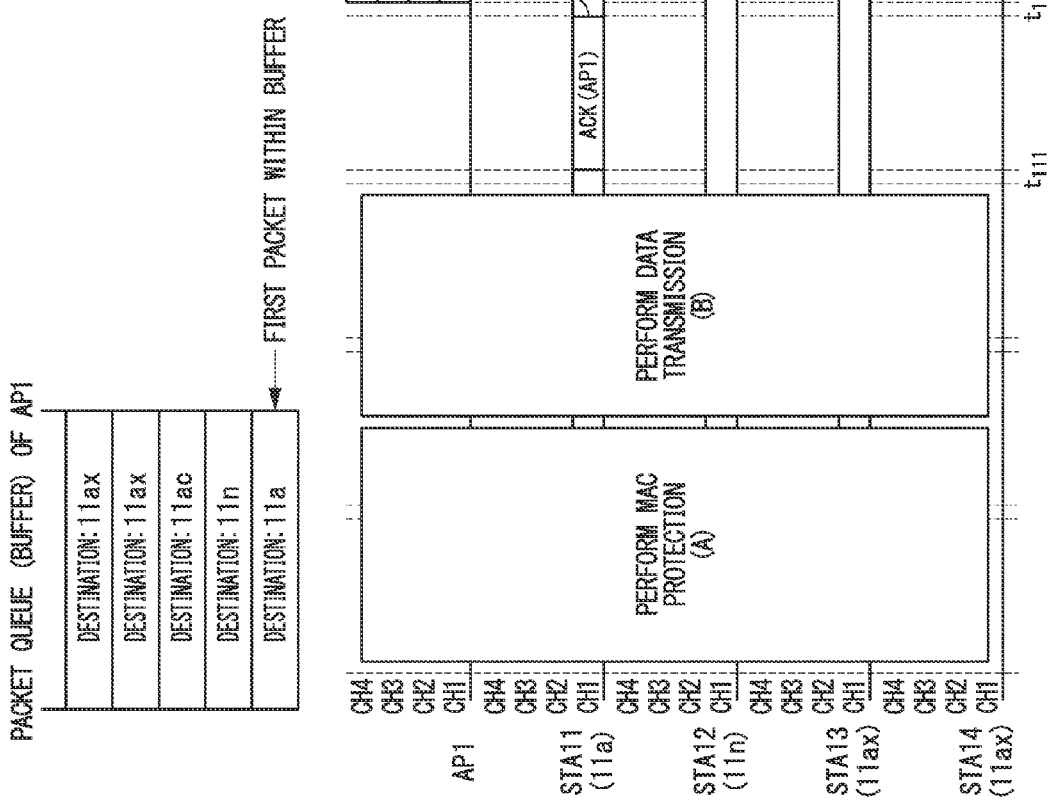
FIG. 39 is a time chart illustrating a frame sequence when the number of responding stations is two or more and UL OFDMA is used for acknowledgements.

Next, a frame sequence (C-5 illustrated in FIG. 34) when the number of responding wireless stations is two or more and UL OFDMA is used for an acknowledgement will be described with reference to FIG. 39. FIG. 39 is a time chart illustrating the frame sequence when the number of responding wireless stations is two or more and the UL OFDMA is used for the acknowledgement. An acknowledgement is carried out by performing transmission and reception of BARs and BAs on channels used for data transmission (a primary channel is also used if necessary), the BARs are transmitted by DL-OFDMA, and the BAs are transmitted by UL-OFDMA.

First, when the wireless access point AP1 transmits frames for the 11a wireless station and the 11ax wireless stations (the wireless stations STA13 and STA14), the 11a wireless station STA11 replies an ACK frame F401 via channel 1 (time $t_{111}$). Next, the wireless access point AP1 transmits BARs for the wireless station STA14 via channels 1 and 4, and transmits BAR frames F402 to F405 for the wireless station STA13 via channels 2 and 3 (time $t_{112}$). At this time, the wireless access point AP1 transmits the BARs by DL-OFDMA. In response thereto, the wireless station STA13 replies BA frames F406 and F407 via channels 2 and 3, and the wireless station STA14 replies BA frames F408 and F409 via channels 1 and 4 (time $t_{113}$). At this time, the wireless stations STA13 and STA14 reply the BAs using UL-OFDMA.

In this manner, it is possible to call a plurality of secondary wireless communication stations using the BAR frames and reply the BAs using uplink OFDMA.

<C-5 (2)>

Figure 40:
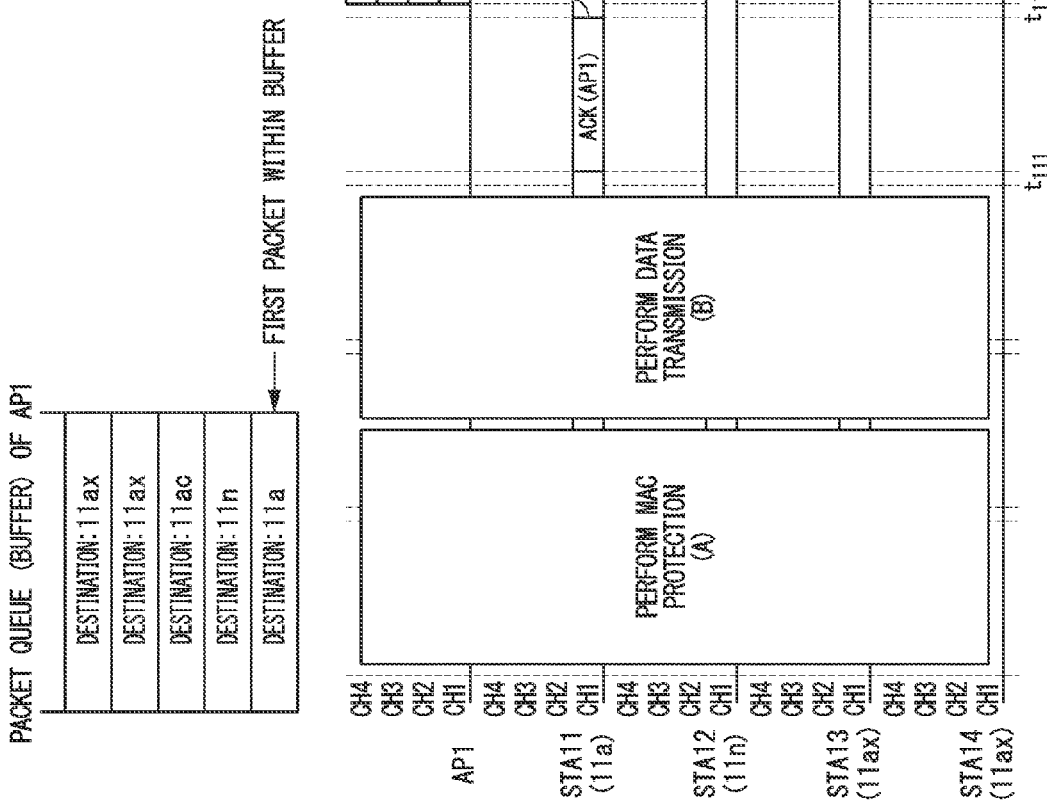
FIG. 40 is a time chart illustrating a frame sequence when the number of responding stations is two or more and UL MU-MIMO and UL OFDMA are used.

Next, a frame sequence (C-5 illustrated in FIG. 34) when the number of responding wireless stations is two or more and UL-MU-MIMO and UL-OFDMA are used will be described with reference to FIG. 40. FIG. 40 is a time chart illustrating the frame sequence when the number of responding wireless stations is two or more and the UL MU-MIMO and UL OFDMA are used. The acknowledgement using the UL-OFDMA and SDMA is performed, BARs are transmitted in the duplicate mode, and BAs are transmitted using UL-OFDMA or UL-MU-MIMO.

First, when the wireless access point AP1 transmits frames for the 11a wireless station and the 11ax wireless stations (the wireless stations STA13 and STA14), the 11a wireless station STA11 replies an ACK frame F411 via channel 1 (time $t_{111}$). Next, the wireless access point AP1 designates a group ID and transmits BAR frames F412 to F415 via all channels (time $t_{112}$). At this time, the wireless access point AP1 transmits the BAR frames using the duplicate mode. In response thereto, the wireless station STA13 replies BA frames F416 and F417 via channels 2 and 3, and the wireless station STA14 replies BA frames F418 to F421 via all channels (time $t_{113}$). At this time, the wireless stations STA13 and STA14 reply the BAs using UL-OFDMA and UL MU-MIMO.

In this manner, when communication stations that reply the BAs reply the BAs on overlapping channels, the reply can be performed using uplink OFDMA and uplink MU-MIMO.

Next, a combination of the above-described frame sequences of MAC protection will be described with reference to FIG. 41. FIG. 41 is an illustration of the frame sequences of the MAC protection capable of being combined. In FIG. 41, ⊚ and ○ represent combinable frame sequences and x represents non-combinable frame sequences. Among the combinable frame sequences, a combination represented by ⊚ is a particularly effective combination. - is a combination of the same frame sequences and represents that there is no combination.

Next, an example of a frame sequence in which frame sequences are combined will be described with reference to FIG. 42. FIG. 42 is a time chart illustrating the example of the frame sequence in which the frame sequences are combined. This is a sequence in which stations including legacy stations can exchange RTSs and CTSs, the overhead is reduced as much as possible by temporally simultaneously returning the CTSs using multiplexed CTSs from the 11ax wireless stations, and the RTSs are transmitted in the fixed bandwidth. The frame sequence illustrated in FIG. 42 is a combination of frame sequences of the above-described A1-3 and A1-6(1).

Initially, a larger band is reserved by transmitting RTS (the non-HT duplicate mode and the dynamic BW mode) frames F431 to F434 for the wireless station STA11, which is a legacy station (time $t_{111}$). In response thereto, the wireless station STA11 replies a CTS frame F435 (time $t_{112}$). On the other hand, RTS frames F436 to F439 are transmitted to the 11ax wireless stations (wireless stations STA14 and STA15) using OFDMA (time $t_{113}$). In response thereto, the wireless station STA14 replies CTS frames F440 and F441 and the wireless station STA15 replies CTS frames F442 and F443 (time $t_{114}$).

In this manner, when there is no CTS reply from a destination communication station of RTS frames on part of channels, it is possible to transmit RTSs to other wireless communication stations on all channels (fixed bandwidth mode) used for immediately previous transmission of the RTS frames and reconfirm whether it is possible to perform frame transmission on the channel on which there has been no CTS reply. Furthermore, the RTS frames are transmitted for different wireless station destinations using downlink OFDMA. Each of the wireless stations STA14 and STA15 receiving the RTS frames replies the CTSs using uplink OFDMA. Because each wireless communication station replies the CTS only on channels on which the RTS frames have been received, it is possible to simultaneously transmit the CTS frames.

Figure 43:
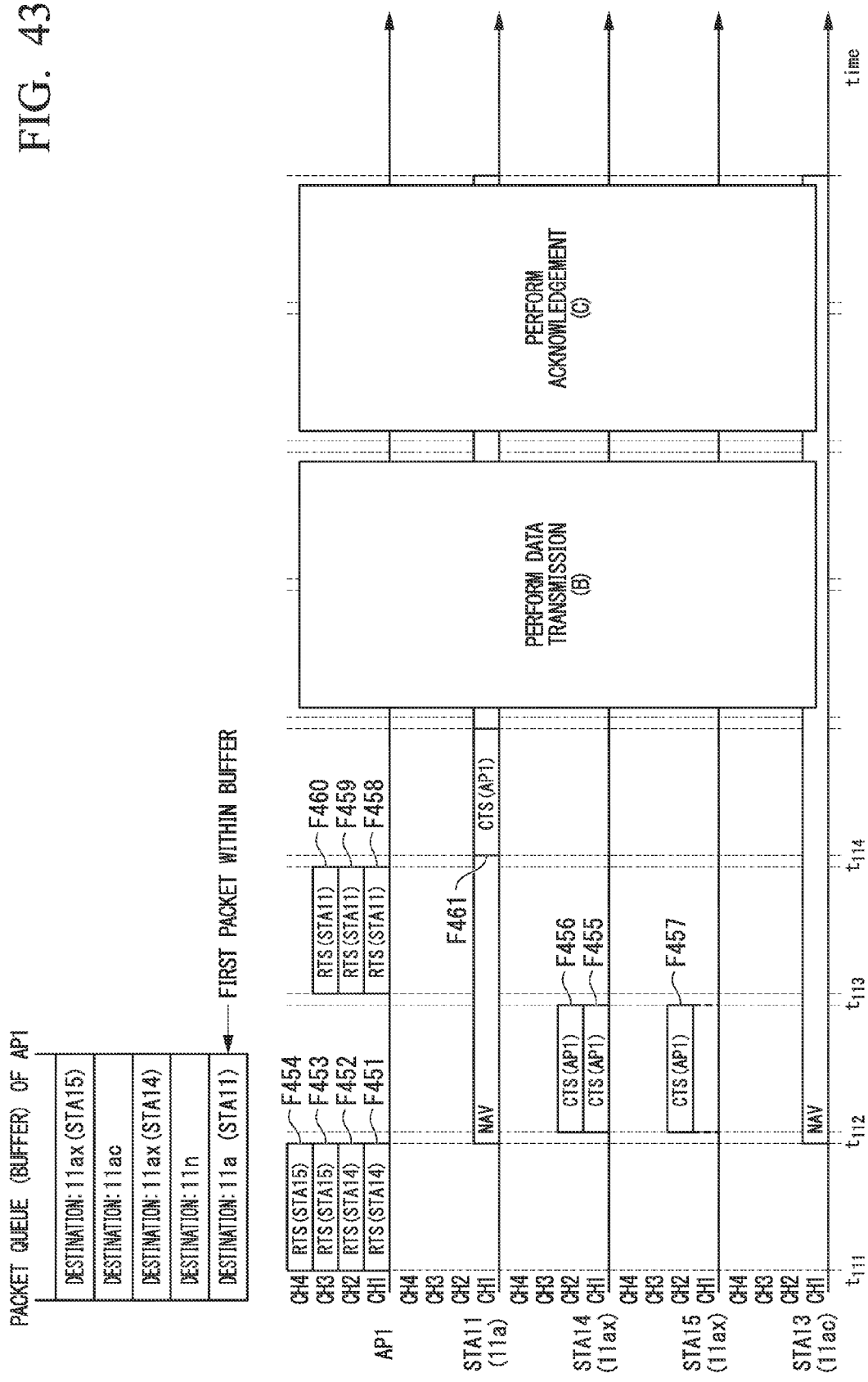
FIG. 43 is a time chart illustrating another example of a frame sequence in which frame sequences are combined.

Next, another example of the frame sequence in which frame sequences are combined will be described with reference to FIG. 43. FIG. 43 is a time chart illustrating the other example of the frame sequence in which the frame sequences are combined. This is a sequence in which stations including legacy stations can exchange RTSs and CTSs, the overhead is reduced as much as possible by temporally simultaneously returning the CTSs using multiplexed CTSs for the 11ax wireless stations, and the RTSs are transmitted in the variable bandwidth. The frame sequence illustrated in FIG. 43 is a combination of the above-described frame sequences of A1-5 and A1-6(1).

Although a first packet of a packet queue is addressed to the legacy station (11a wireless station), the wireless access point AP1 first transmits RTS (non-HT duplicate mode and dynamic BW mode) frames F451 to F454 using OFDMA on all channels each having a 20 MHz for the 11ax wireless stations and reserves a larger band (time $t_{111}$). The 11ax wireless stations called by the RTSs simultaneously replies CTS frames F455, F456, and F457 using UL-OFDMA (time $t_{112}$). Next, RTS frames F458 to F460 are transmitted for the 11a wireless station and it is checked whether it is possible to transmit data (time $t_{113}$). In response thereto, the wireless station STA11 replies a CTS frame F461 (time $t_{114}$).

In this manner, it is possible to check a transmission band commonly available for all destination stations by checking whether it is possible to perform frame transmission for destination stations that can make a reply in which a band is dynamically set in the front of the sequence and then checking whether it is possible to perform frame transmission using RTS frames for a destination station of an existing standard (11a or 11n) in which a reply bandwidth is fixed. Furthermore, the RTS frames are transmitted for different wireless stations using downlink OFDMA. Each of the wireless stations STA14 and STA15 receiving the RTS frames replies the CTSs using uplink OFDMA. Because each wireless communication station replies the CTSs only on the channels on which the RTS frames are received, it is possible to simultaneously transmit the CTS frames.

Figure 44:
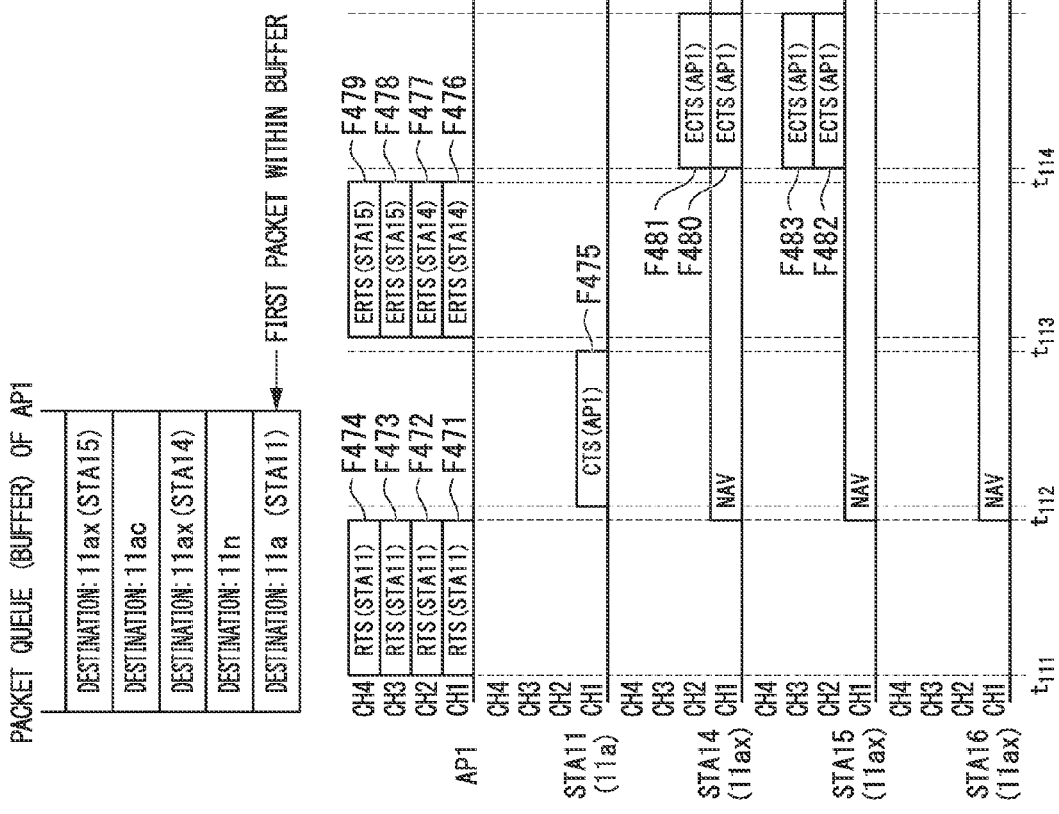
FIG. 44 is a time chart illustrating another example of a frame sequence in which frame sequences are combined.

Next, another example of the frame sequence in which frame sequences are combined will be described with reference to FIG. 44. FIG. 44 is a time chart illustrating the other example of the frame sequence in which the frame sequences are combined. This is a sequence in which stations including a legacy station can exchange RTSs and CTSs, and the exchange of information that is not included in the normal RTS/CTS such as channel information is enabled using ERTSs and ECTSs for the 11ax wireless station.

The RTS frames F471 to F474 are transmitted for the wireless station STA11, which is a legacy station (time $t_{111}$), and the wireless station STA11 replies a CTS frame F475 (time $t_{112}$). Then, ERTS frames F476 to F479 are transmitted to the 11ax wireless stations (wireless stations STA14 and STA15) after the MAC protection of the legacy station (time $t_{113}$). In response thereto, the wireless station STA14 replies ECTS frames F480 and F481 and the wireless station STA15 replies ECTS frames F482 and F483 (time $t_{114}$).

In this manner, because RTS frames are transmitted for all bands in the head of the sequence, a destination station that supports only an existing standard (11a or 11n) replies a CTS frame, it is possible to accommodate the station that supports only the existing standard in the sequence without making a functional change of the station that supports only the existing standard. Furthermore, by requesting destination stations that can handle OFDMA to reply ECTS frames by UL OFDMA using ERTS frames subsequent to the CTS frame, a time in which a plurality of destination stations that can handle OFDMA transmit ECTSs is reduced and a reduction in overhead is realized.

In addition, as illustrated in FIG. 45, it is also possible to combine frame sequences of MAC protection using only ERTSs and ECTSs. FIG. 45 is a diagram illustrating a combination of the frame sequences of MAC protection using only ERTSs and ECTSs. In FIG. 45, o represents combinable frame sequences and x represents non-combinable frame sequences. - is a combination of the same frame sequences and represents that there is no combination.

Next, a sequence in which MAC protection, data transmission, and an acknowledgement are performed by combining the above-described frame sequences will be described with reference to FIGS. 46 to 51.

FIG. 46 is a time chart illustrating a frame sequence in which frame sequences of A1-3(1) (or A1-5), B-1(1), and C-3 are combined. First, if there is data for the 11a wireless station and the 11ax wireless station, the wireless access point AP1 transmits RTS frames F419 to F494 for the 11ax wireless access point via all channels each having a 20 MHz (time $t_{111}$). In response thereto, the 11ax wireless station STA14 replies CTS frames F495 to F498 (time $t_{112}$). Next, the wireless access point AP1 checks whether it is possible to transmit data by transmitting RTS frames F499 to F502 for the 11a wireless station (time $t_{113}$). In response thereto, the wireless station STA11 replies a CTS frame F503 (time $t_{114}$). Then, the wireless access point AP1 transmits frames F504 to F507 for the 11a wireless station and the 11ax wireless station (time $t_{115}$). The wireless station STA11 replies an ACK frame F508 (time $t_{116}$). In addition, the wireless access point AP1 transmits BAR frames F509 to F512 to the 11ax wireless station (time $t_{117}$), and the 11ax wireless station STA14 replies BA frames F513 to F516.

In this manner, it is possible to realize MAC protection, data transmission, and an ACK response for arranging the destination station that supports only an existing standard on the primary channel and arranging the station that can handle OFDMA on the secondary channels by using the present frame sequence, the secondary channels which have not been utilized in a transmission form for a destination station that supports only a legacy existing standard can be used in data transmission, and thus transmission efficiency is improved.

Figure 47:
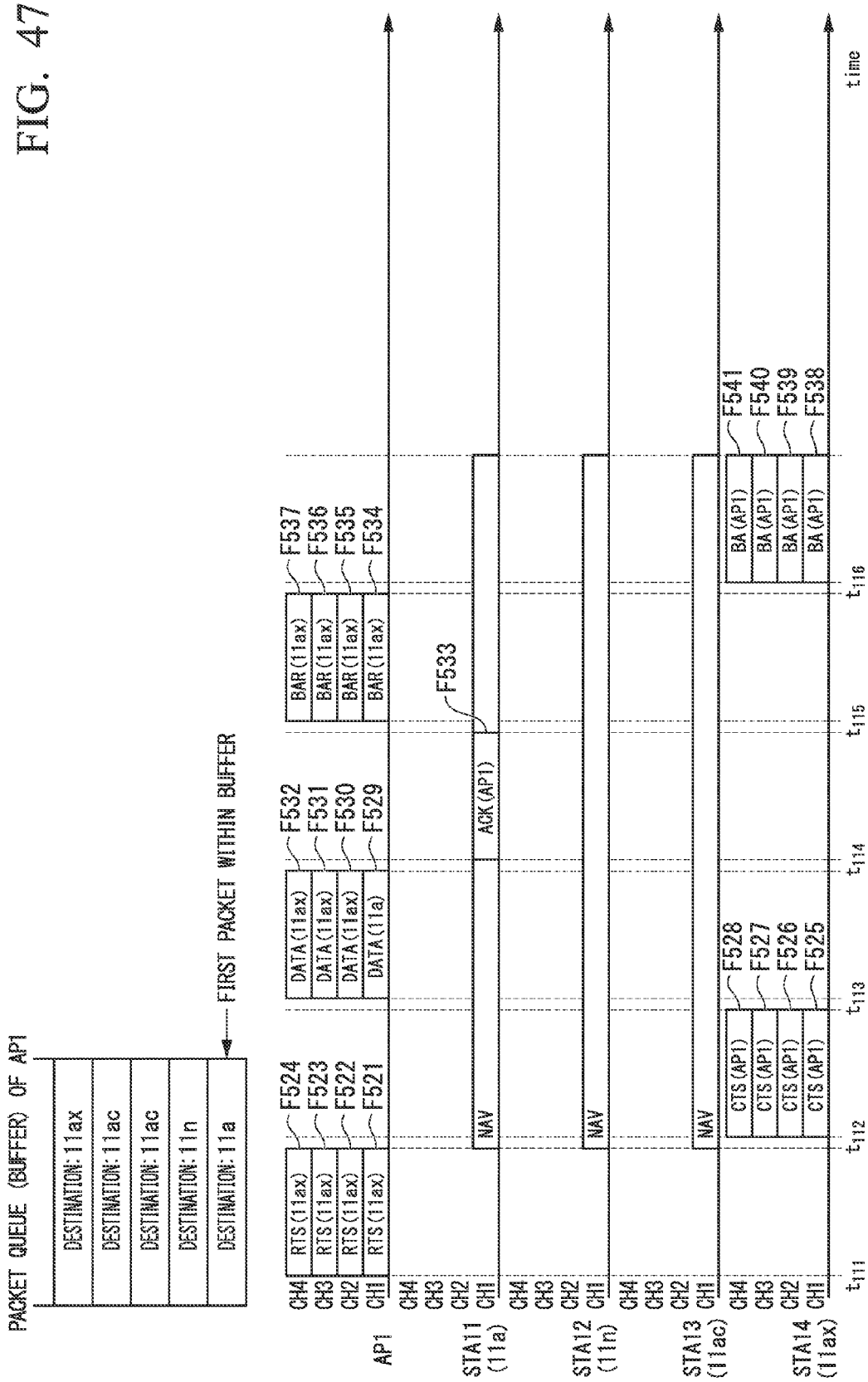
FIG. 47 is a time chart illustrating a sequence in which MAC protection, data transmission, and acknowledgements are performed by combining frame sequences.

FIG. 47 is a time chart illustrating a frame sequence in which the frame sequences of A1-1, B-1, and C-3 are combined. First, if there is data for the 11a wireless station and the 11ax wireless station, the wireless access point AP1 transmits RTS frames F511 to F524 for the 11ax wireless access point via all channels each having a 20 MHz (time $t_{111}$). In response thereto, the 11ax wireless station STA14 replies CTS frames F525 to F528 (time $t_{112}$). Then, the wireless access point AP1 transmits a frame F529 for the 11a wireless station and transmits frames F530 to F532 for the 11ax wireless station (time $t_{113}$). In response thereto, the wireless station STA11 replies an ACK frame F533 (time $t_{114}$). Then, the wireless access point AP1 transmits BAR frames F534 to F537 to the 11ax wireless station (time $t_{115}$). In response thereto, the 11a wireless station STA14 replies BA frames F538 to F541 (time $t_{116}$).

In this manner, with the present frame sequence, after MAC protection for the station that can handle OFDMA is performed, a wireless frame for the destination station that can handle only the existing standard is transmitted on the primary channel, a wireless frame for the destination station that can handle OFDMA is transmitted through OFDMA transmission on the secondary channel, and acknowledgements are performed such that the destination station that can handle only the existing standard initially transmits an ACK frame, and transmission requests for BA frames are sequentially performed by BAR frames for the destination station that can handle OFDMA. Thereby, no additional function for the destination station that can handle only the existing standard is necessary, OFDMA transmission in which the destination station that can handle only the existing standard and the destination station that can handle OFDMA are combined is possible, and utilization efficiency of the secondary channel is improved.

Figure 48:
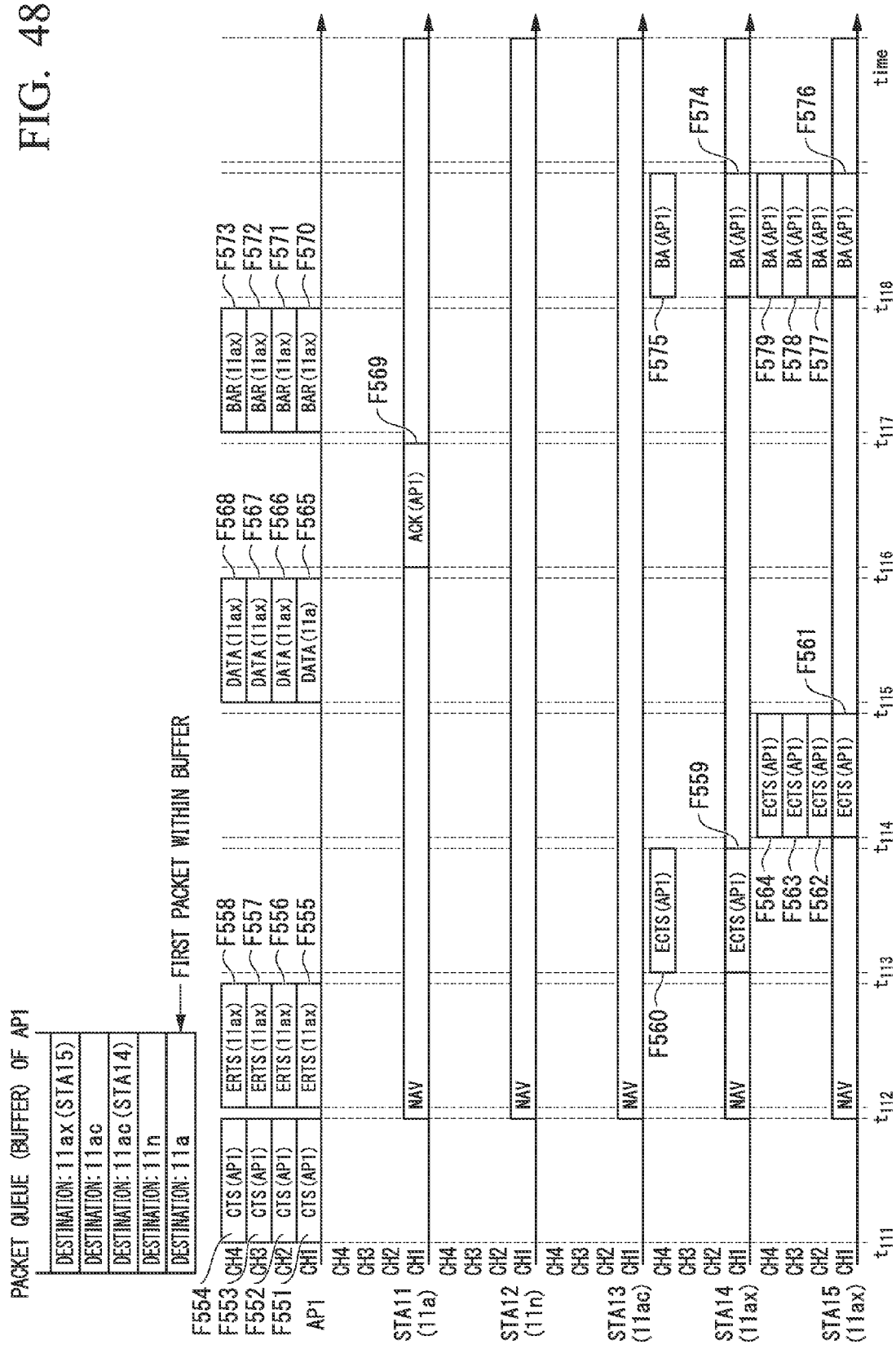
FIG. 48 is a time chart illustrating a sequence in which MAC protection, data transmission, and acknowledgements are performed by combining frame sequences.

FIG. 48 is a time chart illustrating a frame sequence in which the frame sequences of CTS-to-Self, A2-2, B-1(1), and C-5(2) are combined. First, the wireless access point AP1 transmits CTS frames F551 to F554 of CTS-to-Self so as to cause the legacy stations to set the NAVs (time $t_{111}$). Subsequently, the wireless access point AP1 transmits ERTS frames F555 to F558 for the 11ax wireless stations (time $t_{112}$). In response thereto, the 11ax wireless station STA14 replies ECTS frames F559 and F560 (time $t_{113}$). In addition, the 11ax wireless station STA15 replies ECTS frames F561 to F564 (time $t_{114}$). Then, the wireless access point AP1 transmits frames F565 to F568 for the 11a wireless station and the 11ax wireless stations (time $t_{115}$).

Next, the wireless station STA11 replies an ACK frame F569 (time $t_{116}$). Subsequently, the wireless access point AP1 transmits BAR frames F570 to F573 for the 11ax wireless stations (time $t_{117}$). In response thereto, the 11ax wireless station STA14 replies BA frames F574 and F575 and the 11ax wireless station STA15 replies BA frames F576 to F579 (time $t_{118}$).

In this manner, with the present frame sequence, an available channel is checked with destination stations that can handle OFDMA using ERTS frames after NAVs are set by CTS frames which can be read by all stations including those of existing standards in the head of the sequence, and thus it is possible to more reliably exchange ERTS frames and ECTS frames. In addition, it is possible to realize MAC protection, data transmission, and an ACK response for arranging the destination station that supports only an existing standard on the primary channel and arranging the stations that can handle OFDMA on the secondary channels, the secondary channels which have not been utilized in a transmission form for a destination station that supports only the legacy existing standard can be used in data transmission, and thus transmission efficiency is improved.

Figure 49:
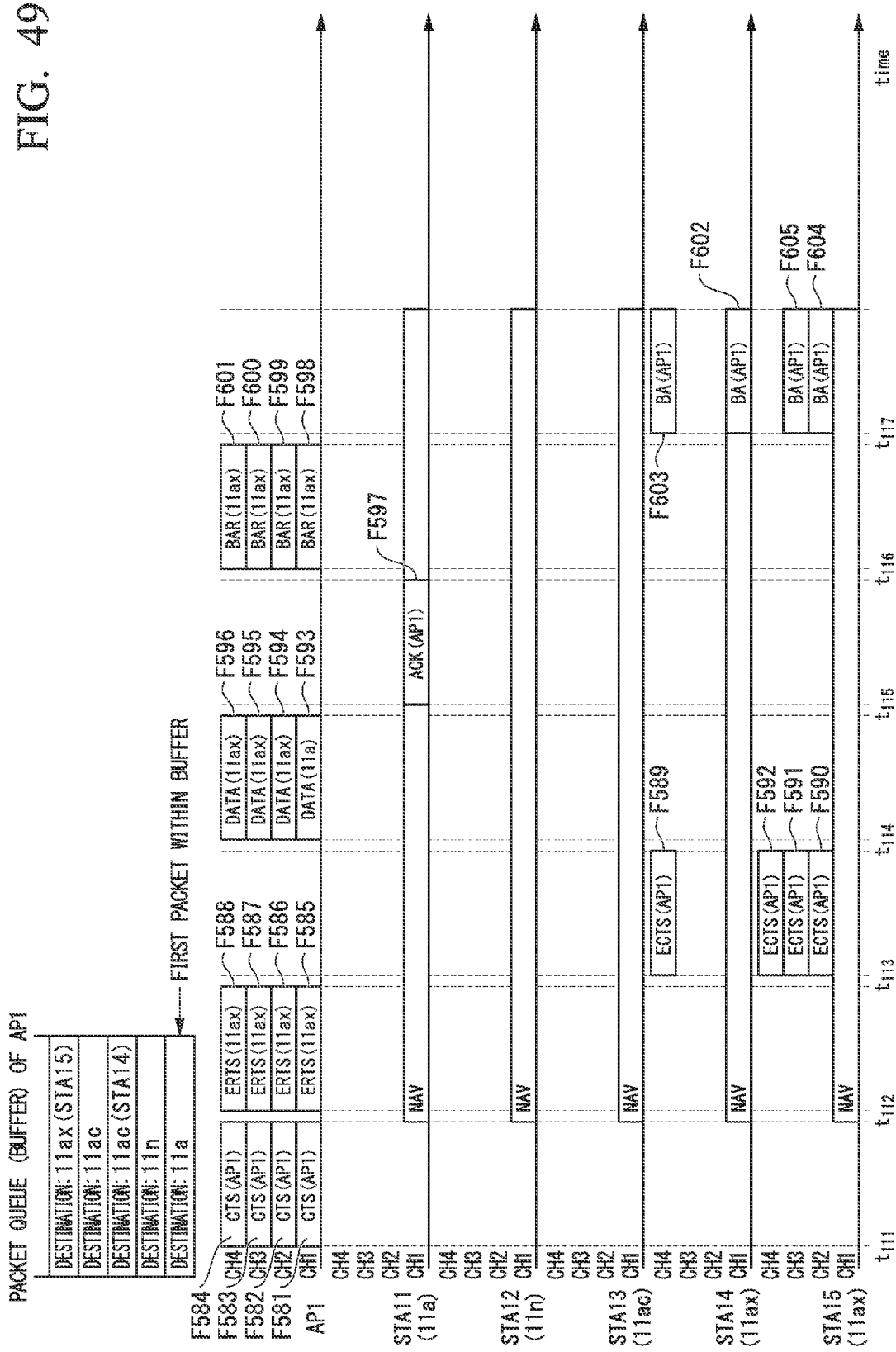
FIG. 49 is a time chart illustrating a sequence in which MAC protection, data transmission, and acknowledgements are performed by combining frame sequences.

FIG. 49 is a time chart illustrating a frame sequence in which the frame sequences of CTS-to-Self, A2-5(1), B-1(1), and C-5(1) are combined. First, the wireless access point AP1 transmits CTS frames F581 to F584 of CTS-to-Self so as to cause the legacy stations to set the NAVs (time $t_{111}$). Subsequently, the wireless access point AP1 transmits ERTS frames F585 to F588 for the 11ax wireless stations (time $t_{112}$). In response thereto, the 11ax wireless station STA14 replies an ECTS frame F589 and the 11ax wireless station STA15 replies ECTS frames F590 to F592 (time $t_{113}$). Then, the wireless access point AP1 transmits frames F593 to F596 for the 11a wireless station and the 11ax wireless stations using SDMA+OFDMA (SDMA in channel 4) (time $t_{114}$).

Next, the wireless station STA11 replies an ACK frame F597 (time $t_{115}$). Subsequently, the wireless access point AP1 transmits BAR frames F598 to F601 for the 11ax wireless stations (time $t_{116}$). In response thereto, the 11ax wireless station STA14 replies BA frames F602 and F603 and the 11ax wireless station STA15 replies BA frames F604 and F605 (time $t_{117}$).

In this manner, with the present frame sequence, an available channel is checked with destination stations that can handle OFDMA using ERTS frames after NAVs are set by CTS frames which can be read by all stations including those of existing standards in the head of the sequence, and thus it is possible to more reliably exchange ERTS frames and ECTS frames. In addition, by utilizing uplink OFDMA transmission in the reply of the ECTS frames, a transmission time is shortened and transmission efficiency improvement is realized as compared to the case in which transmission is performed in time division. It is possible to realize MAC protection, data transmission, and an ACK response for arranging the destination station that supports only the existing standards on the primary channel and arranging the stations that can handle OFDMA on the secondary channels, the secondary channels which have not been utilized in a transmission form for a destination station that supports only the legacy existing standards can be used in data transmission, and thus transmission efficiency is improved.

Figure 50:
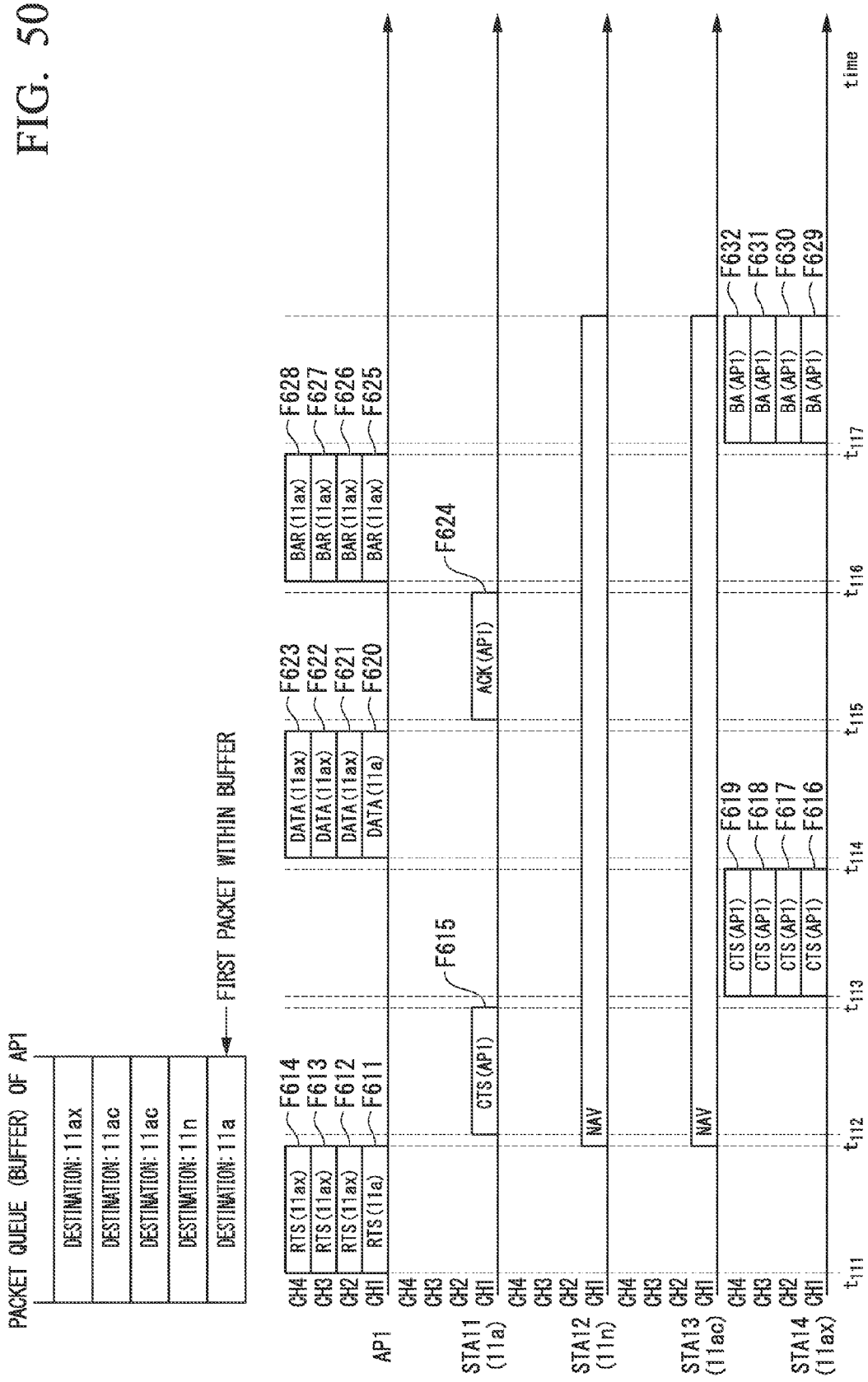
FIG. 50 is a time chart illustrating a sequence in which MAC protection, data transmission, and acknowledgements are performed by combining frame sequences.

FIG. 50 is a time chart illustrating a frame sequence in which the frame sequences of A1-8, B-1(1), and C-3 are combined. First, if there is data for the 11a wireless station and the 11ax wireless station, the wireless access point AP1 transmits RTS frames F611 to F614 via the primary channel for the 11a wireless station and the remaining secondary channels for the 11ax wireless station (time $t_{111}$). In response thereto, the wireless station STA11 replies a CTS frame F615 (time $t_{112}$). In addition, the 11ax wireless station STA14 replies CTS frames F616 to F619 (time $t_{113}$).

Next, the wireless access point AP1 transmits frame F620 to F623 for the 11a wireless station and the 11ax wireless station (time $t_{114}$). In response thereto, the wireless station STA11 replies an ACK frame F624 (time $t_{115}$). Subsequently, the wireless access point AP1 transmits BAR frames F625 to F628 for the 11ax wireless station (time $t_{116}$). In response thereto, the 11ax wireless station STA14 replies BA frames F629 to F632 (time $t_{117}$).

In this manner, with the present frame sequence, it is possible to realize MAC protection, data transmission, and an ACK response, the secondary channels which have not been utilized in a transmission form for a destination station that supports only the legacy existing standards can be used in data transmission, and thus transmission efficiency is improved. In addition, the destination station that supports only the existing standard is arranged on the primary channel, the station that can handle OFDMA is arranged on the secondary channels, the destination station that can support only the existing standard initially replies a CTS frame and then the destination station that can handle OFDMA successively replies CTS frames, and thus it is possible to realize the MAC protection, the data transmission, and the ACK response without changing the destination station that supports only the existing standard and it is possible to further increase the transmission efficiency because a plurality of CTS frames are requested by a single RTS frame transmission.

Figure 51:
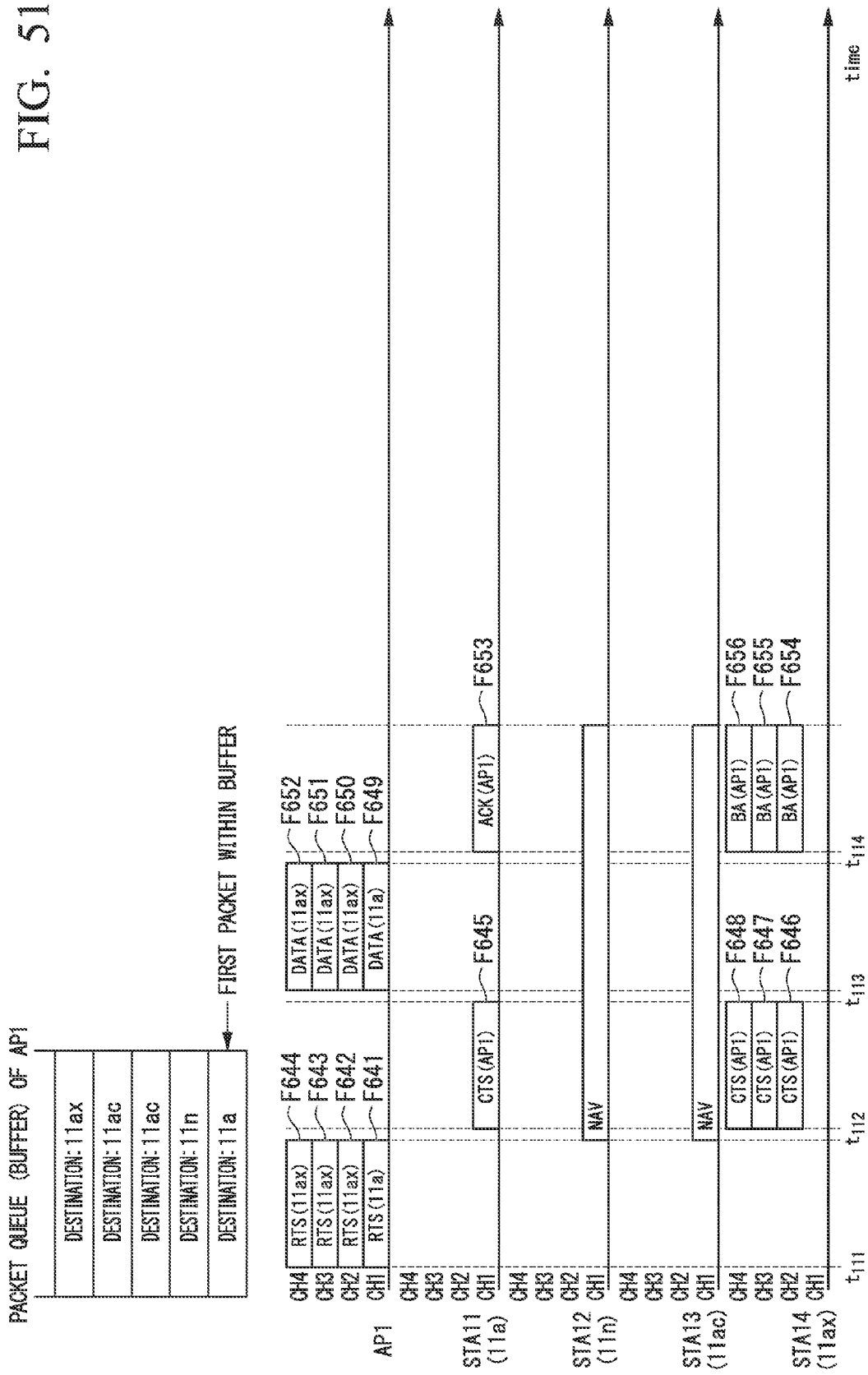
FIG. 51 is a time chart illustrating a sequence in which MAC protection, data transmission, and acknowledgements are performed by combining frame sequences.

FIG. 51 is a time chart illustrating a frame sequence in which the frame sequences of A1-7(1), B-1(1), and C-4 are combined. First, if there is data for the 11a wireless station and the 11ax wireless station, the wireless access point AP1 transmits RTS frames F641 to F644 via the primary channel for the 11a wireless station and the remaining secondary channels for the 11ax wireless station (time $t_{111}$). In response thereto, the wireless station STA11 replies a CTS frame F645 and the 11ax wireless station STA14 simultaneously replies CTS frames F646 to F648 (time $t_{112}$).

Next, the wireless access point AP1 transmits frame F649 to F652 for the 11a wireless station and the 11ax wireless station (time $t_{114}$). In response thereto, the wireless station STA11 simultaneously replies an ACK frame F653 and the 11ax wireless station STA14 simultaneously replies BA frames F654 to F656 (time $t_{114}$).

In this manner, with the present frame sequence, it is possible to reduce the overhead of a control frame by combining a station that can handle only the existing standard and a destination station that can handle OFDMA for the portion of the MAC protection and performing OFDMA transmission in both the downlink and the uplink. Furthermore, it is possible to use the secondary channels which have not been utilized in a transmission form for a destination station that supports only the legacy existing standard in the portion of the data transmission, and thus transmission efficiency is improved.

As described above, because a wireless communication station serving as the transmission right acquiring wireless communication station can simultaneously transmit data for a plurality of wireless communication stations via a plurality of channels, it is possible to improve the system throughput and also improve frequency utilization efficiency.

Figure 52:
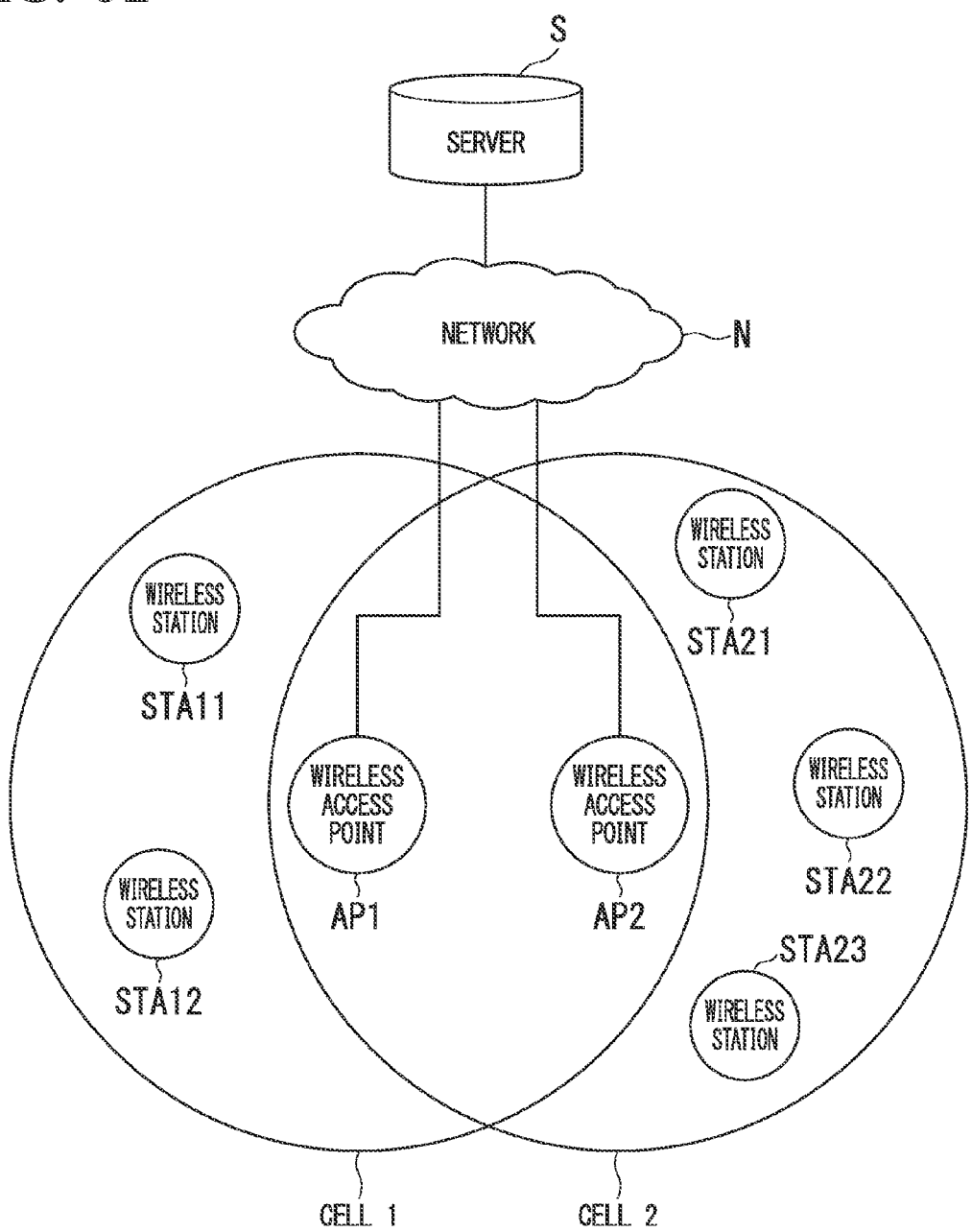
FIG. 52 is a diagram illustrating a configuration in which a plurality of wireless access points cooperate and perform wireless communication while each cell assigning a channel which is not scheduled to use in its cell to another cell.

Next, a method in which a plurality of wireless access points cooperate and each of which assigns a channel that is not scheduled to use in its cell to another cell to thereby effectively use frequency resources will be described. FIG. 52 is a diagram illustrating a system configuration in which the plurality of wireless access points cooperate, each of which assigns the channel that is not scheduled to use in its cell to the other cell, and perform wireless communication. Cell 1 of the wireless communication system includes a wireless access point AP1 and wireless stations STA11 and STA12, which are wireless communication stations. In addition, cell 2 includes a wireless access point AP2 and wireless stations STA21 to STA23, which are wireless communication stations. The wireless access point AP1 and the wireless access point AP2 are connected to a network N, and information exchange for performing a cooperative operation via a server S connected to the network N can be performed. It is to be noted that although FIG. 52 illustrates a configuration in which the information exchange for performing the cooperative operation via the server S is performed, the two wireless access points AP1 and AP2 may be configured to establish a direct communication circuit if only the information exchange for performing the cooperative operation is performed. Because detailed configurations of the wireless access points and the wireless stations are the same as those illustrated in FIG. 1, a detailed description thereof will be omitted here.

Next, preconditions when the plurality of wireless access points cooperate and each assigns the channel that is not scheduled to use in its cell to the other cell will be described. The wireless access point AP1 has to satisfy the following four conditions (1) to (4) in order to assign a channel which is not to be used to the wireless access point AP2.

(1) The wireless access points AP1 and AP2 can directly transmit and receive a wireless frame.

(2) An agreement that a cooperation partner of the wireless access point AP1 is the wireless access point AP2 has already been reached.

(3) Two wireless access points AP1 and AP2 use the same primary channel.

(4) There are one or more channels which are not to be used by the wireless access point AP1 within an acquired TXOP period.

Although the following description describes that the wireless access point AP1 has acquired a channel access right, the acquisition of the channel access right is not necessarily performed by the wireless access point AP1.

<Frame Sequence in which MAC Protection by Wireless Access Point Cooperation is Performed>

Next, the frame sequence in which the MAC protection is performed by wireless access point cooperation will be described with reference to the drawings.

<Wireless Access Point Cooperation 1 (1)>

Figure 53:
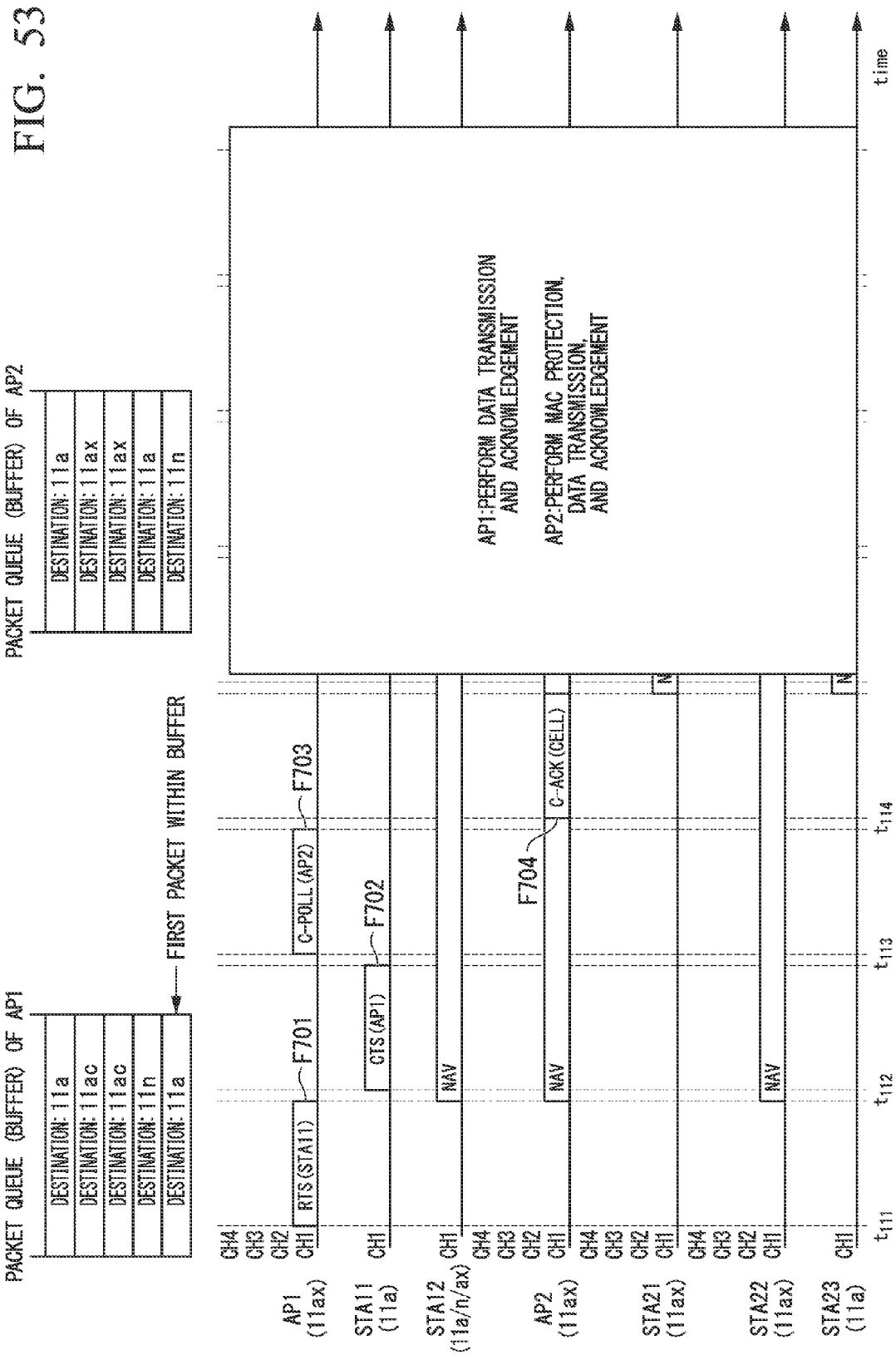
FIG. 53 is a time chart illustrating a frame sequence in which wireless access points cooperate to perform MAC protection.

FIG. 53 is a time chart illustrating a frame sequence in which wireless access points cooperate to perform MAC protection. Both the access point apparatus AP1 and the wireless access point AP2 cooperate and assigns a surplus channel (which is not scheduled to be used by a cell which has acquired an access right within the TXOP section) to another cell, thereby effectively utilizing frequencies. In FIG. 53, there is no frame to be transmitted for a wireless communication station that can be transmitted using OFDMA within a packet queue of the wireless access point AP1. Therefore, when data is transmitted for a legacy station such as an 11a wireless station or a 11n wireless station, the wireless access point AP1 assigns a secondary channel group that is not scheduled to be used to the wireless access point AP2, and cell 2 of the wireless access point AP2 uses these channels, and thus frequency utilization efficiency is improved.

First, when the wireless access point AP1 acquires an access right for data transmission for the wireless station STA11, the wireless access point AP1 transmits an RTS frame F701 to the wireless station STA11 on an available channel (primary channel) in the wireless station STA11 (time $t_{111}$). When a reply of a CTS frame F702 to the RTS is sent from the wireless station STA11 (time $t_{112}$), a cooperative polling (C-POLL) frame F703 is transmitted for the wireless access point AP2 so as to assign secondary channels (channels 2 to 4 in this case) to the wireless access point AP2 (time $t_{113}$). This C-POLL frame includes a transmission-source address (TA), a destination address (RA), list information of numbers of channels to be assigned, and information of a period to be assigned. At this time, the wireless access point AP1 may reserve channel 2 for providing a guard band (GB) and assign only channels 3 and 4 to the wireless access point AP2.

Next, the wireless access point AP2 receiving the C-POLL from the wireless access point AP1 transmits a cooperative ACK (C-ACK) frame F704 for the wireless access point AP1 on the primary channel (time $t_{114}$). This C-ACK is used to perform broadcast transmission for all cells. In addition, the C-ACK includes the address of a transmission-source wireless access point, list information of numbers of channels to be used, the number of a channel to be temporarily used as the primary channel, and information of a period to be used. Thereby, NAVs are set on the primary channel of the wireless stations associated with the wireless access point AP2 and interruption by the legacy station is prevented.

In this manner, the wireless access point AP1 acquiring the access right for the channel by exchanging the RTSs and the CTSs permits the cooperating wireless access point (here, AP2) to use its own secondary channels which are not scheduled to use using C-POLL after securing channels necessary for its own transmission including the primary channel and the wireless access point AP2 receiving permission for use of the secondary channels from an adjacent cell transmits a C-ACK via the primary channel, thereby making it possible to notify the wireless access point AP1 that the secondary channel is used by the station itself and notify the wireless stations within the cell of the wireless access point AP2 of information of a channel to be temporarily used as the primary channel for a time in which use right is permitted by the wireless access point AP1 and a time during which transmission and reception are performed. In addition, with the above procedure, it is possible to cause the wireless stations connected to the wireless access points AP1 and AP2 to set the NAVs and protect data transmission to be performed by the wireless access points AP1 and AP2.

<Wireless Access Point Cooperation 1 (2)>

Figure 54:
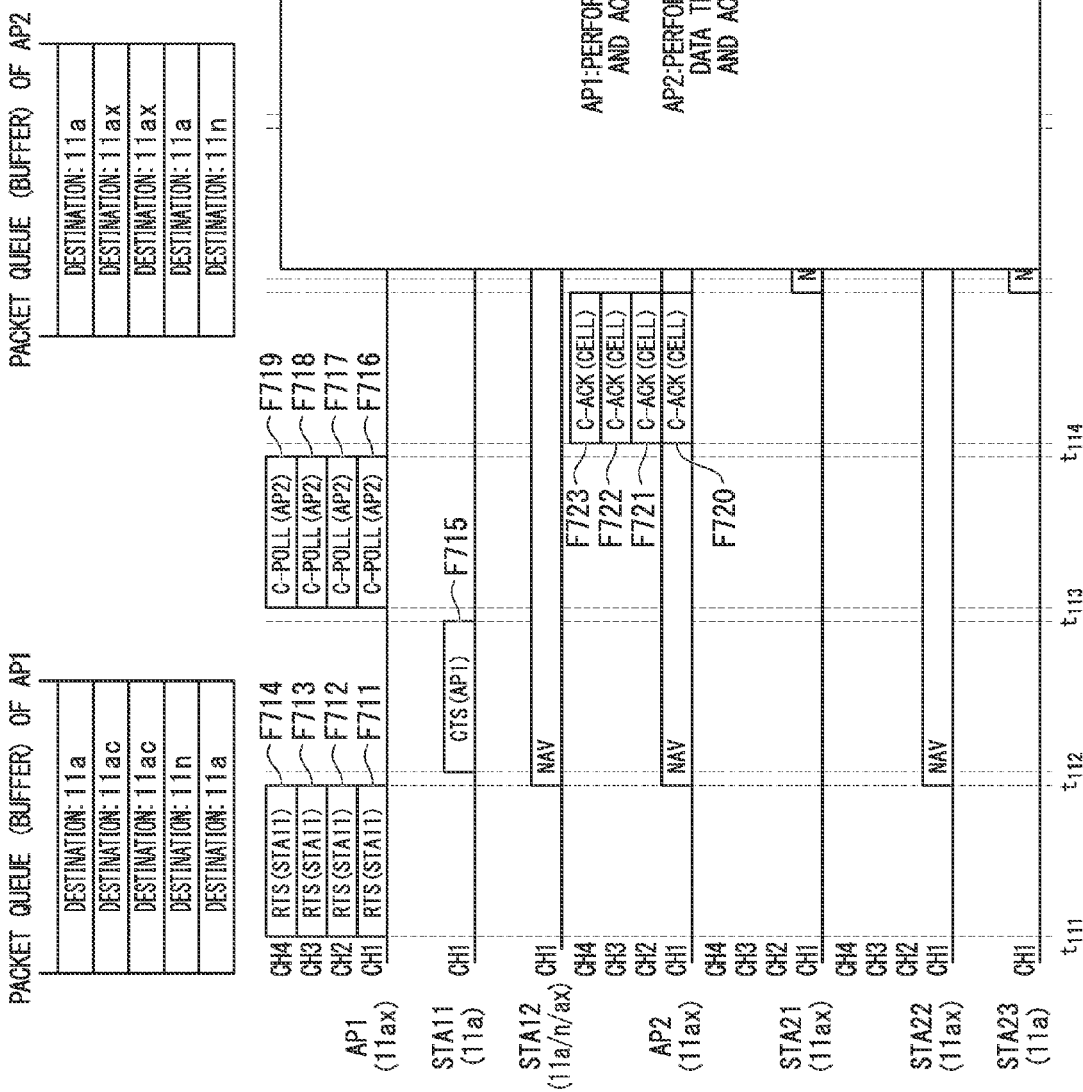
FIG. 54 is a time chart illustrating a frame sequence in which wireless access points cooperate to perform MAC protection.

FIG. 54 is a time chart illustrating a frame sequence in which wireless access points cooperate to perform MAC protection. Although this is a frame sequence which is substantially the same as that of the above-described wireless access point cooperation 1-1, in the frame sequence illustrated in FIG. 54, the wireless access point AP1 transmits RTS frames F711 to F714 for the wireless station STA11 using the duplicate mode even on a larger channel including a channel to be assigned to the wireless access point AP2 (time $t_{111}$).

When a reply of a CTS frame F715 to the RTS is sent from the wireless station STA11 (time $t_{112}$), cooperative polling (C-POLL) frames F716 to F719 are transmitted for the wireless access point AP2 (time $t_{113}$). These C-POLLs each include a transmission-source address (TA), a destination address (RA), list information of numbers of channels to be assigned, and information of a period to be assigned. Subsequently, the wireless access point AP2 receiving the C-POLLs from the wireless access point AP1 transmits cooperative ACK (C-ACK) frames F720 to F723 for the wireless access point AP1 on all channels (time $t_{114}$). These C-ACKs each include the address of a transmission-source wireless access point, list information of numbers of channels to be used, the number of a channel to be temporarily used as the primary channel, and information of a period to be used.

Thereby, the wireless access point can secure resources for all channels, including a channel necessary for cooperation, on which data transmission may be started. In addition, because the use right of the secondary channels is unlikely to be taken away by an adjacent cell with which cooperation is not performed while the wireless access point AP1 is securing the resources using RTSs and CTSs, there is an advantage in that the secondary channels can be easily secured.

<Wireless Access Point Cooperation 2>

Figure 55:
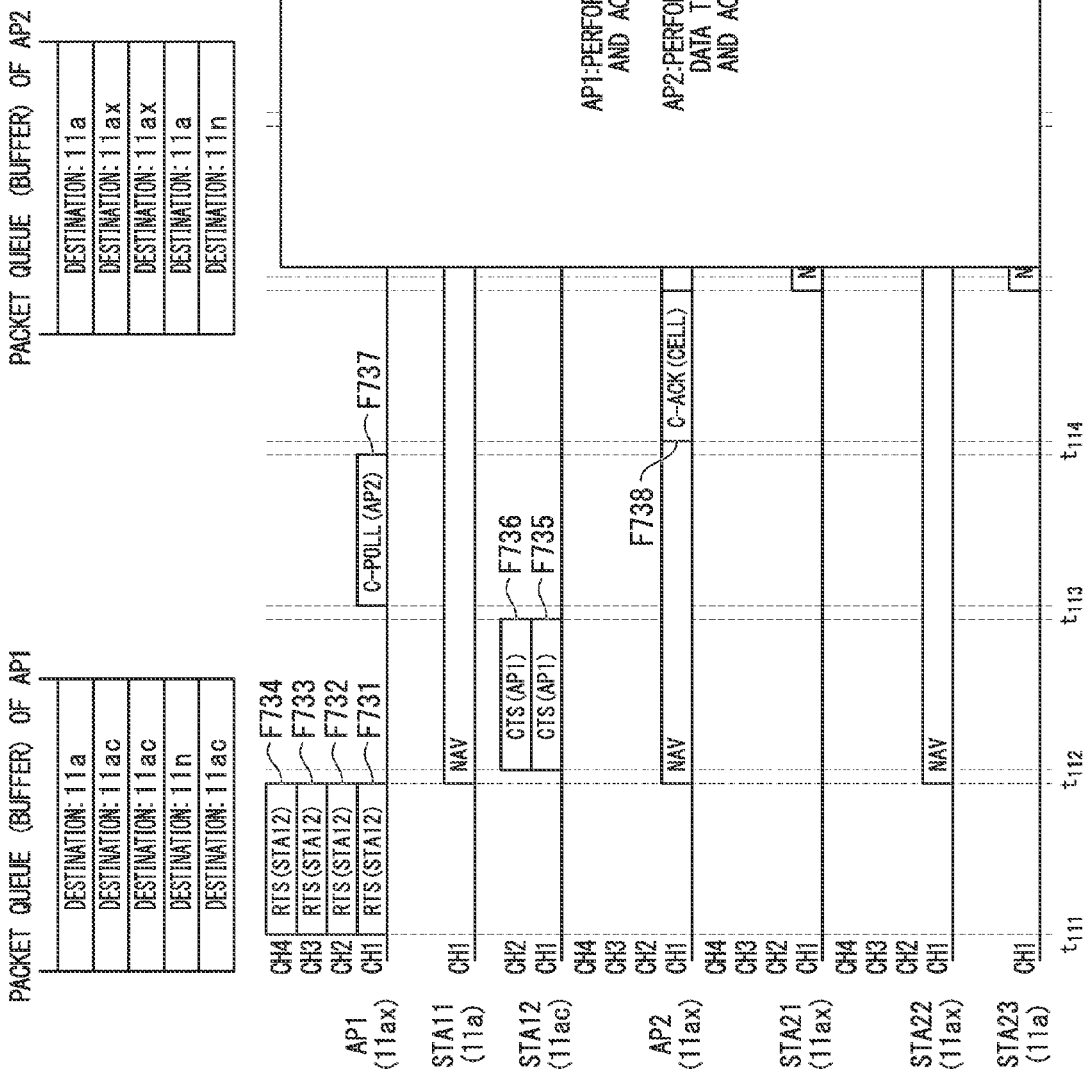
FIG. 55 is a time chart illustrating a frame sequence in which wireless access points cooperate to perform MAC protection.

FIG. 55 is a time chart illustrating a frame sequence in which wireless access points cooperate to perform MAC protection. The wireless access point AP1 is scheduled to transmit data on four channels (a bandwidth of 80 MHz) for the wireless station STA12 (11ac wireless station) and transmits RTS frames F731 to F734 on all the four channels in the duplicate mode (time $t_{111}$), and the wireless station STA12 replies CTS frames F735 and F736 on available channels (time $t_{112}$). In response thereto, the wireless access point AP1 transmits a C-POLL frame F737 to the wireless access point AP2 (time $t_{113}$), and assigns only channels on which there has been no CTS reply to the wireless access point AP2. This C-POLL includes a transmission-source address (TA), a destination address (RA), list information of numbers of channels to be assigned, and information of a period to be assigned. Then, the wireless access point AP2 replies a C-ACK frame F738 (time $t_{114}$). This C-ACK includes the address of a transmission-source wireless access point, list information of numbers of channels to be used, the number of a channel to be temporarily used as the primary channel, and information of a period to be used.

In this manner, because the wireless access point AP1 acquiring the access right secures transmission right of only channels available in a destination wireless station (STA12 in this case) by assigning only channels on which a CTS reply has been absent or a CTS reply has failed to an adjacent cell which is a cooperation partner and channel that cannot be used by the wireless station STA12 (i.e., that is likely to be used by another cell around the wireless station STA12) are not scheduled to use for data transmission, there is an advantageous effect in that it is possible to suppress interference in transmission and reception of data in a neighboring cell. In addition, the wireless access point AP1 can assign the transmission right of the channels which are not scheduled to use in its own cell to the wireless access point AP2 which is a cooperation partner and data communication can be performed on the assigned channels in the cell of the wireless access point AP2. Therefore, because the channels which are not scheduled to use in the cell of the wireless access point AP1 can be used in the cell of the cooperating wireless access point AP2, it is possible to obtain high frequency utilization efficiency. Then, the wireless access point AP2 receiving the assignment of the secondary channels from the wireless access point AP1 can cause the wireless stations connected to the wireless access point AP2 to set NAVs via the primary channel. In addition, it is possible to provide a notification of information of a channel to be temporarily used as the primary channel for a time in which use right is permitted by the wireless access point AP1 and a time during which transmission and reception are performed via the primary channel.

<Wireless Access Point Cooperation 3>

Figure 56:
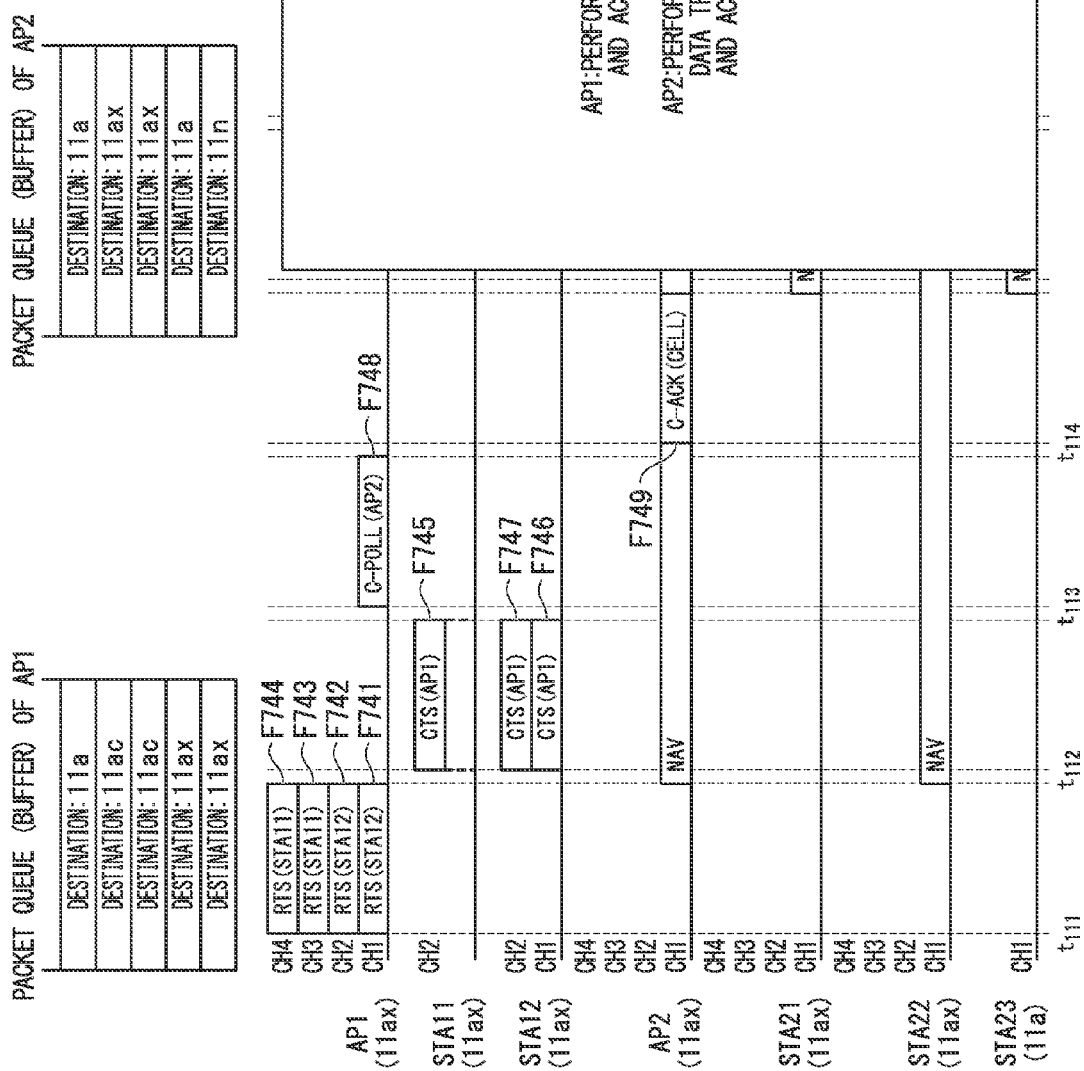
FIG. 56 is a time chart illustrating a frame sequence in which wireless access points cooperate to perform MAC protection.

FIG. 56 is a time chart illustrating a frame sequence in which wireless access points cooperate to perform MAC protection. This is substantially the same as the frame sequence of the wireless access point cooperation 2. The wireless access point AP1 transmits RTS frames F741 to F744 to wireless stations STA11 and STA12 that can handle OFDMA (time $t_{111}$), the wireless station STA11 replies a CTS frame F745, and the wireless station STA12 replies CTS frames F746 and F747 (time $t_{112}$). In response thereto, the wireless access point AP1 transmits a C-POLL frame F748 to the wireless access point AP2 (time $t_{113}$), and assigns a channel which is not to be used, to the wireless access point AP2. This C-POLL includes a transmission-source address (TA), a destination address (RA), list information of numbers of channels to be assigned, and information of a period to be assigned. Then, the wireless access point AP2 replies a C-ACK frame F749 (time $t_{114}$). This C-ACK includes the address of a transmission-source wireless access point, list information of numbers of channels to be used, the number of a channel to be temporarily used as the primary channel, and information of a period to be used.

In this manner, because the wireless access point AP1 secures transmission rights of only channels available in the destination wireless stations (STA11 and STA12 in this case) by the wireless access point AP1 transmitting RTSs using the OFDMA and performing data transmission within its own area via only channels on which CTSs have been returned and the wireless access point AP1 does not use channels that cannot be used by the wireless stations STA11 and STA12 (i.e., that is likely to be used by another cell around the wireless station STA11 or STA12) for data transmission, there is an advantageous effect in that it is possible to suppress interference in transmission and reception of data in a neighboring cell. In addition, the wireless access point AP1 can assign transmission rights of the channels that are not scheduled to use in its own cell to the wireless access point AP2 which is a cooperation partner and data communication can be performed on the assigned channels in the cell of the wireless access point AP2. Therefore, because the channels that are not scheduled to use in the cell of the wireless access point AP1 can be used in the cell of the cooperating wireless access point AP2, it is possible to obtain high frequency utilization efficiency.

<Wireless Access Point Cooperation 4>

Figure 57:
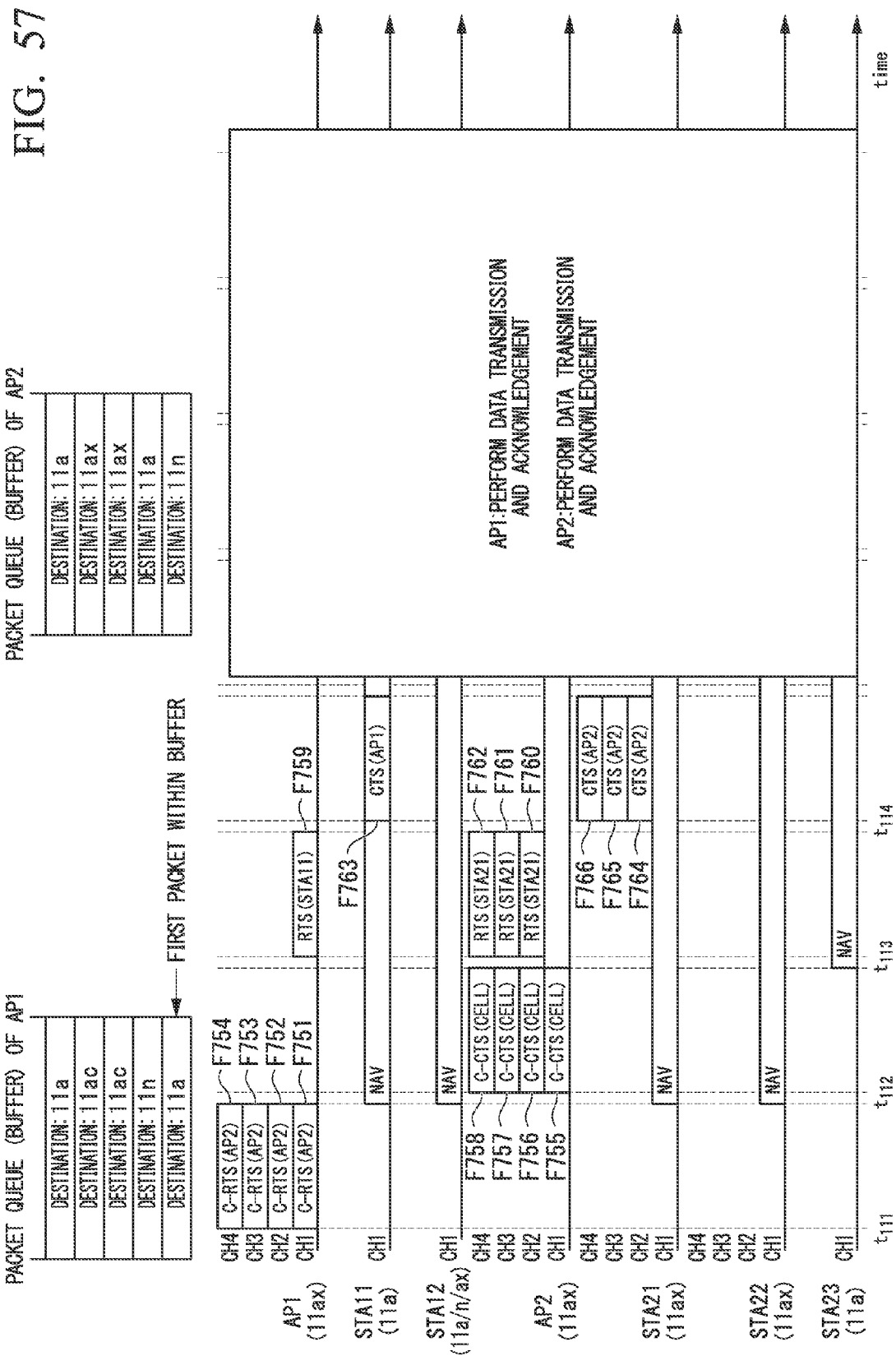
FIG. 57 is a time chart illustrating a frame sequence in which wireless access points cooperate to perform MAC protection.

FIG. 57 is a time chart illustrating a frame sequence in which wireless access points cooperate to perform MAC protection. Because the wireless station STA11 is a legacy station and a state exists in which secondary channels are to be assigned to the wireless access point AP2 of the neighboring cell, the wireless access point AP1 transmits cooperative RTS (C-RTS) frames F751 to F754 to the wireless access point AP2 (time $t_{111}$), and assigns the secondary channels. These C-RTSs each include list information of numbers of channels to be assigned and information of a period to be assigned. In response thereto, the wireless access point AP2 replies cooperative CTS (C-CTS) frames (F755 to F758 in this case) on the channels on which the C-RTSs have been received (time $t_{112}$). These C-CTSs each include the address of a transmission-source wireless access point, list information of numbers of channels to be used, the number of a channel to be temporarily used as the primary channel, and a period to be used.

Next, when there are the C-CTS replies from the wireless access point AP2, the wireless access point AP1 transmits an RTS frame F759 for the wireless station STA11 within its own cell. Simultaneously therewith, the wireless access point AP2 transmits RTS frames F760 to F762 for the wireless station STA21 (time $t_{113}$). In response thereto, the wireless station STA11 replies a CTS frame F763 for the wireless access point AP1. Simultaneously therewith, the wireless station STA21 replies CTS frames F764 to F766 for the wireless access point AP2 (time $t_{114}$).

Figure 58:
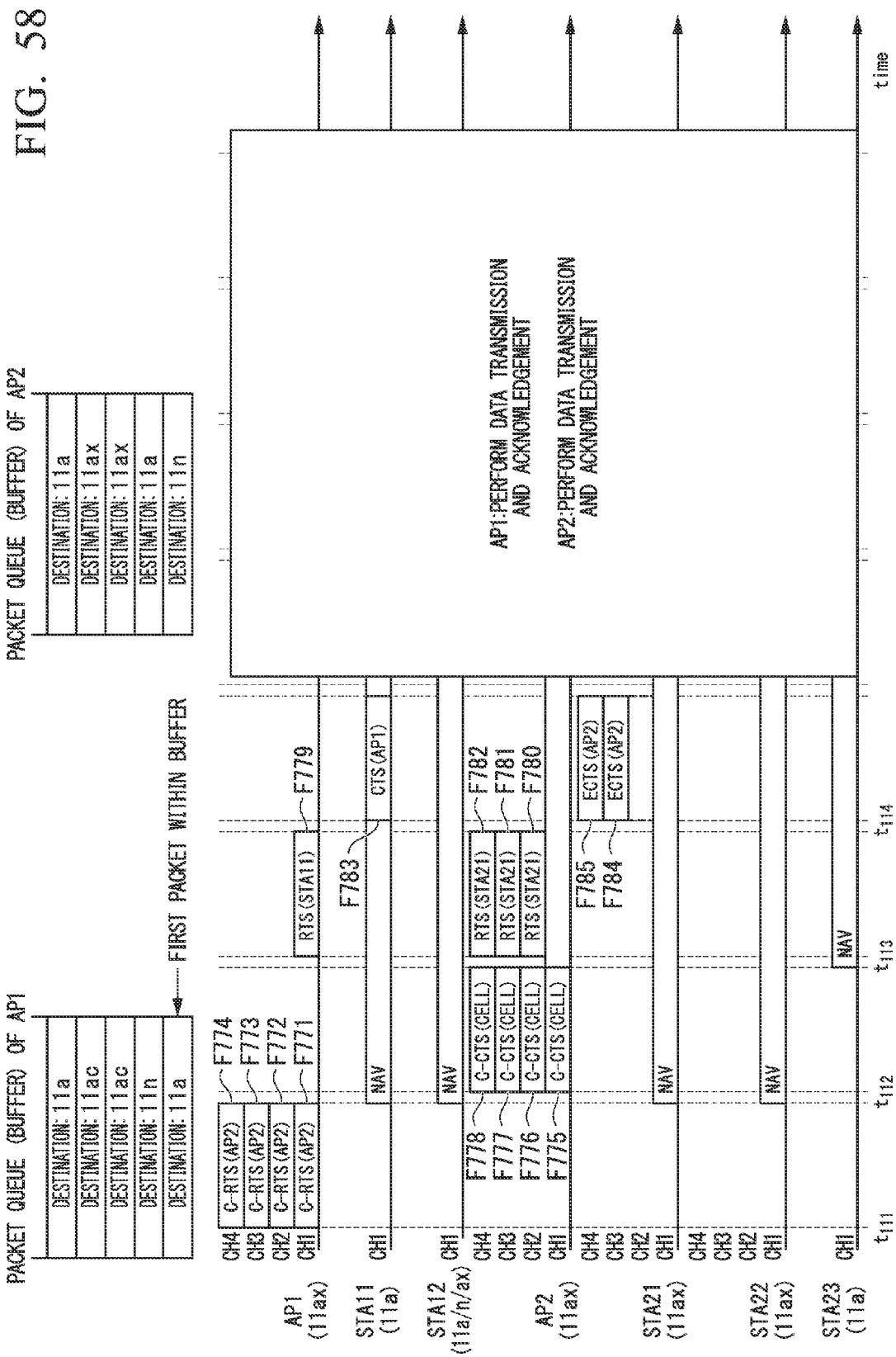
FIG. 58 is a time chart illustrating a frame sequence in which wireless access points cooperate to perform MAC protection.

Next, a modified example of the frame sequence illustrated in FIG. 57 will be described with reference to FIG. 58. FIG. 58 is a time chart illustrating a frame sequence in which wireless access points cooperate to perform MAC protection. This is substantially the same as the frame sequence illustrated in FIG. 57, but there is a difference in that the dynamic CTS reply in accordance with a channel available in the destination of RTS is possible.

The wireless access point AP1 transmits cooperative RTS (C-RTS) frames F771 to F774 to the wireless access point AP2 (time $t_{111}$), and assigns the secondary channels. These C-RTSs each include list information of numbers of channels to be assigned and information of a period to be assigned. In response thereto, the wireless access point AP2 replies cooperative RTS (C-CTS) frames (F775 to F778 in this case) on the channels on which the C-RTSs have been received (time $t_{112}$). These C-CTSs each include the address of a transmission-source wireless access point, list information of numbers of channels to be used, the number of a channel to be temporarily used as the primary channel, and a period to be used.

Next, the wireless access point AP1 transmits an RTS frame F779 for the wireless station STA11. Simultaneously therewith, the wireless access point AP2 transmits RTS frames F780 to F782 for the wireless station STA21 (time $t_{113}$). In response thereto, the wireless station STA11 replies a CTS frame F783 for the wireless access point AP1. Simultaneously therewith, the wireless station STA21 replies ECTS frames F784 and F785 for the wireless access point AP2 (time $t_{114}$). Then, the wireless access point AP2 starts communication (MAC protection, data transmission, and the like) within its own cell using a secondary channel group immediately after replying the C-CTSs.

In this manner, if the head of a transmission buffer of the wireless access point AP1 itself is data of the legacy wireless station and a station that can handle OFDMA is absent within an area of the wireless access point AP1 itself or there is no data for the station that can handle OFDMA even if the station that can handle OFDMA is present and it is obvious that not all channels available to the wireless access point AP1 are used when first data of the buffer is transmitted, the wireless access point AP1 assumes cooperation from the beginning, secures a channel, and assigns a transmission right of a channel which is not to be used by the wireless access point AP1 itself to the cooperating wireless access point AP2, and thus it is possible to simultaneously exchange RTSs and CTSs on different channels in each cell after C-CTSs. Therefore, cooperation between the wireless access points AP1 and AP2 makes it possible not only to suppress the waste of frequency resources to obtain high frequency utilization efficiency but also to reduce a temporal ratio for execution of control sequences such as C-RTS/C-CTS or RTS/CTS, and thus more efficient data transmission is possible.

<Wireless Access Point Cooperation 5>

Figure 59:
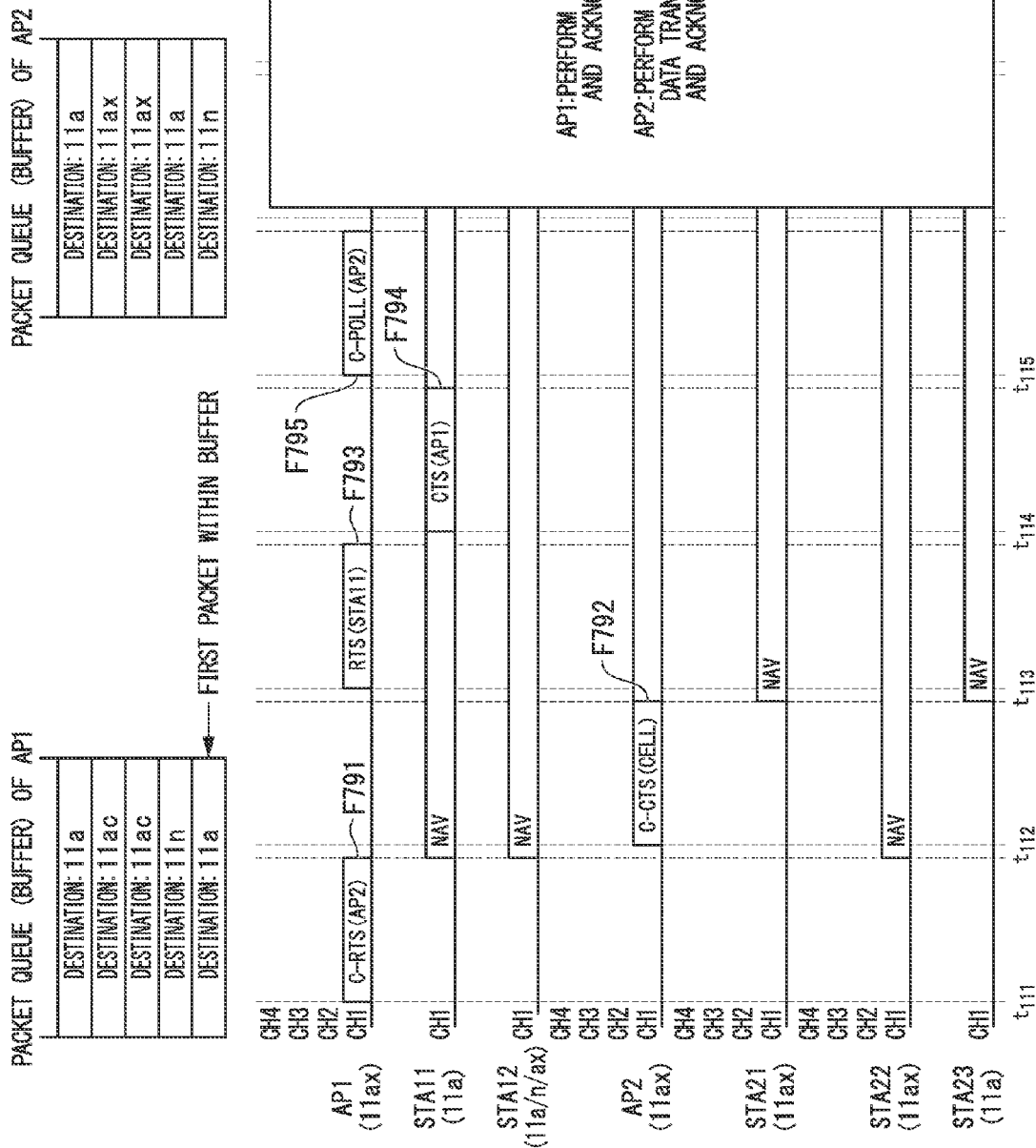
FIG. 59 is a time chart illustrating a frame sequence in which wireless access points cooperate to perform MAC protection.

FIG. 59 is a time chart illustrating a frame sequence in which wireless access points cooperate to perform MAC protection. This is substantially the same as the frame sequence of wireless access point cooperation 4. First, the wireless access point AP1 transmits a C-RTS frame F791 to the wireless access point AP2 (time $t_{111}$). This C-RTS includes list information of numbers of channels to be assigned and information of a period to be assigned. In response thereto, the wireless access point AP2 replies a C-CTS frame F792 (time $t_{112}$). This C-CTS includes the address of a transmission-source wireless access point, list information of numbers of channels to be used, the number of a channel to be temporarily used as the primary channel, and a period to be used. Subsequently, the wireless access point AP1 transmits an RTS frame F793 to the wireless station STA11 (time $t_{113}$). In response thereto, the wireless station STA11 replies a CTS frame F794 (time $t_{114}$). When a CTS reply is received from the wireless station STA11, the wireless access point AP1 transmits a C-POLL frame F795 (time $t_{115}$). This C-POLL frame includes a transmission-source address (TA), a destination address (RA), list information of numbers of channels to be assigned, and information of a period to be assigned. Thereby, the wireless access point AP1 gives permission for use of the channels to the wireless access point AP2.

Figure 60:
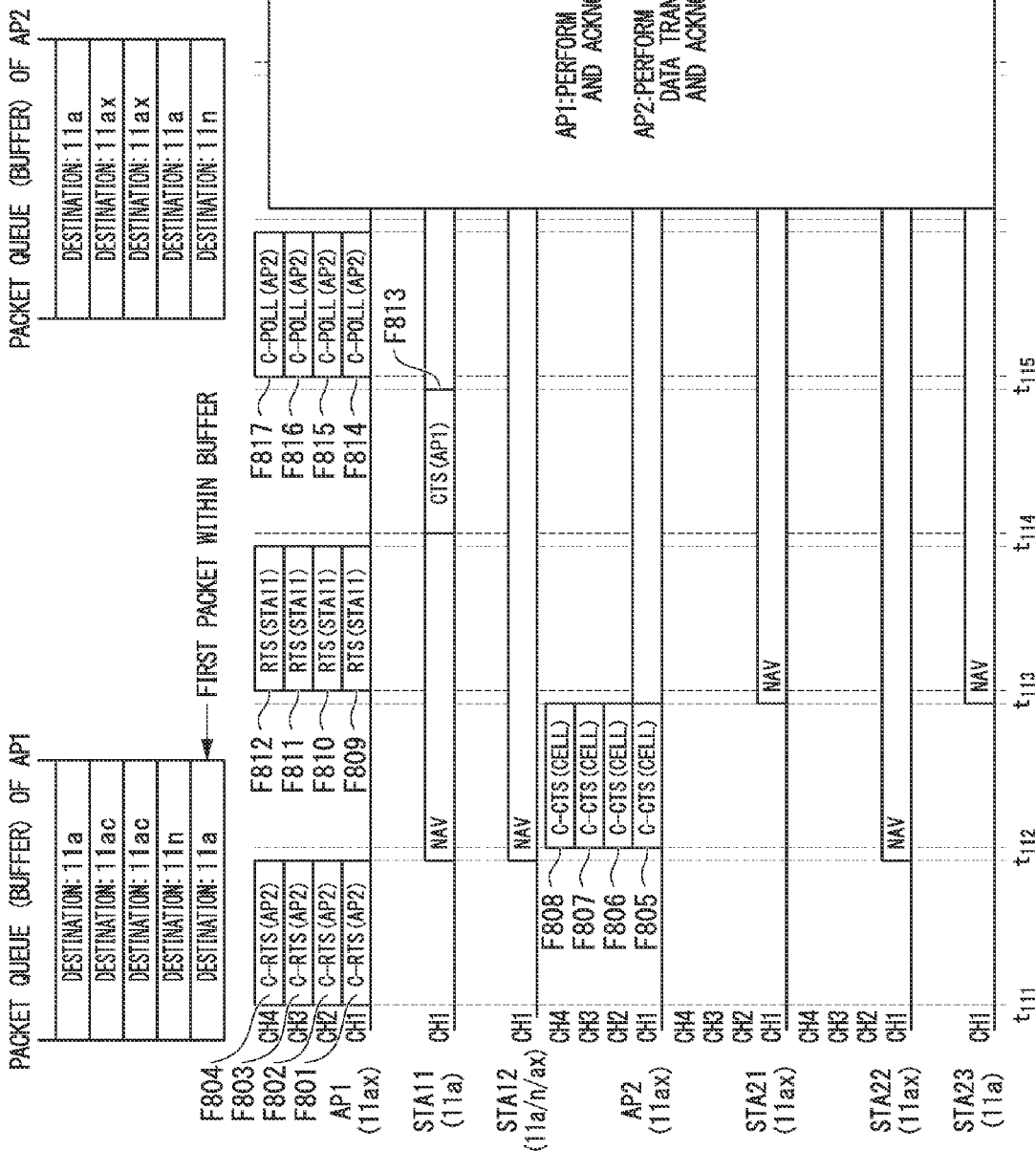
FIG. 60 is a time chart illustrating a frame sequence in which wireless access points cooperate to perform MAC protection.

Next, a modified example of the frame sequence illustrated in FIG. 59 will be described with reference to FIG. 60. FIG. 60 is a time chart illustrating a frame sequence in which wireless access points cooperate to perform MAC protection. This is substantially the same as the frame sequence illustrated in FIG. 59, but there is a difference in that control frames to be transmitted by the wireless access points AP1 and AP2 are duplicated. First, the wireless access point AP1 transmits C-RTS frames F801 to F804 to the wireless access point AP2 via all channels (time $t_{111}$). These C-RTSs each include list information of numbers of channels to be assigned and information of a period to be assigned. In response thereto, the wireless access point AP2 replies C-CTS frames F805 to F808 via all available channels (time $t_{112}$). These C-CTSs each include the address of a transmission-source wireless access point, list information of numbers of channels scheduled to be used, the number of a channel to be temporarily used as the primary channel, and a period to be used.

Subsequently, the wireless access point AP1 transmits RTS frames F809 to F812 via all channels determined to be available to the wireless station STA11 (time $t_{113}$). In response thereto, the wireless station STA11 replies a CTS frame F813 (time $t_{114}$). When a CTS reply is received from the wireless station STA11, the wireless access point AP1 transmits C-POLL frames F814 to F817 via all channels determined to be available (time $t_{115}$). These C-POLLs each include a transmission-source address (TA), a destination address (RA), list information of numbers of channels to be assigned, and information of a period to be assigned. Thereby, the wireless access point AP1 gives permission for use of the secondary channels to the wireless access point AP2.

In this manner, with the present embodiment, after the wireless access point AP1 secures a channel assuming cooperation with the wireless access point AP2, the wireless access point AP1 determines information of channels assignable to the wireless access point AP2 through the exchange of RTSs and CTSs in its own cell and starts data transmission after notifying the wireless access point AP2 of the determined information by C-POLLs, and thus, for example, when it is revealed that the NAV is set in part or all of channels of the destination wireless station STA11 and it is impossible for the wireless access point AP1 to transmit data to the wireless station STA11 in a scheduled channel width after the wireless access point AP1 has acquired transmission right, a channel which cannot be used by the wireless access point AP1 can be assigned to the wireless access point AP2. Thereby, it is possible to obtain high frequency utilization efficiency. Furthermore, in FIG. 60, it is possible to suppress interference in a neighboring cell by not performing transmission for a channel which may be used around the wireless access point AP2.

<Wireless Access Point Cooperation 6>

Figure 61:
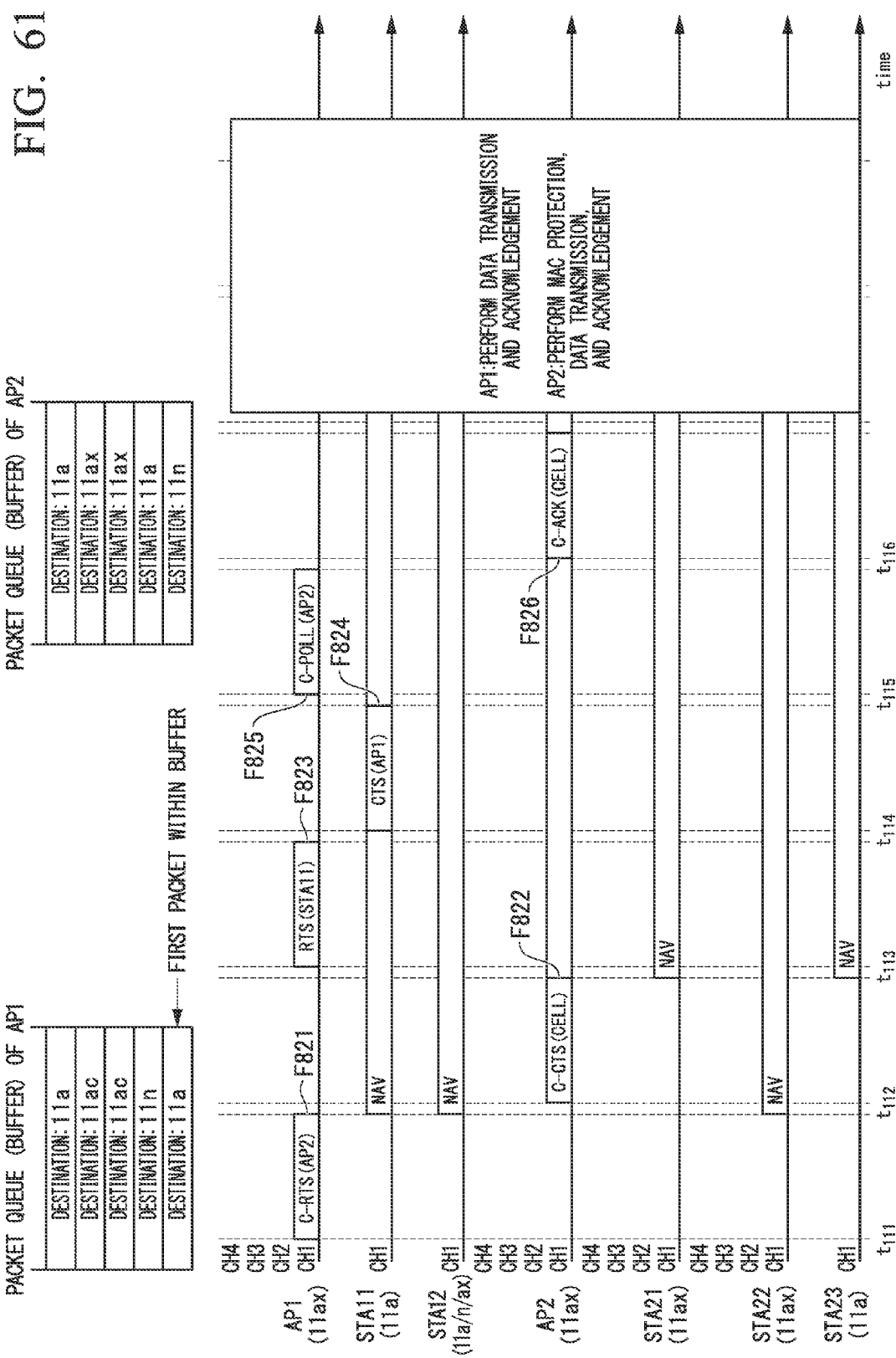
FIG. 61 is a time chart illustrating a frame sequence in which wireless access points cooperate to perform MAC protection.

FIG. 61 is a time chart illustrating a frame sequence in which wireless access points cooperate to perform MAC protection. This is substantially the same as the frame sequence of wireless access point cooperation 5. First, the wireless access point AP1 transmits a C-RTS frame F821 to the wireless access point AP2 (time $t_{111}$). This C-RTS includes list information of numbers of channels to be assigned and information of a period to be assigned. In response thereto, the wireless access point AP2 replies a C-CTS frame F822 (time $t_{112}$). This C-CTS includes the address of a transmission-source wireless access point, list information of numbers of channels scheduled to be used, the number of a channel to be temporarily used as the primary channel, and a period to be used. Subsequently, the wireless access point AP1 transmits an RTS frame F823 to the wireless station STA11 (time $t_{113}$). In response thereto, the wireless station STA11 replies a CTS frame F824 (time $t_{114}$). When a CTS reply is received from the wireless station STA11, the wireless access point AP1 transmits a C-POLL frame F825 (time $t_{115}$). This C-POLL includes a transmission-source address (TA), a destination address (RA), list information of numbers of channels to be assigned, and information of a period to be assigned. The wireless access point AP2 transmits a C-ACK frame F826 on the primary channel for the C-POLL from the wireless access point AP1 (time $t_{116}$). The C-ACK includes the address of a transmission-source wireless access point, list information of numbers of channels to be used, the number of a channel to be temporarily used as the primary, and information of a period to be used. Thereby, the wireless access point AP1 gives permission for use of the secondary channels to the wireless access point AP2.

Figure 62:
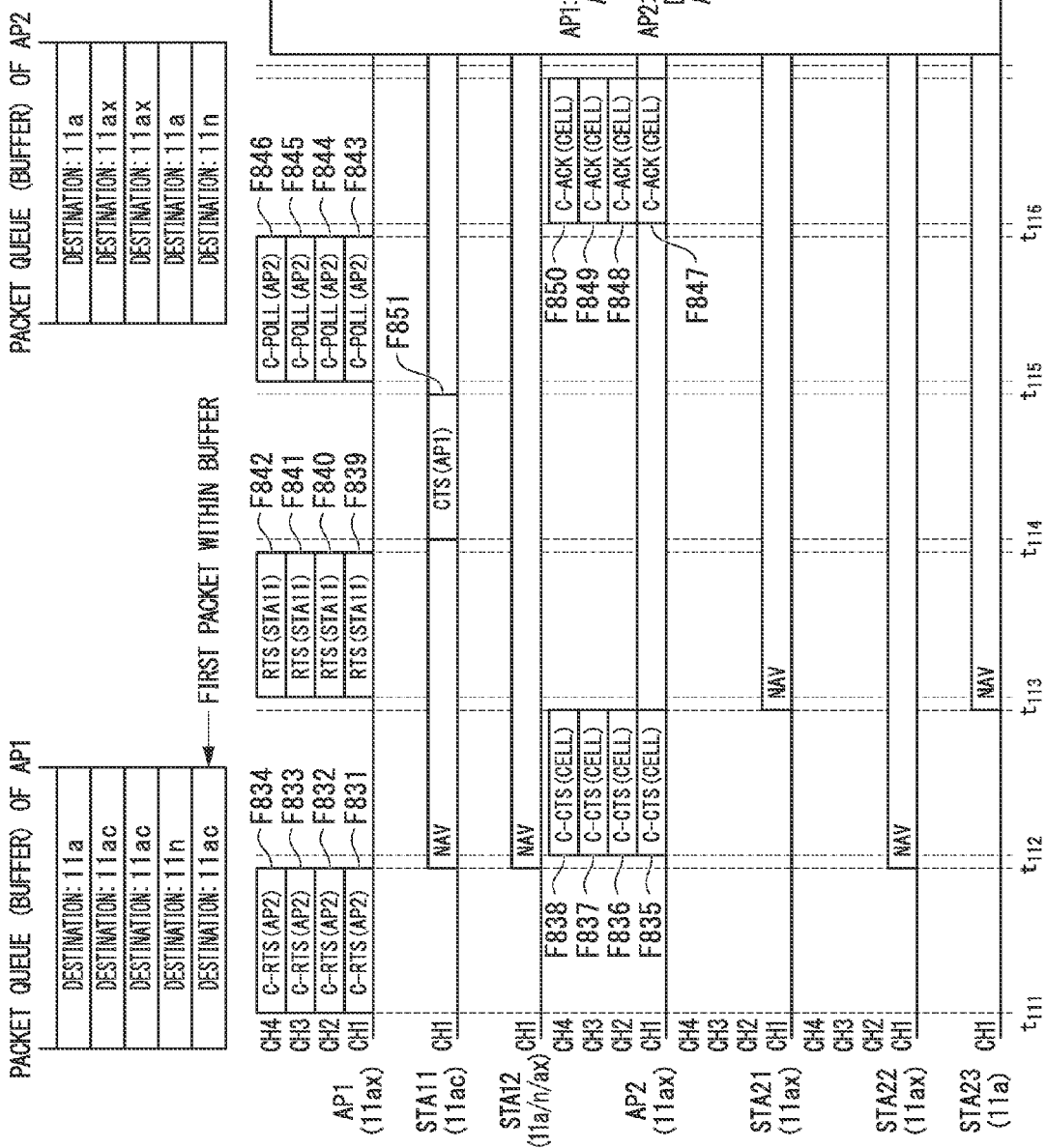
FIG. 62 is a time chart illustrating a frame sequence in which wireless access points cooperate to perform MAC protection.

Next, a modified example of a frame sequence illustrated in FIG. 61 will be described with reference to FIG. 62. FIG. 62 is a time chart illustrating a frame sequence in which wireless access points cooperate to perform MAC protection. This is substantially the same as the frame sequence illustrated in FIG. 61, but there is a difference in that control frames to be transmitted by the wireless access points AP1 and AP2 are duplicated. First, the wireless access point AP1 transmits C-RTS frames F831 to F834 to the wireless access point AP2 via all channels (time $t_{111}$). These C-RTSs each include list information of numbers of channels to be assigned and information of a period to be assigned. In response thereto, the wireless access point AP2 replies C-CTS frames F835 to F838 via all channels (time $t_{112}$). These C-CTSs each include the address of a transmission-source wireless access point, list information of numbers of channels to be used, the number of a channel to be temporarily used as the primary channel, and a period to be used.

Subsequently, the wireless access point AP1 transmits RTS frames F89 to F842 to the wireless station STA11 via all channels (time $t_{113}$). In response thereto, the wireless station STA11 replies a CTS frame F851 (time $t_{114}$). When a CTS reply is received from the wireless station STA11, the wireless access point AP1 transmits C-POLL frames F843 to F846 (time $t_{115}$). These C-POLLs each include a transmission-source address (TA), a destination address (RA), list information of numbers of channels to be assigned, and information of a period to be assigned. The wireless access point AP2 transmits C-ACK frames F847 to F850 via all channels for the C-POLLs from the wireless access point AP1 (time $t_{116}$). These C-ACKs each include the address of a transmission-source wireless access point, list information of numbers of channels to be used, the number of a channel to be temporarily used as the primary, and information of a period to be used. Thereby, the wireless access point AP1 gives permission for use of the secondary channels to the wireless access point AP2.

In this manner, in wireless access point cooperation 5 in accordance with the present embodiment, the C-ACKs are returned to the wireless access point AP2 as a response for the C-POLL frames transmitted by the wireless access point AP1, and thus it is possible to improve reliability of a process of assigning transmission rights and contribute to improvement of frequency utilization efficiency by starting data transmission after confirming an agreement between the wireless access points AP1 and AP2 in terms of the assignment of the transmission rights. In addition, the wireless access point AP2 can receive the C-POLLs from the wireless access point AP1 and change the primary channel to be temporarily used, which has been previously provided through the notification by the C-CTSs, in accordance with its information at the time of transmitting the C-ACKs. Thereby, even when the channel to be used by the wireless access point AP1 is changed in the middle of this process, it is possible to obtain high frequency utilization efficiency by setting transmission channels of the wireless access point AP2 again.

<Frame Sequence in which Acknowledgement is Performed in Wireless Access Point Cooperation>

Next, the frame sequence in which the acknowledgement is performed in the wireless access point cooperation will be described with reference to the drawings.

<Acknowledgement 1>

Figure 63:
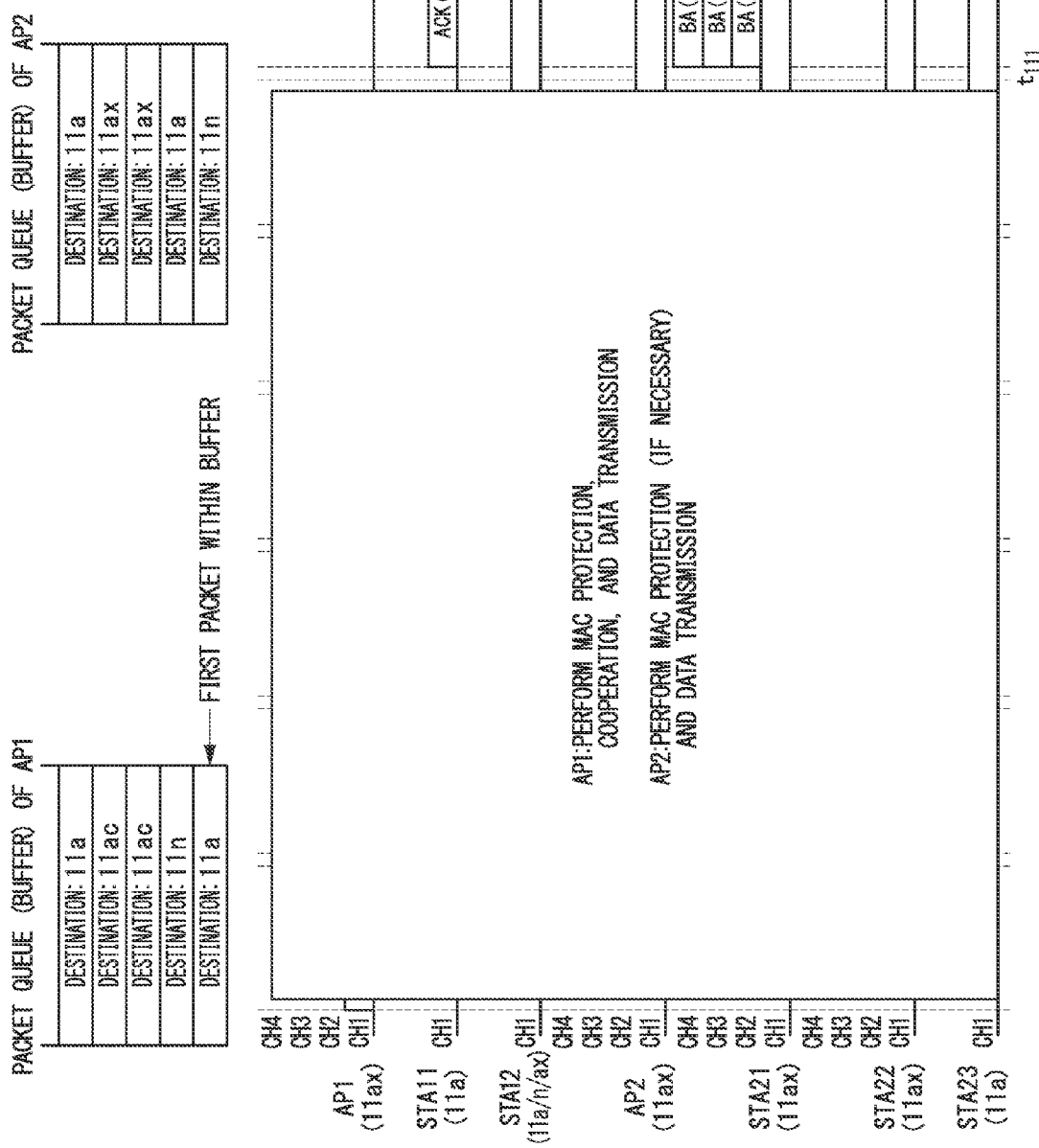
FIG. 63 is a time chart illustrating a frame sequence in which wireless access points cooperate to perform acknowledgements.

FIG. 63 is a time chart illustrating a frame sequence in which wireless access points cooperate to perform an acknowledgement. Reply of an ACK and BAs is performed using UL OFDMA. The wireless station STA11 associated with the wireless access point AP1 performs an acknowledgement by transmitting an ACK frame F861 on the primary channel group (time $t_{111}$). Then, the wireless station STA21 associated with the wireless access point AP2 transmits BA frames F862 to F864 on the secondary channel group to perform the acknowledgement (time $t_{111}$). At this time, the wireless access point AP2 adjusts the length of data to be transmitted in cell 2 of the wireless access point AP2 in accordance with a use period of a media by cell 1 of the wireless access point AP1.

In this manner, because it is possible to reduce a time necessary for the acknowledgement by applying UL OFDMA to transmission of the ACK and BAs, which are responses, it is possible to improve frequency utilization efficiency.

<Acknowledgement 2>

Figure 64:
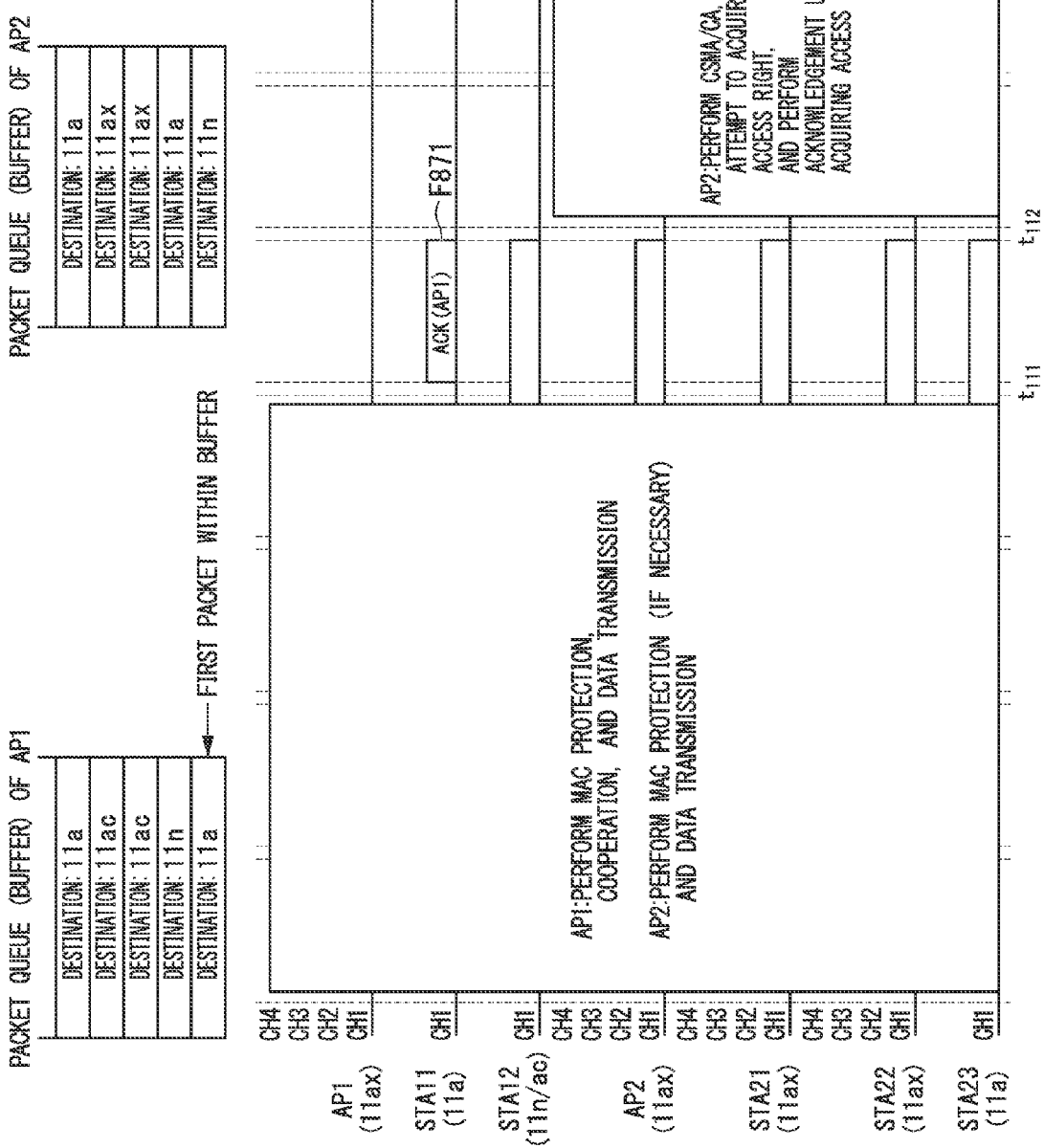
FIG. 64 is a time chart illustrating a frame sequence in which wireless access points cooperate to perform acknowledgements.

FIG. 64 is a time chart illustrating a frame sequence in which wireless access points cooperate to perform the acknowledgement. First, the wireless station STA11 performs an acknowledgement by transmitting an ACK frame F871 to the wireless access point AP1 (time $t_{111}$). In cell 2 of the wireless access point AP2 to which secondary channels are assigned, CSMA/CA is performed (time $t_{112}$). If an access right is acquired, the wireless access point AP2 transmits a BAR frame F872 to the wireless station STA21 (time $t_{113}$). In response thereto, the wireless station STA21 performs an acknowledgement by replying a BA frame F873 (time $t_{114}$).

In this manner, because acknowledgement processing in the cell of the wireless access point AP2 is performed in a TXOP separately secured by the wireless access point AP2 after the end of a TXOP initially secured by the wireless access point AP1, the wireless access point AP2 can perform data transmission immediately before expiration of an assigned time limit of a period in which frequency resources are assigned from the wireless access point AP1, and thus it is possible to improve transmission efficiency and communication quality when a large amount of data for a destination wireless station is accumulated or when data close to a permitted transmission delay time is maintained. In addition, there is also an advantage in that it is possible to minimize the influence of a hidden terminal or the like because the acknowledgement is performed on the primary channel.

<Acknowledgement 3>

Figure 65:
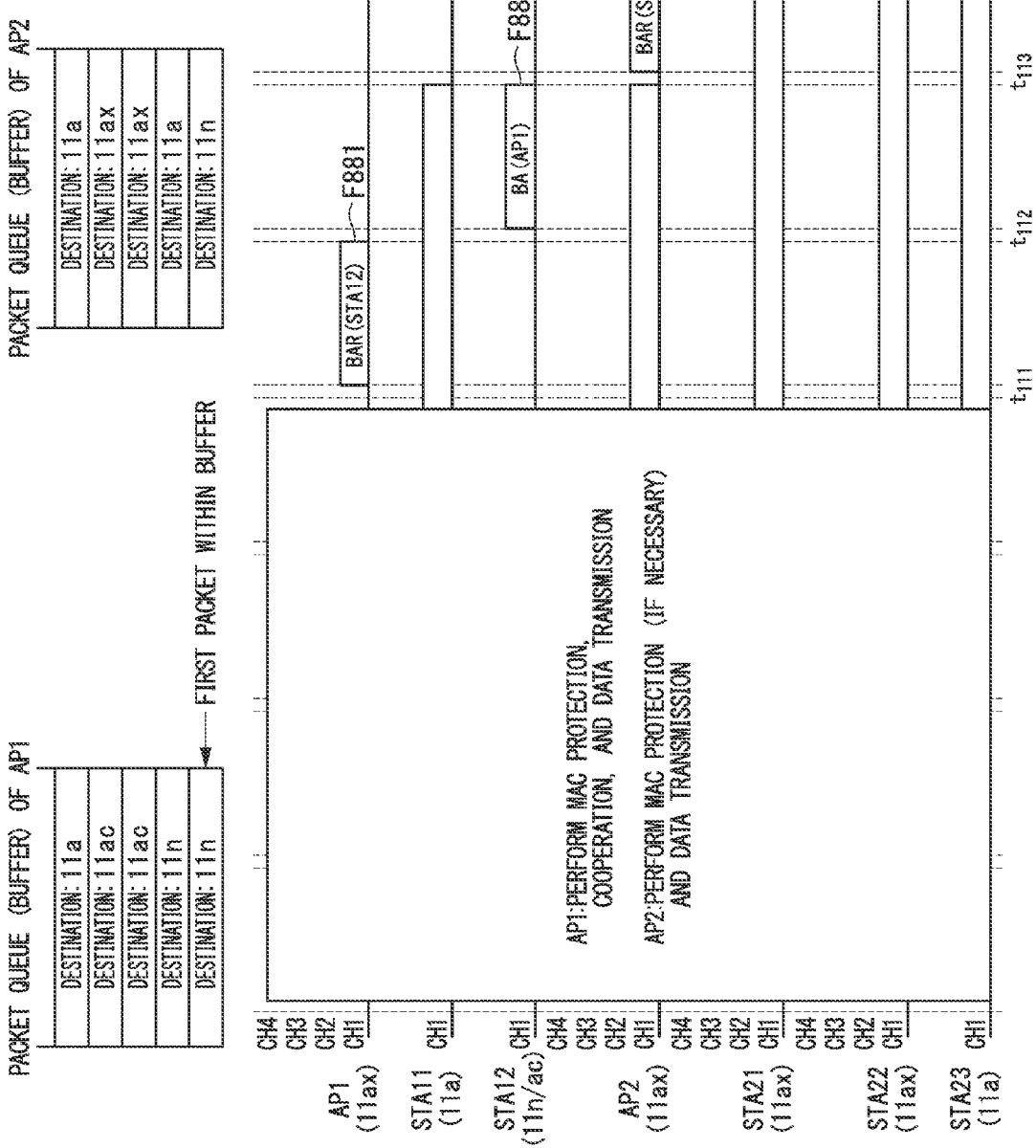
FIG. 65 is a time chart illustrating a frame sequence in which wireless access points cooperate to perform acknowledgements.

FIG. 65 is a time chart illustrating a frame sequence in which wireless access points cooperate to perform the acknowledgement. First, the wireless access point AP1 transmits a BAR frame F881 to the wireless station STA12 using the primary channel (time $t_{111}$). In response thereto, the wireless station STA12 replies a BA frame F882 (time $t_{112}$). Next, the wireless access point AP2 transmits a BAR frame 883 to the wireless station STA21 via the primary channel (time $t_{113}$). In response thereto, the wireless station STA21 replies a BA frame F884 (time $t_{114}$). In the cells in which the wireless access points perform cooperation, all acknowledgements are performed only on the primary channel.

In this manner, it is possible to perform downlink data transmissions from the wireless access points AP1 and AP2 and acknowledgements therefor during the protected TXOP that has been initially acquired and a short time subsequent thereto as a series of sequences by performing acknowledgement processing in accordance with the sequence of a response request (BAR) and an acknowledgement (BA) on the primary channel in the wireless access points AP1 and AP2. In addition, the possibility of interruption by another wireless access point or wireless station is reduced by setting the BAR from the wireless access point AP2 to a shorter amount of time than that of the protected TXOP that has been initially acquired, and thus it is easy to establish them as a series of sequences. Furthermore, there is an advantage in that it is possible to reduce the influence from another cell operating in the same channel by performing all acknowledgements on the primary channel.

Next, a sequence in which MAC protection, data transmission, and an acknowledgement are performed in cooperation of the wireless access points by combining the above-described frame sequences will be described with reference to FIGS. 66 to 71.

Figure 66:
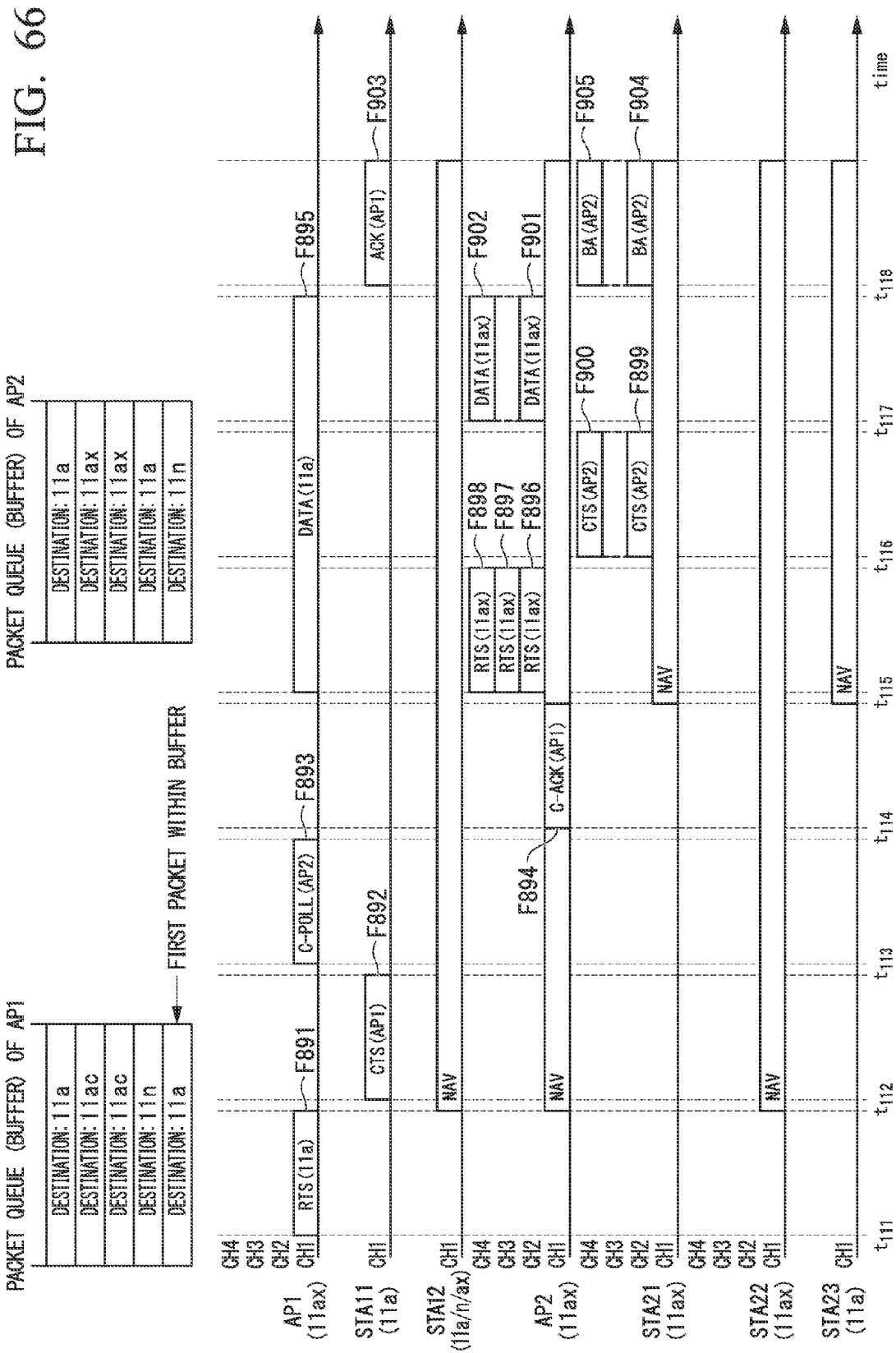
FIG. 66 is a time chart illustrating a frame sequence obtained by combining frame sequences when wireless access points cooperate.

FIG. 66 is a time chart illustrating a frame sequence in which the frame sequences of wireless access point cooperation 1(1), B-1(1), and acknowledgement 1 are combined. First, the wireless access point AP1 transmits an RTS frame F891 to the 11a wireless station (time $t_{111}$). In response thereto, the wireless station STA11 replies a CTS frame F892 (time $t_{112}$). Then, the wireless access point AP1 transmits the permission for use of secondary channels by transmitting a C-POLL frame F893 to the wireless access point AP2 (time $t_{113}$). In response thereto, the wireless access point AP2 replies a C-ACK frame F894 (time $t_{114}$).

Next, the wireless access point AP1 transmits a frame F895 to the 11a wireless station (time $t_{115}$). On the other hand, the wireless access point AP2 transmits RTS frames F896 to F898 to the 11ax wireless station (time $t_{115}$). In response thereto, the wireless station STA21 replies CTS frames F899 and F900 (time $t_{116}$). Then, the wireless access point AP2 transmits frames F901 and F902 to the 11ax wireless station (time $t_{117}$). Subsequently, the wireless station STA11 replies an ACK frame F903 for the wireless access point AP1 (time $t_{118}$). In parallel therewith, the wireless station STA21 replies BA frames F904 and F905 for the wireless access point AP2 (time $t_{118}$).

In this manner, the wireless access point AP1 acquiring the access right for the channels by the exchange of the RTSs and the CTSs permits the cooperating wireless access point (here, the wireless access point AP2) to use secondary channels that are not scheduled to use by the wireless access point AP1 itself using C-POLL after securing channels necessary for its own transmission including the primary channel, and the wireless access point AP2 receiving permission for use of the secondary channels from an adjacent cell transmits a C-ACK via the primary channel, thereby it is possible to notify the wireless access point AP1 that the wireless access point AP2 itself uses the secondary channels and notify the wireless stations within the cell of the wireless access point AP2 of information of a channel to be temporarily used as the primary channel for a time in which use right is permitted by the wireless access point AP1 and a time during which transmission and reception are performed. In addition, with the above procedure, it is possible to cause the wireless stations connected to the wireless access points AP1 and AP2 to set NAVs and protect data transmission to be performed by the wireless access points AP1 and AP2. In addition, it is possible to effectively use the secondary channels, which have been conventionally wasted, by transmitting data for a legacy station on the primary channel and transmitting data for wireless stations that can perform reception using OFDMA on the secondary channel group at the time of data transmission. Furthermore, because it is possible to shorten a time necessary for the acknowledgement by applying UL OFDMA to the transmission of an ACK and BAs, which are responses, in the acknowledgement process, it is possible to improve frequency utilization efficiency. As described above, it is possible to significantly improve frequency utilization efficiency as compared to legacy systems.

Figure 67:
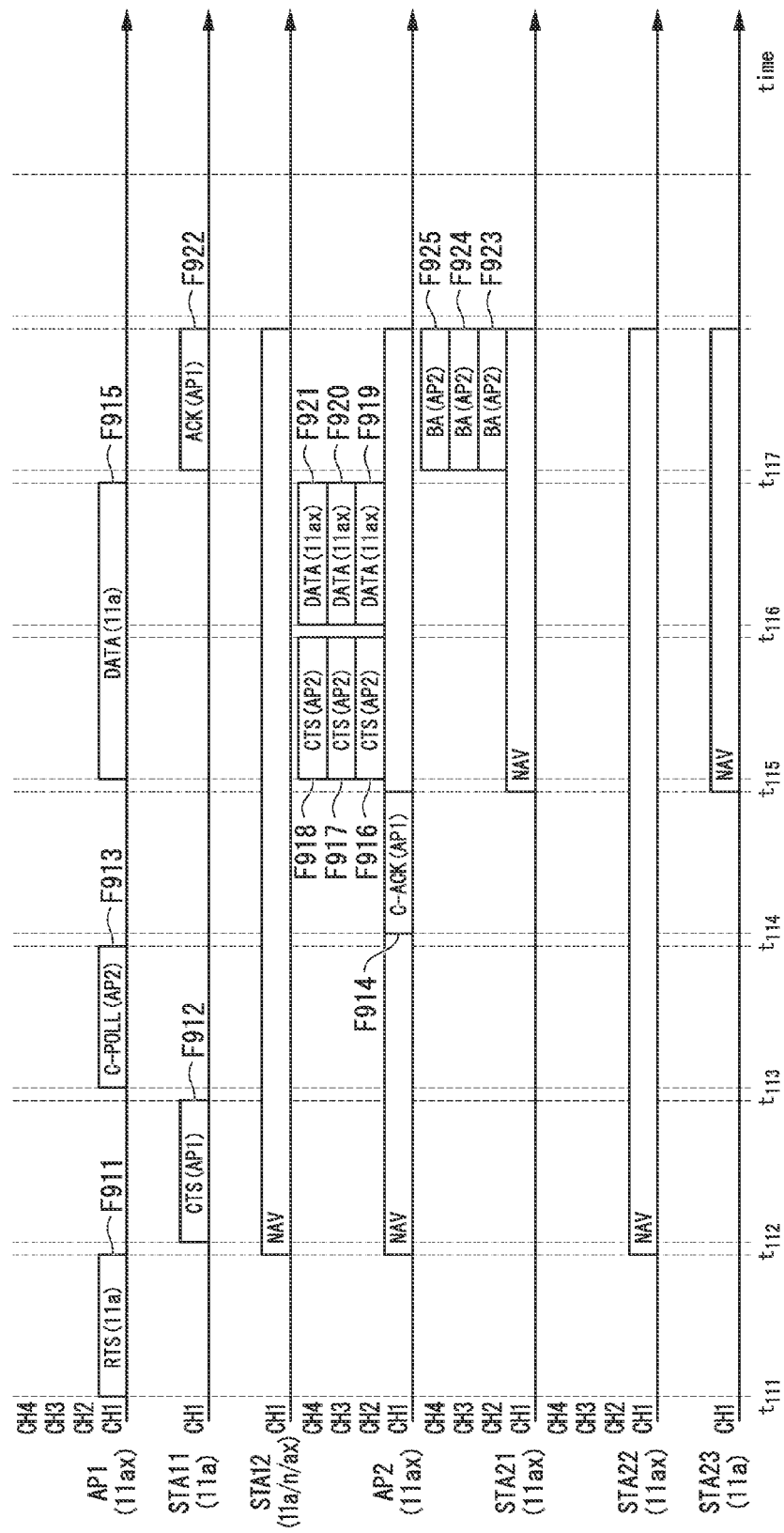
FIG. 67 is a time chart illustrating a frame sequence obtained by combining frame sequences when wireless access points cooperate.

FIG. 67 is a time chart illustrating a frame sequence in which the frame sequences of wireless access point cooperation 1(1), B-1(1), and acknowledgement 1 are combined. First, the wireless access point AP1 transmits an RTS frame F911 to the 11a wireless station (time $t_{111}$). In response thereto, the wireless station STA11 replies a CTS frame F912 (time $t_{112}$). Then, the wireless access point AP1 transmits the permission for use of secondary channels by transmitting a C-POLL frame F913 to the wireless access point AP2 (time $t_{113}$). In response thereto, the wireless access point AP2 replies a C-ACK frame F914 (time $t_{114}$).

Next, the wireless access point AP1 transmits a frame F915 to the 11a wireless station (time $t_{115}$). On the other hand, after the wireless access point AP2 transmits CTS frames F916 to F918 to the wireless access point AP2 itself (time $t_{115}$), the wireless access point AP2 transmits frames F919 to F921 to the 11ax wireless station (time $t_{116}$). Subsequently, the wireless station STA11 replies an ACK frame F922 for the wireless access point AP1 (time $t_{118}$). In parallel therewith, the wireless station STA21 replies BA frames F923 and F925 for the wireless access point AP2 (time $t_{118}$).

In this manner, the wireless access point AP1 acquiring the access rights for the channels by the exchange of the RTSs and the CTSs permits the cooperating wireless access point (here, the wireless access point AP2) to use secondary channels that are not scheduled to use by the wireless access point AP1 itself using C-POLL after securing channels necessary for its own transmission including the primary channel, and the wireless access point AP2 receiving permission for use of the secondary channels from an adjacent cell transmits a C-ACK via the primary channel, thereby it is possible to notify the wireless access point AP1 that the wireless access point AP2 itself uses the secondary channels and notify the wireless stations within the cell of the wireless access point AP2 of information of a channel to be temporarily used as the primary channel for a time in which use right is permitted by the wireless access point AP1 and a time during which transmission and reception are performed. In addition, with the above procedure, it is possible to cause the wireless stations connected to the wireless access points AP1 and AP2 to set NAVs and protect data transmission to be performed by the wireless access points AP1 and AP2. In addition, it is possible to effectively use the secondary channels, which have been conventionally wasted, by transmitting data for the legacy station on the primary channel and transmitting data for the wireless station that can perform reception using OFDMA on the secondary channel group at the time of data transmission. At this time, because the wireless access point AP2 secures frequency resources in accordance with a CTS-to-Self procedure when the wireless access point AP2 performs data transmission on the secondary channels to which the transmission right is given, it is possible to improve efficiency as compared to when an RTS/CTS procedure is used. Furthermore, because it is possible to shorten a time necessary for the acknowledgement by applying UL OFDMA to the transmission of an ACK and BAs, which are responses, in the acknowledgement process, it is possible to improve frequency utilization efficiency. As described above, it is possible to significantly improve frequency utilization efficiency as compared to legacy systems.

Figure 68:
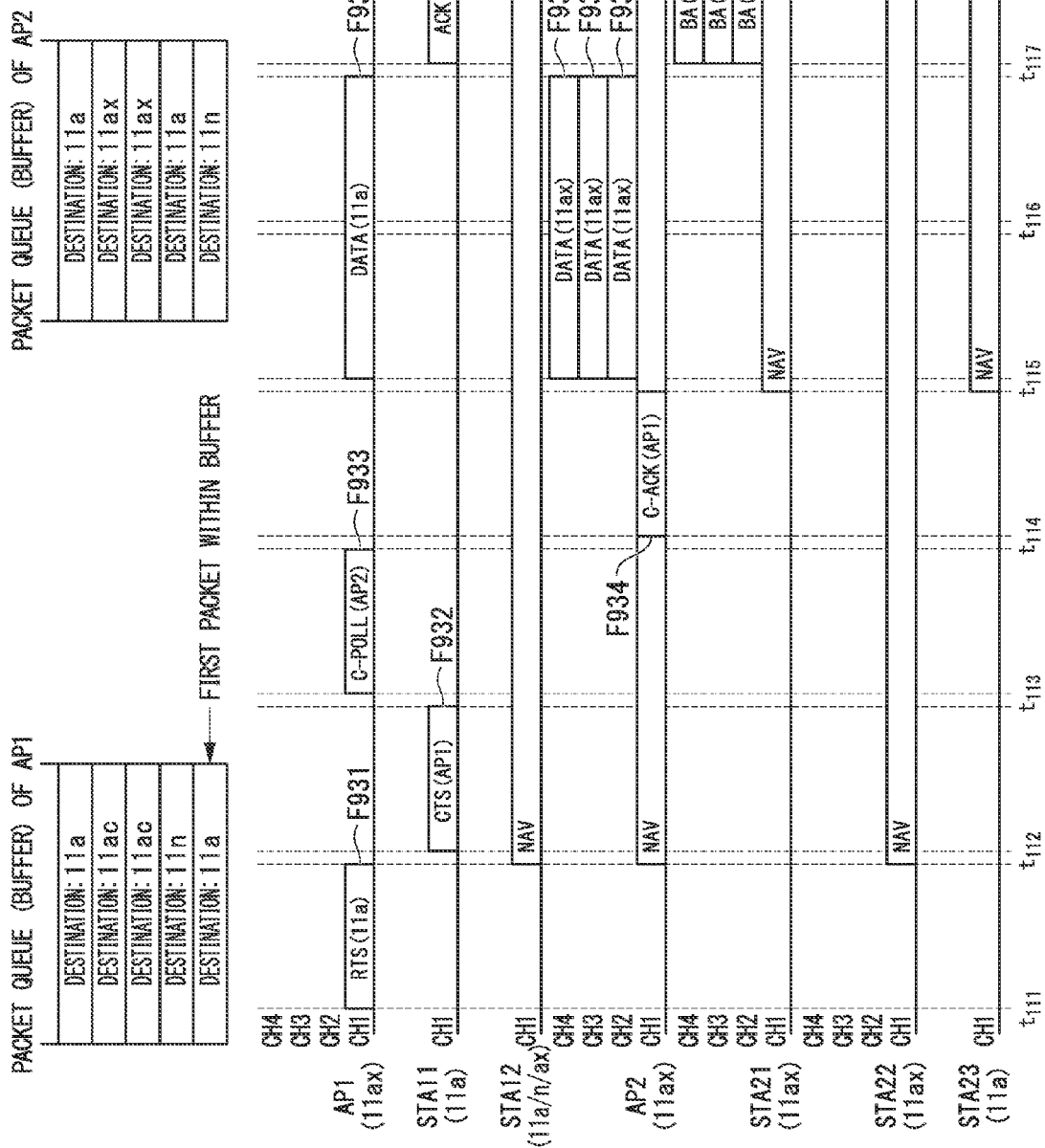
FIG. 68 is a time chart illustrating a frame sequence obtained by combining frame sequences when wireless access points cooperate.

FIG. 68 is a time chart illustrating a frame sequence in which the frame sequences of wireless access point cooperation 1(1), B-1(1), and acknowledgement 1 are combined. First, the wireless access point AP1 transmits an RTS frame F931 to the 11a wireless station (time $t_{111}$). In response thereto, the wireless station STA11 replies a CTS frame F932 (time $t_{112}$). Then, the wireless access point AP1 transmits the permission for use of secondary channels by transmitting a C-POLL frame F933 to the wireless access point AP2 (time $t_{113}$). In response thereto, the wireless access point AP2 replies a C-ACK frame F914 (time $t_{114}$).

Next, the wireless access point AP1 transmits a frame F935 to the 11a wireless station (time $t_{115}$). On the other hand, the wireless access point AP2 transmits frames F936 to F938 to the 11ax wireless station (time $t_{115}$). Subsequently, the wireless station STA11 replies an ACK frame F939 for the wireless access point AP1 (time $t_{117}$). In parallel therewith, the wireless station STA21 replies BA frames F940 and F942 for the wireless access point AP2 (time $t_{117}$).

In this manner, the wireless access point AP1 acquiring the access right for the channel by the exchange of the RTSs and the CTSs permits the cooperating wireless access point (here, the wireless access point AP2) to use secondary channels that are not scheduled to use by the wireless access point AP1 itself using C-POLL after securing channels necessary for its own transmission including the primary channel and the wireless access point AP2 receiving permission for use of the secondary channels from an adjacent cell transmits a C-ACK via the primary channel, thereby it is possible to notify the wireless access point AP1 that the wireless access point AP2 itself uses the secondary channels and notify the wireless stations within the cell of the wireless access point AP2 of information of a channel to be temporarily used as the primary channel for a time in which use right is permitted by the wireless access point AP1 and a time during which transmission and reception are performed. In addition, with the above procedure, it is possible to cause the wireless stations connected to the wireless access points AP1 and AP2 to set the NAVs and protect data transmission to be performed by the wireless access points AP1 and AP2. In addition, it is possible to effectively use the secondary channels, which have been conventionally wasted, by transmitting data for a legacy station on the primary channel and transmitting data for wireless stations that can perform reception using OFDMA on the secondary channel group at the time of data transmission. At this time, the wireless access point AP1 secures the transmission right of the primary channel, and thus the wireless access point AP2 determines that no more protection for the secondary channels, the transmission right of which is assigned, is necessary and starts data transmission immediately after the reply of the C-ACK. Therefore, it is possible to improve the utilization efficiency of the secondary channels as compared to when the protection mechanism by the exchange of an RTS and a CTS is used. Furthermore, because it is possible to shorten a time necessary for the acknowledgement by applying UL OFDMA to the transmission of an ACK and BAs, which are responses, in the acknowledgement process, it is possible to improve frequency utilization efficiency. Thereby, it is possible to significantly improve frequency utilization efficiency as compared to legacy systems.

Figure 69:
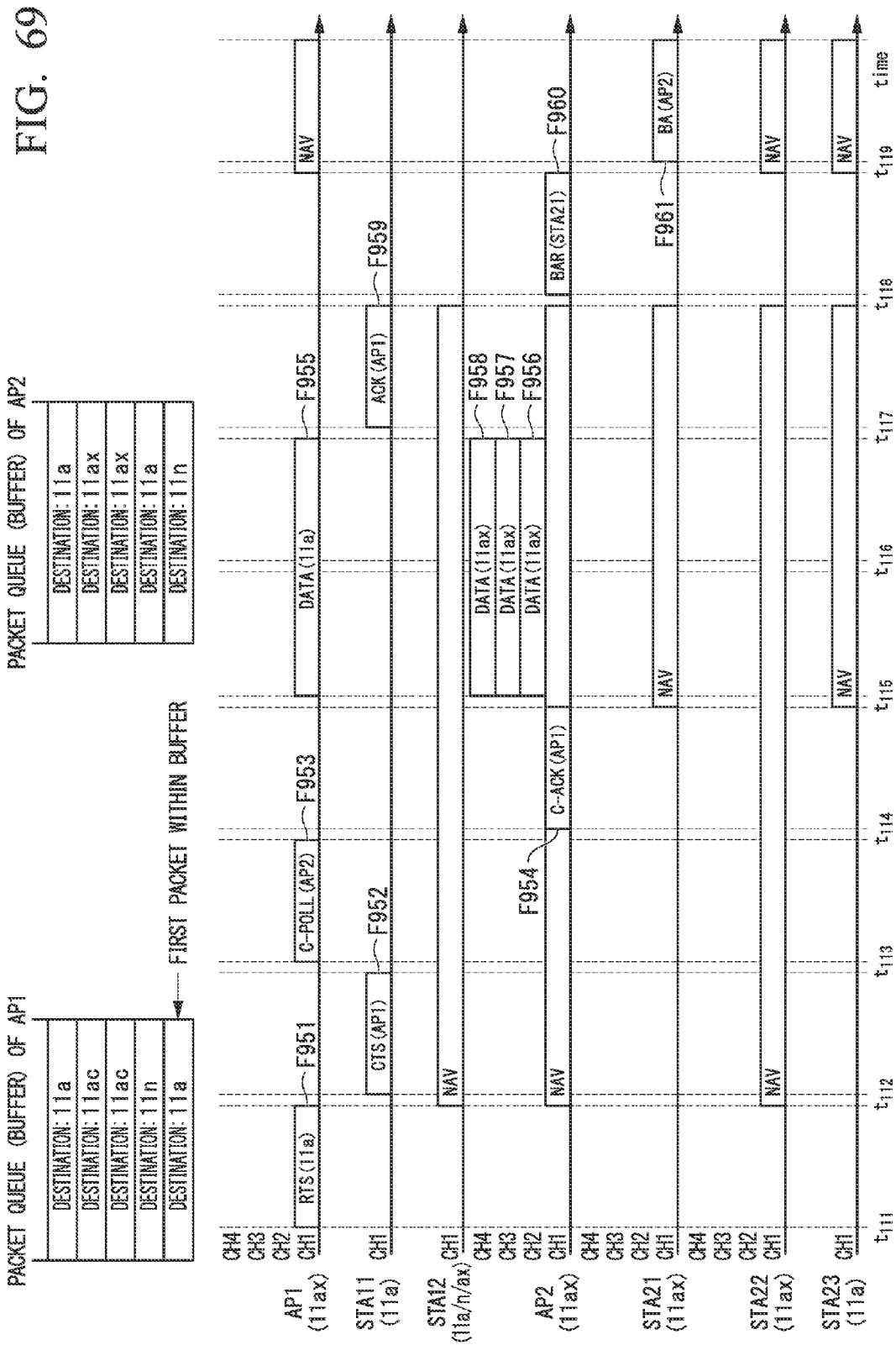
FIG. 69 is a time chart illustrating a frame sequence obtained by combining frame sequences when wireless access points cooperate.

FIG. 69 is a time chart illustrating a frame sequence in which the frame sequences of wireless access point cooperation 1(1), B-1(1), and ACK 3 are combined. First, the wireless access point AP1 transmits an RTS frame F951 to the 11a wireless station (time $t_{111}$). In response thereto, the wireless station STA11 replies a CTS frame F952 (time $t_{112}$). Then, the wireless access point AP1 transmits the permission for use of secondary channels by transmitting a C-POLL frame F953 to the wireless access point AP2 (time $t_{113}$). In response thereto, the wireless access point AP2 replies a C-ACK frame F954 (time $t_{114}$).

Next, the wireless access point AP1 transmits a frame F955 to the 11a wireless station (time $t_{115}$). On the other hand, the wireless access point AP2 transmits frames F956 to F958 to the 11ax wireless station (time $t_{115}$). Subsequently, the wireless station STA11 replies an ACK frame F959 for the wireless access point AP1 (time $t_{117}$). The wireless access point AP2 transmits a BAR frame F960 to the wireless station STA21 (time $t_{118}$). In response thereto, the wireless station STA21 replies a BA frame F961 for the wireless access point AP2 (time $t_{119}$). These acknowledgements are performed by only the primary channel.

In this manner, the wireless access point AP1 acquiring the access rights for the channels by the exchange of the RTSs and the CTSs permits the cooperating AP (here AP2) to use secondary channels that are not scheduled to use by the wireless access point AP1 itself using C-POLL after securing channels necessary for its own transmission including the primary channel and the wireless access point AP2 receiving permission for use of the secondary channels from an adjacent cell transmits a C-ACK via the primary channel, thereby it is possible to notify the wireless access point AP1 that the wireless access point AP2 itself uses the secondary channels and notify the wireless stations within the cell of the wireless access point AP2 of information of a channel to be temporarily used as the primary channel for a time in which use right is permitted by the wireless access point AP1 and a time during which transmission and reception are performed. In addition, with the above procedure, it is possible to cause the wireless stations connected to the wireless access points AP1 and AP2 to set NAVs and protect data transmission to be performed by the wireless access points AP1 and AP2. In addition, it is possible to effectively use the secondary channels, which have been conventionally wasted, by transmitting data for the legacy station on the primary channel and transmitting data for the wireless station that can perform reception using OFDMA on the secondary channel group at the time of data transmission. Furthermore, when acknowledgement processing is performed, a response for data transmitted by the wireless access point AP2 is also temporally continuously performed on the same primary channel in consideration of a legacy protocol in which an ACK reply is sent at a very short time interval called SIFS after the end of the data transmission. Thereby, it is possible to perform downlink data transmissions from the wireless access points AP1 and AP2 and acknowledgements therefor during the protected TXOP that has been initially acquired and a short time subsequent thereto as a series of sequences. There is an advantage in that it is possible to reduce an influence from another cell operating in the same channel by performing all acknowledgements on the primary channel.

Figure 70:
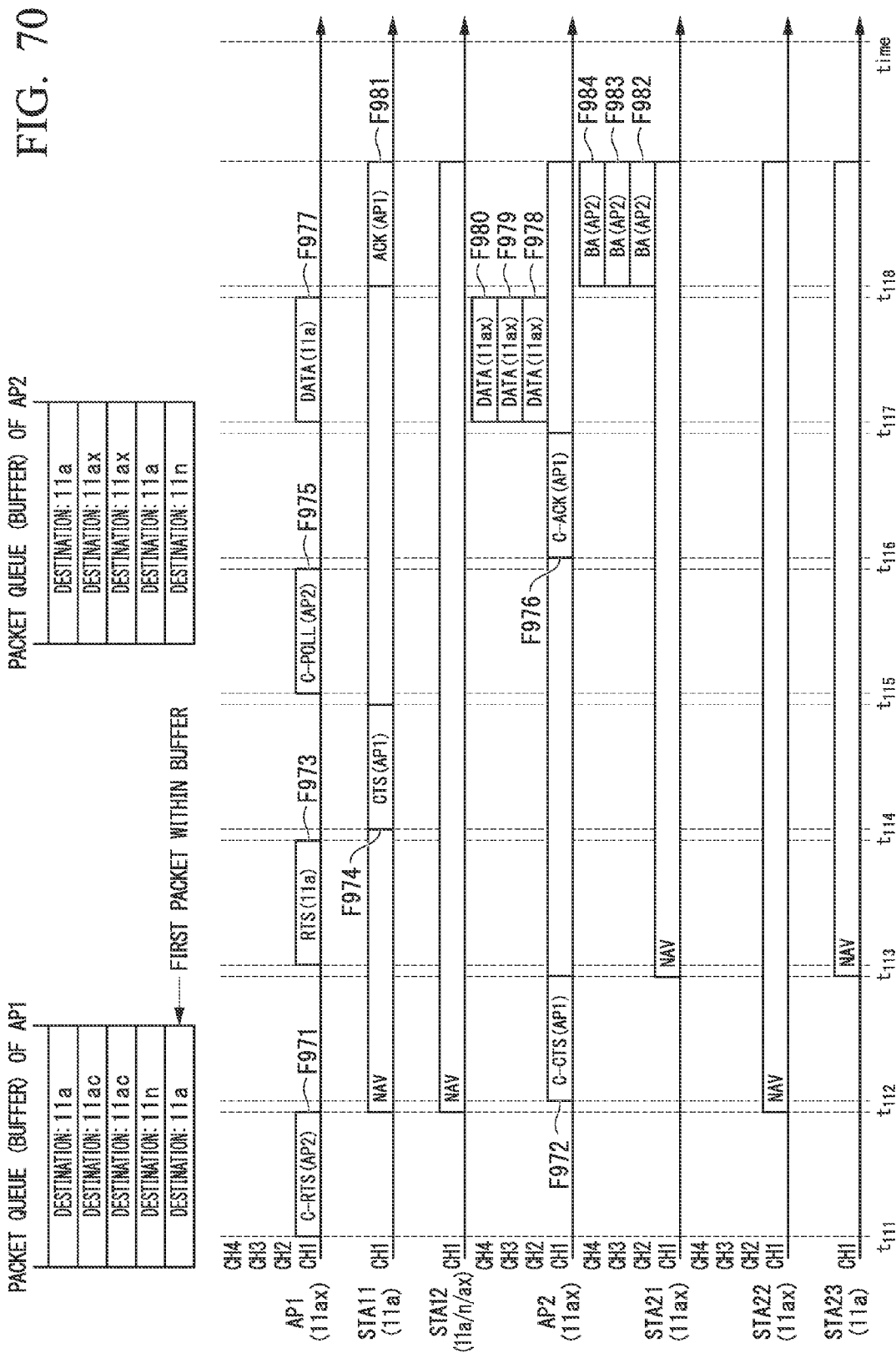
FIG. 70 is a time chart illustrating a frame sequence obtained by combining frame sequences when wireless access points cooperate.

FIG. 70 is a time chart illustrating a frame sequence in which the frame sequences of wireless access point cooperation 6, B-1(1), and acknowledgement 1 are combined. First, the wireless access point AP1 transmits a C-RTS frame F971 to the wireless access point AP2 (time $t_{in}$). In response thereto, the wireless access point AP2 replies a C-CTS frame F972 (time $t_{112}$). Subsequently, the wireless access point AP1 transmits an RTS frame F973 to the 11a wireless station (time $t_{113}$). In response thereto, the wireless station STA11 replies a CTS frame F974 (time $t_{114}$). Then, the wireless access point AP1 transmits the permission for use of secondary channels by transmitting a C-POLL frame F975 to the wireless access point AP2 (time $t_{115}$). In response thereto, the wireless access point AP2 replies a C-ACK frame F976 (time $t_{116}$).

Next, the wireless access point AP1 transmits a frame F977 to the 11a wireless station via the primary channel (time $t_{117}$). On the other hand, the wireless access point AP2 simultaneously transmits frames F978 to F980 to the 11ax wireless station via the secondary channels (time $t_{117}$). Subsequently, the wireless station STA11 replies an ACK frame F981 for the wireless access point AP1 (time $t_{118}$). In addition, the wireless station STA21 replies BA frames F982 to F984 for the wireless access point AP2 (time $t_{118}$).

In this manner, if the head of a transmission buffer of the wireless access point AP1 itself is data of the legacy wireless station, a station that can handle OFDMA is absent within an area of the wireless access point AP1 itself or there is no data for the station that can handle OFDMA even if the station that can handle OFDMA is present, and it is obvious that not all channels available to the wireless access point AP1 itself are used when first data of the buffer is transmitted, the wireless access point AP1 assume cooperation from the beginning, secures a channel, and assigns transmission right of a channel which is not to be used by the wireless access point AP1 itself to the cooperating wireless access point AP2, and thus the wireless access point AP2 can start selection of a wireless station appropriate for transmission by the secondary channels and pre-processing of transmission. Then, the wireless access point AP1 can secure a TXOP within the area of the wireless access point AP1 itself and check whether reception in a destination wireless station is possible using an RTS/CTS procedure after receiving the C-CTS. Then, the wireless access point AP1 can determine a channel, the transmission right of which is assigned to the wireless access point AP2, by the subsequent exchange of a C-POLL and a C-ACK. Therefore, it is possible to suppress the waste of frequency resources by cooperation between the wireless access points AP1 and AP2 to obtain high frequency utilization efficiency and reduce a temporal ratio for execution of control sequences such as C-RTS/C-CTS or RTS/CTS, and thus more efficient data transmission is possible. In addition, it is possible to effectively use the secondary channels, which have been conventionally wasted, by transmitting data for the legacy station on the primary channel and transmitting data for a wireless station that can perform reception using OFDMA on a secondary channel group in a data transmission process. Furthermore, because it is possible to shorten a time necessary for the acknowledgement by applying UL OFDMA to the transmission of an ACK and BAs, which are responses, in the acknowledgement process, it is possible to improve frequency utilization efficiency. Thereby, it is possible to significantly improve frequency utilization efficiency as compared to legacy systems.

Figure 71:
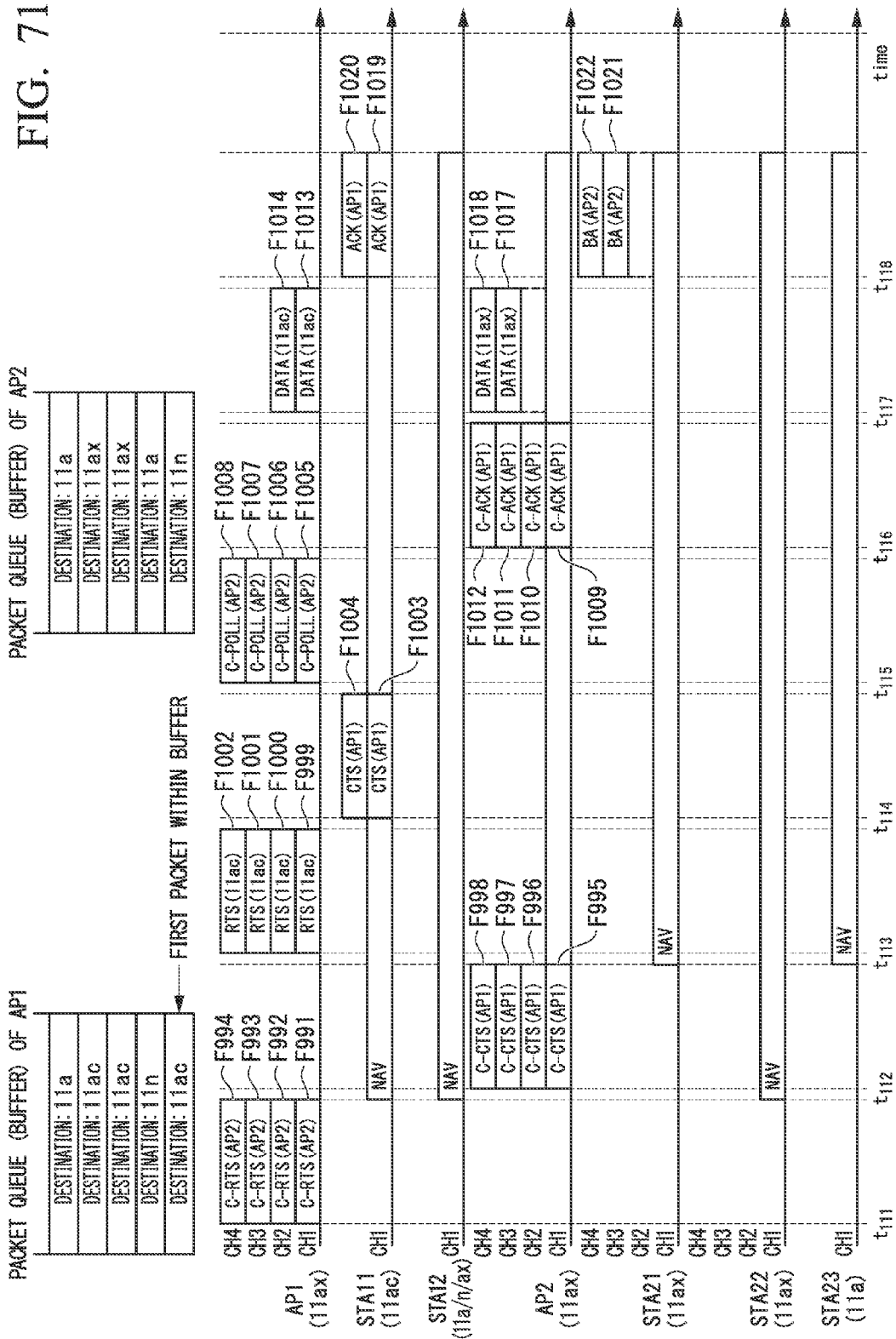
FIG. 71 is a time chart illustrating a frame sequence obtained by combining frame sequences when wireless access points cooperate.
Figure 72:
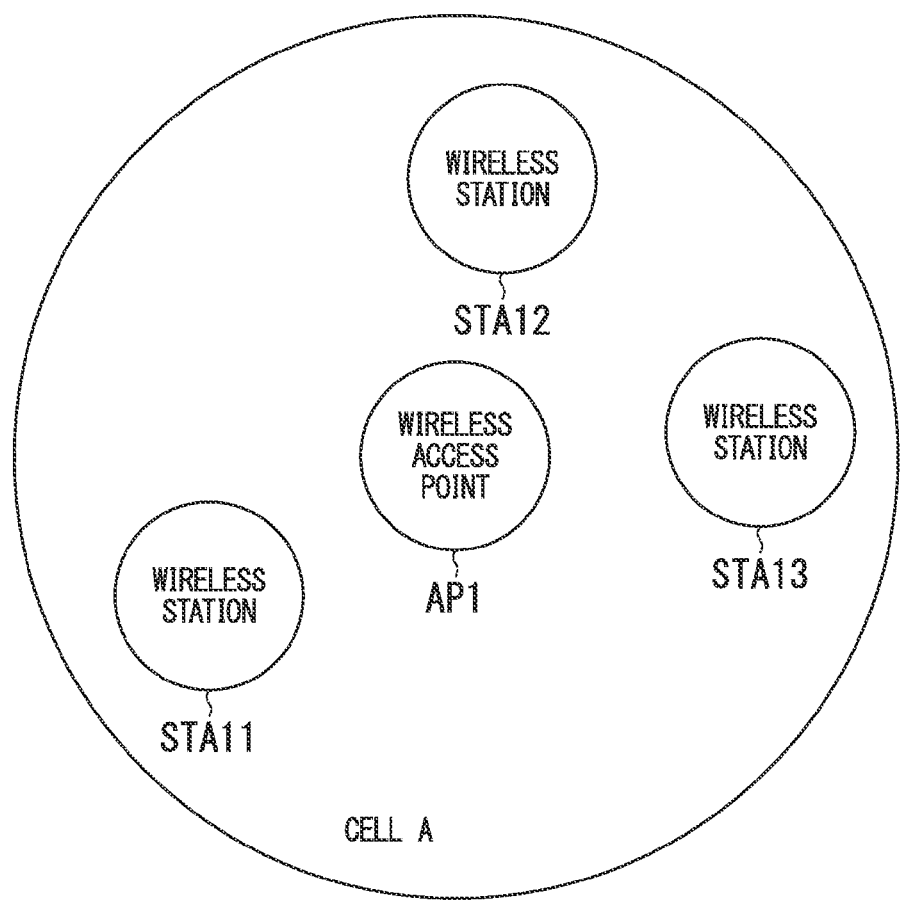
FIG. 72 is a diagram illustrating a cell A of a wireless LAN constituted of one wireless access point AP1 and five wireless stations STA11 to STA15.
Figure 73:
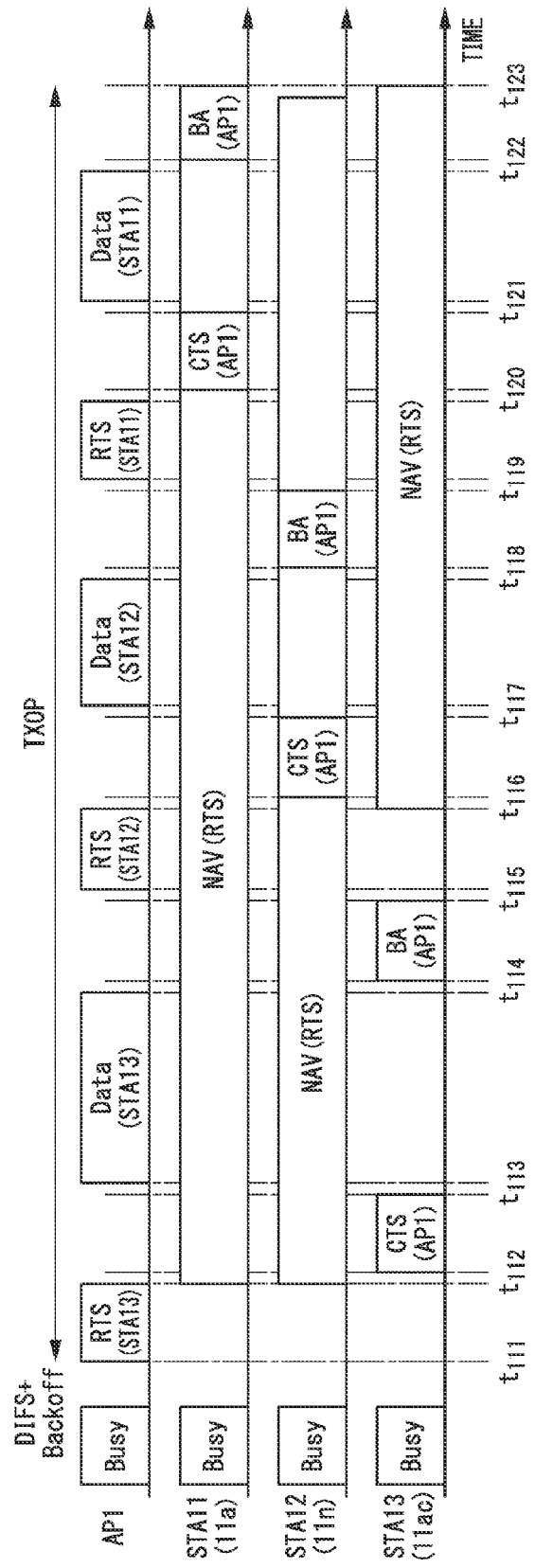
FIG. 73 is a time chart illustrating timings at which frames are transmitted when a transmission right acquiring wireless communication station transmits a plurality of frames for other wireless communication stations within a TXOP.
Figure 74:
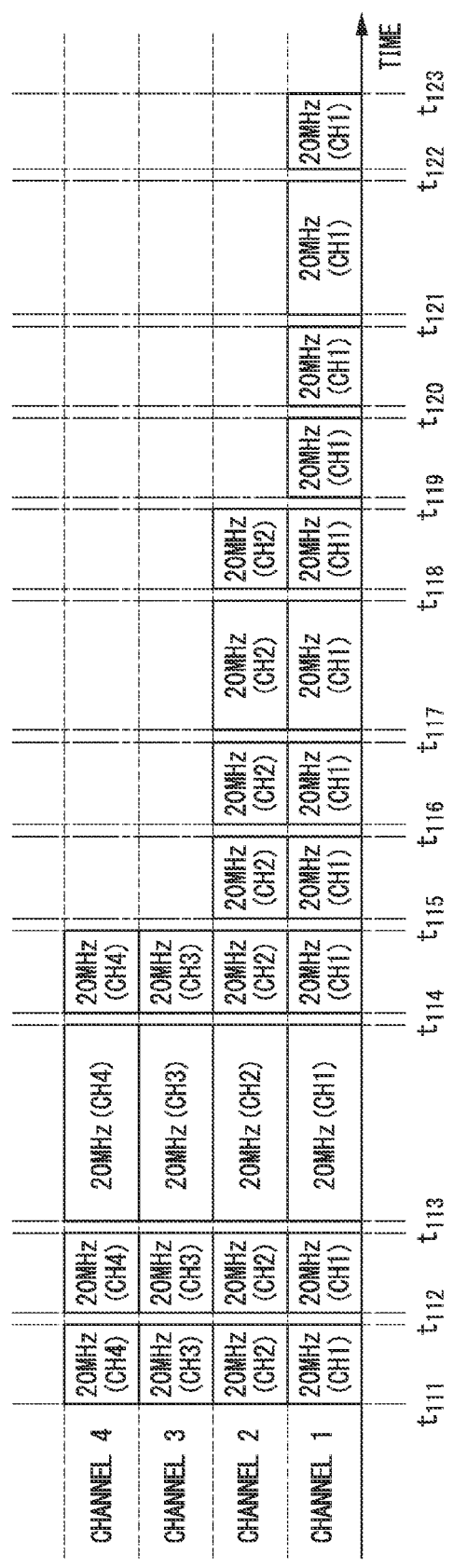
FIG. 74 is a diagram illustrating channel bandwidths used when data transmissions between the wireless access point AP1 and the wireless stations STA11 to STA13 are performed.
Figure 75:
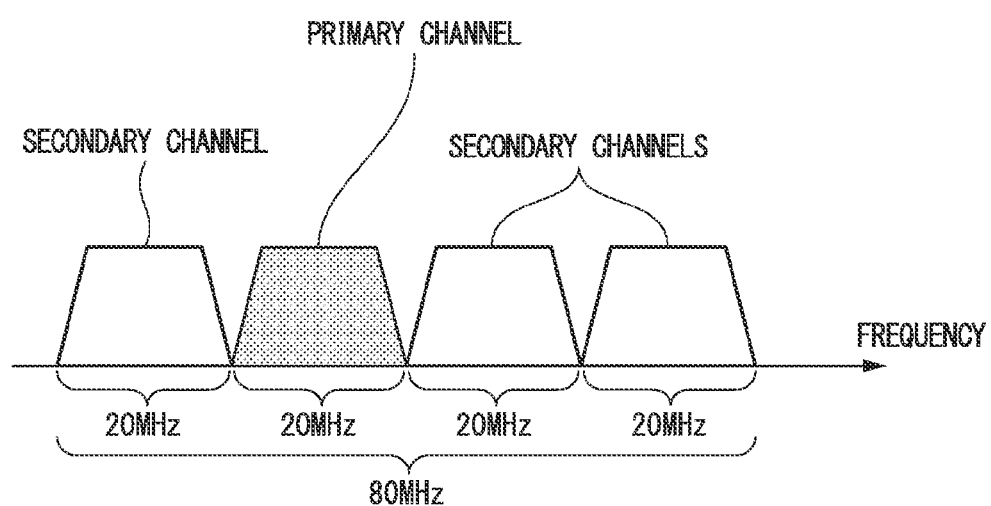
FIG. 75 is an explanatory diagram illustrating an example of a primary channel and secondary channels when a unit channel is 20 MHz and the entire band used in the cell is 80 MHz.

FIG. 71 is a time chart illustrating a frame sequence in which the frame sequences of the modified example of wireless access point cooperation 6, B-1(1), and acknowledgement 1 are combined. First, the wireless access point AP1 transmits C-RTS frames F991 to F994 to the wireless access point AP2 via all channels (time $t_{111}$). In response thereto, the wireless access point AP2 replies C-CTS frames (in this case, F995 to F998) on channels on which the C-RTSs have been received (time $t_{112}$). Subsequently, the wireless access point AP1 transmits RTS frames F999 to F1002 to the 11ac wireless station (time $t_{113}$). In response thereto, the wireless station STA11 replies CTS frames F1003 and F1004 (time $t_{114}$). Then, the wireless access point AP1 transmits the permission for use of the secondary channels to the wireless access point AP2 by transmitting C-POLL frames F1005 to F1008 via all channels determined to be available (time $t_{115}$). In response thereto, the wireless access point AP2 replies C-ACK frames F1009 to F1012 (time $t_{116}$).

Next, the wireless access point AP1 transmits frames F1013 and F1014 to the 11ac wireless station via all channels (time $t_{117}$). On the other hand, the wireless access point AP2 simultaneously transmits frames F1017 and F1018 to the 11ax wireless station via the secondary channels (time $t_{117}$). Subsequently, the wireless station STA11 replies ACK frames F1019 and F1020 to the wireless access point AP1 (time $t_{118}$). In addition, the wireless station STA21 replies BA frames F1021 and F1022 to the wireless access point AP2 (time $t_{118}$).

In this manner, in the present embodiment, in addition to the advantageous effect obtained by the frame sequence illustrated in FIG. 70, an advantageous effect of easily avoiding mutual interference with neighboring cells is obtained because it is possible to more clearly notify the neighboring cells operating on the same frequency channel of information of channels to be used, by transmitting control signals such as C-RTS, C-CTS, RTS, CTS, C-POLL, and a C-ACK to be transmitted by the wireless access point AP1 and AP2 in a duplicate mode.

As described above, it is possible to effectively use frequency resources because a plurality of wireless access points cooperate and assign a channel which is not scheduled to use in each cell to another cell.

It is to be noted that the wireless communication process may be executed by recording a program for realizing functions of the wireless access points and the wireless stations illustrated in FIGS. 1 and 52 on a computer-readable recording medium and causing a computer system to read and execute the program recorded on the recording medium. It is to be noted that the "computer system" referred to here includes an OS and hardware such as peripheral devices. In addition, the "computer-readable recording medium" refers to a storage apparatus including portable media such as a flexible disk, a magneto-optical disc, a ROM, and a CD-ROM and a hard disk embedded in the computer system. Furthermore, the "computer-readable recording medium" also includes a medium that holds a program for a constant period of time, such as a volatile memory (RAM) inside a computer system serving as a server or a client when the program is transmitted via a network such as the Internet or a communication circuit such as a telephone circuit.

In addition, the above program may be transmitted from a computer system storing the program in a storage apparatus or the like via a transmission medium or transmission waves in the transmission medium to another computer system. Here, the "transmission medium" for transmitting the program refers to a medium having a function of transmitting information, such as a network (communication network) like the Internet or a communication circuit (communication line) like a telephone circuit. In addition, the above program may be a program for realizing part of the above-described functions. Furthermore, the above program may be a program, i.e., a so-called differential file (differential program), capable of realizing the above-described functions in combination with a program already recorded on the computer system.

While the embodiments of the present invention have been described above with reference to the drawings, it is apparent that the above embodiments are exemplary of the present invention and the present invention is not limited to the above embodiments. Accordingly, additions, omissions, substitutions, and other modifications of constituent elements may be made without departing from the technical idea and scope of the present invention.

INDUSTRIAL APPLICABILITY

The present invention is applicable for use in which wireless communication is required to be performed by effectively using frequency resources.

DESCRIPTION OF REFERENCE SIGNS

AP1, AP2 Wireless access point
11 Wireless communication unit
12 Transmission right acquiring unit
13 Information managing unit
14 Control unit
STA11, STA12, STA13, STA14, STA15, STA21, STA22, STA23 Wireless station
21 Wireless communication unit
22 Transmission right acquiring unit
23 Information managing unit
24 Control unit
S Server
N Network

The invention claimed is:

1. A wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other,
wherein the first wireless access point comprises:
a control unit processor programmed to acquire a transmission opportunity when data to be transmitted is generated; and
the control unit processor further programmed to transfer permission for use of channels which are not scheduled for use within the first cell to the second wireless access point in a period in which the transmission opportunity is acquired,
the second wireless access point comprises a communication circuit which communicates with the wireless stations within the second cell via the channels in which the permission for use is acquired from the first wireless access point,
the first wireless access point uses a same primary channel as the second wireless access point,
the first wireless access point assigns transmission right of the channels which are not scheduled for use within the first cell of the first wireless access point to the second wireless access point which is a cooperation partner, and data communication is performed on the assigned channels within the second cell of the second wireless access point,
the first wireless access point notifies the second wireless access point of a period in which the channels of which the permission for use is given to the second wireless access point are assigned, and
the second wireless access point uses the primary channel to notify the first wireless access point that the second wireless access point uses the channels of which the permission for use is acquired by the second wireless access point.

2. The wireless communication system according to claim 1, wherein the control unit processor transmits the permission for use of a secondary channel that is not scheduled to be used via a primary channel.

3. The wireless communication system according to claim 1, wherein the control unit processor transmits the permission for use of a secondary channel that is not scheduled to be used via all channels.

4. The wireless communication system according to claim 1, wherein the control unit processor transmits the permission for use of a channel on which a transmission permission is not sent as a reply to a transmission request transmitted via all channels.

5. The wireless communication system according to claim 1, wherein the control unit processor transmits the permission for use of a channel that is not scheduled to be used based on a reply of transmission permission to a transmission request transmitted via all channels.

6. The wireless communication system according to claim 1, wherein the control unit processor transmits the permission for use of a secondary channel when a wireless station with which to be communicated is not available of the orthogonal frequency division multiple access.

7. The wireless communication system according to claim 1, wherein the control unit processor is programmed to transfer permission for use of a secondary channel when a wireless station with which to be communicated is not available of the orthogonal frequency-division multiple access, and
the wireless stations associated with the second wireless access point acquiring the permission for use send a reply of a transmission permission in accordance with an available channel.

8. The wireless communication system according to claim 1, wherein the first wireless access point performs data transmission after determining a channel of which the permission for use is assignable and transmitting the permission for use via a primary channel through the control unit processor.

9. The wireless communication system according to claim 1, wherein the first wireless access point performs data transmission after determining a channel of which the permission for use is assignable and transmitting the permission for use via all channels through the control unit processor.

10. The wireless communication system according to claim 1, wherein the first wireless access point performs data transmission after determining a channel of which the permission for use is assignable, transmitting the permission for use via a primary channel through the control unit processor, and receiving a positive acknowledgement for the permission for use.

11. The wireless communication system according to claim 1, wherein the first wireless access point performs data transmission after determining a channel of which the permission for use is assignable, transmitting the permission for use via all channels through the control unit processor, and receiving a positive acknowledgement for the permission for use.

12. A wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, wherein each wireless station within the first cell comprises:

a first data receiving circuit which receives different data destined to different wireless stations transmitted from the first wireless access point on different channels by the orthogonal frequency-division multiple access; and a first acknowledgement transmitting circuit which transmits a first acknowledgement if the data is correctly received by the first data receiving circuit, and each wireless station within the second cell comprises:

a second data receiving circuit which receives data transmitted from the second wireless access point by the orthogonal frequency-division multiple access on a channel for which permission for use is acquired from the first wireless access point; and a second acknowledgement transmitting circuit which transmits a second acknowledgement if the data is correctly received by the second data receiving circuit, wherein replies of the first acknowledgement and the second acknowledgement with which the first acknowledgement transmitting circuit and the second acknowledgement transmitting circuit reply, respectively, are made using uplink orthogonal frequency-division multiple access, wherein all first wireless stations associated with the first wireless access point perform an acknowledgement on only a primary channel and all second wireless station associated with the second wireless access point perform an acknowledgement on only a secondary channel, wherein the primary channel is a unit channel that is used regardless of the transmission bandwidth when communication is performed within a cell constituted of a certain access point and stations, wherein the secondary channel is an arbitrary unit channel which is not the primary channel among all bands used in the cell.

13. The wireless communication system according to claim 12, wherein the second wireless access point comprises a transmission opportunity acquiring circuit which acquires a transmission opportunity, and wherein an acknowledgement is transmitted after the transmission opportunity is acquired.

14. A wireless communication method to be performed by a wireless communication system in which a first wireless access point which communicates with one more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, the method comprising:

a transmission opportunity acquiring step of acquiring, by the first wireless access point, a transmission opportunity when data to be transmitted is generated; and a use permission transmitting step of transmitting, at the first wireless access point, permission for use of channels which are not scheduled for use within the first cell, to the second wireless access point in a period in which the transmission opportunity is acquired, wherein the first wireless access point uses a same primary channel as the second wireless access point, the first wireless access point assigns transmission right of the channels which are not scheduled for use within the first cell of the first wireless access point to the second wireless access point which is a cooperation partner, and data communication is performed on the assigned channels within the second cell of the second wireless access point, the first wireless access point notifies the second wireless access point of a period in which the channels of which the permission for use is given to the second wireless access point are assigned, and the second wireless access point uses the primary channel to notify the first wireless access point that the second wireless access point uses the channels of which the permission for use is acquired by the second wireless access point.

15. The wireless communication method according to claim 14, further comprising a communication step of communicating, by the second wireless access point, with the wireless stations within the second cell via the channels in which the permission for use is acquired from the first wireless access point.

16. A wireless communication method to be performed by a wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, the method comprising:

a first data receiving step of receiving different data, at the wireless stations within the first cell, destined to different wireless stations transmitted from the first wireless access point on different channels by the orthogonal frequency-division multiple access;

a first acknowledgement transmitting step of transmitting, by the wireless stations within the first cell, an acknowledgement if the data is correctly received in the first data receiving step;

a second data receiving step of receiving, by the wireless stations within the second cell, data transmitted from the second wireless access point by the orthogonal frequency-division multiple access on a channel for which permission for use is acquired from the first wireless access point; and a second acknowledgement transmitting step of transmitting, by the wireless stations within the second cell, an acknowledgement if the data is correctly received in the second data receiving step, wherein replies of the first acknowledgement and the second acknowledgement with which the first acknowledgement transmitting step and the second acknowledgement transmitting step reply, respectively, are made using uplink orthogonal frequency-division multiple access, wherein all first wireless stations associated with the first wireless access point perform an acknowledgement on only a primary channel and all second wireless station associated with the second wireless access point perform an acknowledgement on only a secondary channel, wherein the primary channel is a unit channel that is used regardless of the transmission bandwidth when communication is performed within a cell constituted of a certain access point and stations, wherein the secondary channel is an arbitrary unit channel which is not the primary channel among all bands used in the cell.

17. A wireless access point in a wireless communication system in which a wireless access point which communicates with one or more wireless stations within a first cell by orthogonal frequency-division multiple access and another wireless access point which is capable of performing carrier sensing with the wireless access point and communicates with one or more wireless stations within a second cell by the orthogonal frequency-division multiple access operate in cooperation with each other, wherein wireless access point comprises:
a control unit processor programmed to acquire a transmission opportunity when data to be transmitted is generated; and
the control unit processor further programmed to transfer permission for use of channels which are not scheduled for use within the first cell to the other wireless access point in a period in which the transmission opportunity is acquired,
the wireless access point uses a same primary channel as the other wireless access point,
the wireless access point assigns transmission right of the channels which are not scheduled for use within the first cell of the wireless access point to the other wireless access point which is a cooperation partner, and data communication is performed on the assigned channels within the second cell of the other wireless access point,
the wireless access point notifies the other wireless access point of a period in which the channels of which the permission for use is given to the other wireless access point are assigned, and
the other wireless access point uses the primary channel to notify the wireless access point that the other wireless access point uses the channels of which the permission for use is acquired by the other wireless access point.

18. A wireless communication system in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, wherein each wireless station within the first cell comprises:
a first data receiving circuit which receives different data destined to different wireless stations transmitted from the first wireless access point on different channels by the orthogonal frequency-division multiple access; and
a first acknowledgement transmitting circuit which transmits a first acknowledgement if the data is correctly received by the first data receiving circuit, and each wireless station within the second cell comprises:
a second data receiving circuit which receives data transmitted from the second wireless access point by the orthogonal frequency-division multiple access on a channel for which permission for use is acquired from the first wireless access point; and
a second acknowledgement transmitting circuit which transmits a second acknowledgement if the data is correctly received by the second data receiving circuit,
wherein the second acknowledgement transmitting circuit transmits the second acknowledgement on a primary channel after the first acknowledgement transmitting circuit transmits the first acknowledgement on the primary channel,
wherein the primary channel is a unit channel that is used regardless of the transmission bandwidth when communication is performed within a cell constituted of a certain access point and stations.

19. A wireless communication method in which a first wireless access point which communicates with one or more wireless stations within a first cell by orthogonal frequency-division multiple access and a second wireless access point which is capable of performing carrier sensing with the first wireless access point and communicates with one or more wireless stations within a second cell by the orthogonal frequency-division multiple access operate in cooperation with each other, the method comprising:

a wireless station within the first cell performing a first data receiving step of receiving different data destined to different wireless stations transmitted from the first wireless access point on different channels by the orthogonal frequency-division multiple access; and
the wireless station within the first cell performing a first acknowledgement transmitting step of transmitting a first acknowledgement if the data is correctly received by the first data receiving step, and
a wireless station within the second cell performing a second data receiving step of receiving data transmitted from the second wireless access point by the orthogonal frequency-division multiple access on a channel for which permission for use is acquired from the first wireless access point; and
a second acknowledgement transmitting step of transmitting a second acknowledgement if the data is correctly received by the second data receiving step,
wherein the second acknowledgement transmitting step transmits the second acknowledgement on a primary channel after the first acknowledgement transmitting step transmits the first acknowledgement on the primary channel,
wherein the primary channel is a unit channel that is used regardless of the transmission bandwidth when communication is performed within a cell constituted of a certain access point and stations.

\* \* \* \* \*